US007831691B2

(12) United States Patent
Aoki et al.

(10) Patent No.: US 7,831,691 B2
(45) Date of Patent: Nov. 9, 2010

(54) SYSTEM, DEVICE, SERVER, AND PROGRAM FOR SERVICE PROVISION

(75) Inventors: Kazuma Aoki, Kasugai (JP); Satoru Yanagi, Nagoya (JP); Masatoshi Kokubo, Aichi-ken (JP); Makoto Matsuda, Aisai (JP); Kiyotaka Ohara, Nagoya (JP); Masafumi Miyazawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1013 days.

(21) Appl. No.: 11/267,597

(22) Filed: Nov. 7, 2005

(65) Prior Publication Data

US 2006/0103875 A1    May 18, 2006

(30) Foreign Application Priority Data

Nov. 5, 2004    (JP) .............................. 2004-322938

(51) Int. Cl.
*G06F 15/16*    (2006.01)
(52) U.S. Cl. ...................................... 709/219; 709/227
(58) Field of Classification Search ........................ None
See application file for complete search history.

(56) References Cited

U.S. PATENT DOCUMENTS

| 5,909,602 | A | 6/1999 | Nakai et al. |
| 5,946,457 | A | 8/1999 | Nakai et al. |
| 6,014,712 | A | 1/2000 | Islam et al. |
| 2002/0107850 | A1 | 8/2002 | Sugimoto et al. |
| 2002/0156923 | A1 | 10/2002 | Tanimoto |
| 2003/0023755 | A1* | 1/2003 | Harris et al. ................. 709/246 |
| 2003/0117642 | A1 | 6/2003 | Haraguchi |
| 2003/0187965 | A1* | 10/2003 | Enomoto et al. ............. 709/221 |
| 2004/0160630 | A1* | 8/2004 | Iriyama et al. ............. 358/1.15 |
| 2004/0205115 | A1 | 10/2004 | Young et al. |
| 2005/0220139 | A1* | 10/2005 | Aholainen ................... 370/466 |

FOREIGN PATENT DOCUMENTS

EP    0944008 A2    9/1999

(Continued)

OTHER PUBLICATIONS

JP Office Action dtd Oct. 21, 2008, JP App. 2004-322938.

(Continued)

*Primary Examiner*—Ario Etienne
*Assistant Examiner*—Clayton R Williams
(74) *Attorney, Agent, or Firm*—Banner & Witcoff, Ltd.

(57) ABSTRACT

A service providing system is provided including a service providing device adapted to provide a service through a network and a device adapted to receive the service from the service providing device. The device includes a service request unit that requests the service providing device for a service, and a service implementation unit that implements a function of the device after receiving the service from the service providing device that is requested. The service providing device includes a service provision executing unit that provides the service to the device when the service providing device receives the request from the service request unit, and a function judging unit that judges whether the device is equipped with a function to receive the service provided by the service provision executing unit based on equipped function information that indicates functions for which the device is equipped.

18 Claims, 40 Drawing Sheets

FOREIGN PATENT DOCUMENTS

| | | |
|---|---|---|
| EP | 1 041 808 | 10/2000 |
| EP | 1 229 719 | 8/2002 |
| EP | 1 455 518 | 9/2004 |
| JP | 9-238215 A | 9/1997 |
| JP | 9-321793 A | 12/1997 |
| JP | 2002-112223 A | 4/2000 |
| JP | 2001-357008 A | 12/2001 |
| JP | 2003-283758 A | 10/2003 |
| JP | 2003-288336 A | 10/2003 |
| JP | 2004-228686 A | 8/2004 |
| JP | 2004-252543 A | 9/2004 |
| WO | WO 03/100575 | 12/2003 |

OTHER PUBLICATIONS

CN Office Action dtd Jun. 8, 2007, CN Appln. 2005101176242.
JP Office Action dtd Apr. 22, 2008, JP Appln. 2004-322938.

* cited by examiner

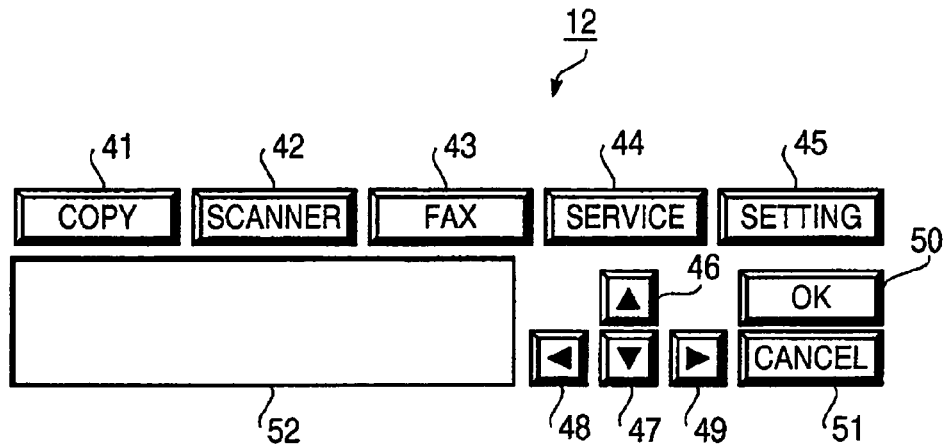

FIG. 2

| | DATA NAME | DATA TYPE | DESCRIPTION |
|---|---|---|---|
| BASIC DATA | ID | INTEGER | IDENTIFICATION INFORMATION OF SERVICE DEFINITION INFORMATION |
| | Title | CHARACTER STRING | DISPLAY TITLE |
| | Type | "MENU" OR "FORM" | BODY DATA TYPE |
| BODY DATA TYPE (WHEN TYPE IS "MENU") | Num_Link | INTEGER | THE NUMBER OF LINK DATA |
| | Link[ ] | – | ACTUAL LINK DATA(EXPLAINED LATER) |
| LINK DATA | Link_Title | CHARACTER STRING | DISPLAYED CHARACTER STRING FOR EXPLAINING SERVICE OF OR INFORMATION ON THE LINK DESTINATION |
| | Link_Location | CHARACTER STRING | URL FOR SERVICE OR ID FOR OTHER SERVICE DEFINITION INFORMATION |

FIG. 3

| | DATA NAME | DATA TYPE | DESCRIPTION |
|---|---|---|---|
| BASIC DATA | ID | INTEGER | IDENTIFICATION INFORMATION OF SERVICE I/F INFORMATION |
| | Title | CHARACTER STRING | DISPLAY TITLE |
| | Type | "MENU" OR "FORM" | INDICATES BODY DATA TYPE. IF IT IS MENU, A LIST OF LINKS TO OTHER INFORMATION IS DEFINED; IF IT IS FORM, A DATA ENTRY FORM IS DEFINED. THE TYPE IS "FORM" IF INFORMATION IS SERVICE I/F INFORMATION |
| Body Data (WHEN Type IS "FORM") | Action | URL CHARACTE STRING | URL OF PROGRAM FOR RECEIVING AND PROCESSING INPUT DATA |
| | Num_Form_Elem | INTEGER | NUMBER OF Form_Elem |
| | Form_Elem[ ] | – | TYPE-DEPENDENT FORM ELEMENT DATA |
| Form_Elem DATA (FORM ELEMENT DATA) | Form_Type | "Text", OR "Passeord" OR "Select" | THE TYPE OF FORM ELEMENT |
| | Form_Data | – | TYPE-DEPENDENT DATA |
| | Device_Type | "scanner" OR "printer" OR "voice" OR "speaker" | DEVICES REQUIRING PARAMETER INPUT |
| Form_Data DATA ("Text" or "Password") | Disp_Name | CHARACTER STRING | CHARACTER STRING EXPLAINING INPUT ENTRIES |
| | Value_Name | CHARACTER STRING | VARIABLE NAME WHEN TRANSMITTING AS DATA |
| | Max_Byte | INTEGER | MAXIMUM NUMBER OF BYTES OF CHARACTER STRING WHICH CAN BE INPUT |
| | Default_String | CHARACTER STRING | CHARACTER STRING INITIALLY SHOWN IN THE ENTRY AREA |
| Form_Data DATA (Select) | Disp_Name | CHARACTER STRING | CHARACTER STRING EXPLAINING INPUT ENTRIES |
| | Value_Name | CHARACTER STRING | VARIABLE NAME WHEN TRANSMITTED AS DATA |
| | Multi_Select | 0 OR 1 | 0: MULTIPLE SELECTIONS PROHIBITED 1: MULTIPLE SELECTIONS ALLOWED |
| | Num_Option | INTEGER | NUMBER OF SELECTION ENTRIES |
| | Option[ ] | – | INFORMATION RELATED TO SELECTION ENTRIES |
| Option DATA | Disp_Select | CHARACTER STRING | DISPLAYED CHARACTER STRING SHOWING CHOICES |
| | Disp_Value | CHARACTER STRING | VALUE WHEN TRANSMITTED AS DATA WHEN SELECTED |
| | Default_Select | 0 or 1 | 0: NOT SELECTED IN INITIAL STATE 1: SELECTED IN INITIAL STATE |

FIG. 4

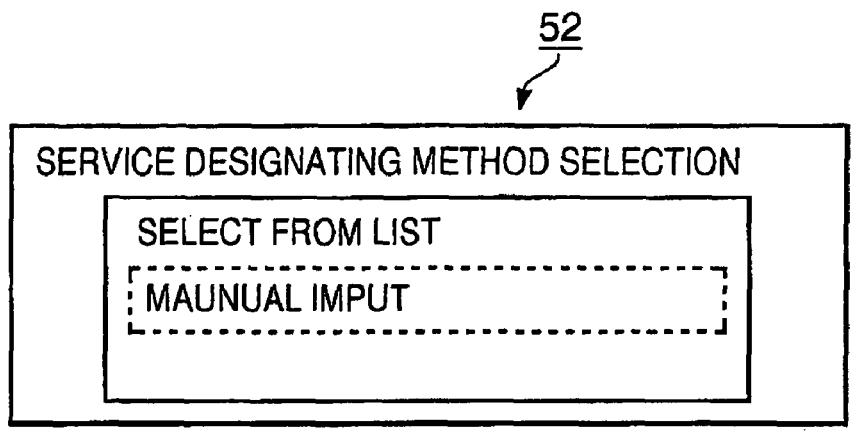

FIG. 6

```
<ID>11111110</ID>
<Title>DIRECTORY SERVICE</Title>
<Type>MENU</Type>
<Num_Link>3</Num_Link>
<Link>
  <Link_Title>DATA STORAGE SERVICE</Link_Title>
  <Link_Location>11111111</Link_Location>
</Link>
<Link>
  <Link_Title>PRINT SERVICE </Link_Title>
  <Link_Location>11111112</Link_Location>
</Link>
<Link>
  <Link_Title>COPY APPLICATION SERVICES</Link_Title>
  <Link_Location>11111113</Link_Location>
</Link>
```

FIG. 7

```
<ID>11111113</ID>
<Title>COPY APPLICATION SERVICE</Title>
<Type>MENU</Type>
<Num_Link>4</Num_Link>
<Link>
  <Link_Title>COPY WITH WATERMARK</Link_Title>
    <Link_Location>http://suk.example.co.jp/cgi_bin/suktop</Link_Location>
</Link>
<Link>
  <Link_Title>TRANSLATION COPY </Link_Title>
    <Link_Location>http://hon.example.co.jp/cgi_bin/top</Link_Location>
</Link>
<Link>
  <Link_Title>READ ALOUD</Link_Title>
    <Link_Location>http://example.yomiage.com/cgi_bin/yomi</Link_Location>
</Link>
<Link>
  <Link_Title>VOICE-TEXT CONVERSION</Link_Title>
    <Link_Location>http://ototeki.com/cgi_bin/oo</Link_Location>
</Link>
```

FIG. 9

```
<ID>11111110</ID>
<Title>TRANSLATION COPY</Title>
<Type>FORM</Type>
<Action>http://hon.exemple.co.jp/cgi_bin/
service </Action>
<Num_Form_Elem>4</Num_Form_Elem>
<Form_Elem>
  <Form_Type>Select</Form_Type>
  <Form_Data>
   <Disp_Name>LANGUAGE SELECTION</Disp_Name>
   <Value_Name>lang</Value_Name>
   <Multi_Select>0</Multi_Select>
   <Num_Option>2</Num_Option>
   <Option>
    <Disp_Select>ENGLISH→JAPANESE</Disp_Select>
    <Disp_Value>en_ja</Disp_Value>
    <Default_Select>1</Default_Select>
   </Option>
   <Option>
    <Disp_Select>JAPANESE→ENGLISH</Disp_Select>
    <Disp_Value>ja_en</Disp_Value>
    <Default_Select>0</Default_Select>
   </Option>
  </Disp_Name>
  </Form_Data>
</Form_Elem>
<Form_Elem>
  <Form_Type>Select</Form_Type>
  <Form_Data>
  <Disp_Name>TEXT CHARACTER CODE SETTING<Disp
_Name>
   <Value_Name>kb_encoding</Value_Name>
   <Multi_Select>0</Multi_Select>
   <Num_Option>2</Num_Option>
   <Option>
    <Disp_Select>Shift-JIS</Disp_Select>
    <Disp_Value>sjis<Disp_Value>
    <Default_Select>1</Default_Select>
   </Option>
   <Option>
    <Disp_Select>UTF-8</Disp_Select>
    <Disp_Value>UTF-8</Disp_Value>
    <Default_Select>0</Default_Select>
   </Option>
   </Disp_Name>
  </Form_Data>
</Form_Elem>
CONTINUED
```

FIG.13

```
CONTINUED
<Form_Elem>
  <Form_Type>Select</Form_Type>
  <Form_Data>
   <Disp_Name>SCANNER SETTING</Disp_Name>
   <Value_Name> alt_scan_res</Value_Name>
   <Multi_Select>0</Multi_Select>
   <Num_Option>2</Num_Option>
   <Option>
    <Disp_Select>NORMAL FONT</Disp_Select>
    <Disp_Value>300</Disp_Value>
    <Default_Select>1</Disp_Select>
   </Option>
   <Option>
    <Disp_Select>SMALL FONT</Disp_Select>
    <Disp_Value>600</Disp_Value>
    <Default_Select>0</Disp_Select>
   </Option>
  </Disp_Name>
  </Form_Data>
<Form_Elem>
  <Form_Type>Select</Form_Type>
  <Form_Data>
   <Disp_Name>PRINTER SETTING</Disp_Name>
   <Value_Name>print_res</Value_Name>
   <Multi_Select>0</Multi_Select>
   <Num_Option>3</Num_Option>
   <Option>
    <Disp_Select>PRINT SPEED PRIORITIZED</Disp_Select>
    <Disp_Value>200</Disp_Value>
    <Default_Select>0</Disp_Select>
   </Option>
   <Option>
    <Disp_Select>NORMAL</Disp_Select>
    <Disp_Value>300</Disp_Value>
    <Default_Select>1</Disp_Select>
   </Option>
   <Option>
    <Disp_Select>HIGH-DEFINITION</Disp_Select>
    <Disp_Value>600</Disp_Value>
    <Default_Select>0</Disp_Select>
   </Option>
   </Disp_Name>
  </Form_Data>
</Form_Elem>
<Form_Elem>
  <Form_Type>Text</Form_Tpye>
  <Form_Data>
   <Disp_Name>COMMENT</Disp_Name>
   <Max_Byte>100</Max_Byte>
   <Default_String></Default_String>
  </Form_Data>
</Form_Elem>
```

```
<Num_Device>4</Num_Device>
<Device_Info>
  <Device_Type>scanner</Device_Type>
  <Device_Priority>1</Device_Priority>
  <Device_Spec>
    <Scan_Color>1</Scan_Color>
    <Num_Scan_Res>3</Num_Scan_Res>
    <Scan_Res>200,200</Scan_Res>
    <Scan_Res>300,300</Scan_Res>
    <Scan_Res>600,600</Scan_Res>
  </Device_Spec>
</Device_Info>
<Device_Info>
  <Device_Type>printer</Device_Type>
  <Device_Priority>1</Device_Priority>
  <Device_Spec>
    <Print_Color>1</Print_Color>
    <Num_Print_Res>4</Num_Print_Res>
    <Print_Res>200,200</Print_Res>
    <Print_Res>300,300</Print_Res>
    <Print_Res>600,600</Print_Res>
    <Print_Res>1200,1200</Print_Res>
</Device_Spec>

CONTINUED
```

```
CONTINUED

<Device_Info>
  <Device_Type>voice</Device_Type>
<Device_Priority>2</Device_Priority>
  <Device_Spec>
    <Voice_Max_Volume>10</Voice_Max_Volume>
    <Num_Voice_Frequency>2</Num_Voice_Frequency
    <Voice_Frequency>8</Voice_Frequency>
    <VoiceFrequency>32</Voice_Frequency>
    <Num_Voice_Bit>2</Num_Voice_Bit>
    <Voice_Bit>8</Voice_Bit>
    <Voice_Bit>16</Voice_Bit>
</Device_Spec>
</Device_Info>
<Device_Info>
  <Device_Type>speaker</Device_Type>
<Device_Priority>2</Device_Priority>
  <Device_Spec>
    <Speaker_Max_Volume>100</Speaker_Max_Volume>
    <Num_Speaker_Frequency>2</Num_Speaker_Frequency>
    <Speaker_Frequency>8</Speaker_Frequency>
    <Speaker_Ferquency>44</Speaker_Frequency>
    <Num_Speaker_Bit>2</Num_Speaker_Bit>
    <Speaker_Bit>8</Speaker_Bit>
    <Speaker_Bit>16</Speaker_Bit>
</DEVICE_Spec>
```

FIG.15

|  | DATA NAME | DATA TYPE | DESCRIPTION |
|---|---|---|---|
| BASIC DATA | Num_Device | INTEGER | NUMBER OF DEVICES |
|  | Device_Info[ ] | - | SPECIFICATION INFORMATION FOR EVERY DEVICE |
| Device_Info | Device_Type | "scanner" OR "printer" OR "voice" OR "speaker" | TYPE OF DEVICE |
|  | Device_Spec[ ] | - | INFORMATION ON DEVICE TYPE DEPENDENCY |
|  | Device_Priority | INTEGER | PRIORITY WHEN DEVICE IS AUTOMATICALLY SELECTED |
| Device_Spec FOR SCANNER | Scan_Color | 0 OR 1 | 0: BLACK AND WHITE<br>1: COLOR |
|  | Num_Scan_Res | INTEGER | NUMBER OF RESOLUTION TYPES |
|  | Scan_Res[ ] | ARRAY OF (X,Y)VALUES | RESOLUTION |
| Device_Spec FOR PRINTER | Print_Color | 0 OR 1 | 0: BLACK AND WHITE<br>1: COLOR |
|  | Num_Print_Res | INTEGER | NUMBER OF RESOLUTION TYPES |
|  | Print_Res[ ] | ARRAY OF (X,Y)VALUES | RESOLUTION |
| Device_Spec FOR VOICE | Voice_Max_Volume | INTEGER | MAXIMUM VOLUME (MINIMUM IS 0) |
|  | Num_Voice_Frequency | INTEGER | NUMBER OF SAMPLING FREQUENCY TYPE |
|  | Voice_Frequency | ARRAY OF INTEGERS | SAMPLING FREQUENCY |
|  | Num_Voice_Bit | INTEGER | NUMBER OF BIT TYPES |
|  | Voice_Bit[ ] | ARRAY OF INTEGERS | NUMBER OF BITS |
| Device_Spec FOR SPEAKER | Speaker_Max_Volume | INTEGER | MAXIMUM VOLUME (MINIMUM IS 0) |
|  | Speaker_Max_Ch | INTEGER | NUMBER OF CHANNELS |
|  | Num_Speaker_Frequency | INTEGER | NUMBER OF SAMPLING FREQUENCY TYPE |
|  | Speaker_Frequency | ARRAY OF INTEGERS | SAMPLING FREQUENCY |
|  | Num_Speaker_Bit | INTEGER | NUMBER OF BIT TYPES |
|  | Speaker_Bit[ ] | ARRAY OF INTEGERS | NUMBER OF BITS |

FIG.16

| CONSTITUENT ELEMENTS | DEFINITION |
|---|---|
| CONVERSION PROCESS PROGRAM | PROGRAM FOR PERFORMING CONVERSION PROCESS |
| INPUT SPECIFICATION INFORMATION | INPUT SPECIFICATION INFORMATION FOR CONVERSION PROCESS (IN ORDER TO ACT AS A VIRTUAL INPUT DEVICE FROM THE SERVICE PERSPECTIVE) |
| OUTPUT SPECIFICATION INFORMATION | OUTPUT SPECIFICATION INFORMATION FOR CONVERSION PROCESS (IN ORDER TO ACT AS A VIRTUAL OUTPUT DEVICE FROM THE SERVICE PERSPECTIVE) |
| INPUT DEVICE SERVICE I/F INFORMATION | INFORMATION FOR DEFINING SETTING ENTRY OF THE INPUT DEVICE (SAME FORMAT AS SERVICE I/F INFORMATION) |
| OUTPUT DEVICE SERVICE I/F INFORMATION | INFORMATION FOR DEFINING SETTING ENTRY OF THE OUTPUT DEVICE (SAME FORMAT AS SERVICE I/F INFORMATION) |
| PROCESS TYPE STORAGE AREA | INFORMATION POINTING TO INFORMATION INDICATING CONVERSION DIRECTION AS THE TYPES BELOW: [ MFP → SERVICE ](OPERATES AS AN INPUT FILTER) [ SERVICE → MFP ](OPERATES AS AN OUTPUT FILTER) |
| DEVICE SPECIFICATION INFORMATION STORAGE AREA | AREA FOR STORING SPECIFICATION INFORMATION RECEIVED FROM THE MFP AND DISASSEMBLED |
| SERVICE-END SERVICE I/F INFORMATION STORAGE AREA | AREA FOR STORING SERVICE I/F INFORMATION RECEIVED FROM THE MFP AND DISASSEMBLED |
| INPUT PARAMETER STORAGE AREA | AREA FOR STORING THE PARAMETER OF THE (VIRTUAL)DEVICE ON THE INPUT-END OF CONVERSION PROCESS |
| OUTPUT PARAMETER STORAGE AREA | AREA FOR STORING THE PARAMETER OF THE (VIRTUAL)DEVICE ON THE OUTPUT-END OF CONVERSION PROCESS |

FIG.27

| SERVICE I/O MEDIA INFORMATION | | |
|---|---|---|
| SERVICE IDENTIFIER INFORMATION | INPUT MEDIA | OUTPUT MEDIA |
| TRANSLATION SERVICE | TEXT | TEXT |
| LOCAL INFORMATION OUTPUT SERVICE | — | IMAGE |
| TEXT CONVERSION SERVICE | IMAGE | TEXT |
| ... | | |

FIG.29

CONVERSION CORRESPONDENCE INFORMATION
■ FOR INPUT MEDIA

| SERVICE INPUT MEDIA | INPUT DEVICE | CONVERSION TYPE | CONVERSION MODULE |
|---|---|---|---|
| IMAGE | scanner | NONE | (BLANK) |
| | voice | VOICE → IMAGE | VoiceToImage |
| | keyboard | TEXT → IMAGE | TextToImage |
| TEXT | scanner | IMAGE → TEXT | ImageToText |
| | voice | VOICE → TEXT | VoiceToText |
| | keyboard | NONE | (BLANK) |
| VOICE | scanner | IMAGE → VOICE | ImageToVoice |
| | voice | TEXT → VOICE | TextToVoice |
| | keyboard | NONE | (BLANK) |

■ FOR OUTPUT MEDIA

| SERVICE OUTPUT MEDIA | OUTPUT DEVICE | CONVERSION TYPE | CONVERSION MODULE |
|---|---|---|---|
| IMAGE | printer | NONE | (BLANK) |
| | speaker | IMAGE → VOICE | ImageToVoice |
| TEXT | printer | TEXT → IMAGE | TextToImage |
| | speaker | TEXT → VOICE | TextToVoice |
| VOICE | printer | VOICE → IMAGE | VoiceToImage |
| | speaker | NONE | (BLANK) |

FIG.31

| Value_Name | DEVICE | I/O | DEFINITION |
|---|---|---|---|
| scan_res | scanner | INPUT | SCANNER RESOLUTION |
| scan_color | scanner | INPUT | SCANNER COLOR SETTING |
| kb_encoding | keyboard | INPUT | TEXT CHARACTER CODE INFORMATION |
| print_res | printer | OUTPUT | PRINTER RESOLUTION |
| print_color | printer | OUTPUT | PRINTER COLOR SETTING |
| voice_volume | voice | INPUT | INPUT VOICE VOLUME |
| voice_frequency | voice | INPUT | INPUT VOICE SAMPLING FREQUENCY |
| voice_bit | voice | INPUT | NUMBER OF BITS OF INPUT VOICE DATA |
| speaker_volume | speaker | OUTPUT | OUTPUT VOICE VOLUME |
| speaker_frequency | speaker | OUTPUT | OUTPUT VOICE SAMPLING FREQUENCY |
| speaker_bit | speaker | OUTPUT | NUMBER OF BITS OF OUTPUT VOICE DATA |
| _alt_scan_res | scanner | INPUT | ALTERNATIVE DEVICE SCANNER RESOLUTION |
| _alt_scan_color | scanner | INPUT | ALTERNATIVE DEVICE SCANNER COLOR SETTING |
| _alt_kb_max_encoding | keyboard | INPUT | ALTERNATIVE DEVICE TEXT CHARACTER CODE INFORMATION |
| _alt_print_res | printer | OUTPUT | ALTERNATIVE DEVICE PRINTER RESOLUTION |
| _alt_print_color | printer | OUTPUT | ALTERNATIVE DEVICE PRINTER COLOR SETTING |
| _alt_voice_volume | voice | INPUT | ALTERNATIVE DEVICE INPUT VOICE VOLUME |
| _alt_voice_frequency | voice | INPUT | ALTERNATIVE DEVICE INPUT VOICE SAMPLING FREQUENCY |
| _alt_voice_bit | voice | INPUT | NUMBER OF BITS OF ALTERNATIVE DEVICE INPUT VOICE DATA |
| _alt_speaker_volume | speaker | OUTPUT | ALTERNATIVE DEVICE OUTPUT VOICE VOLUME |

FIG.35

SYSTEM, DEVICE, SERVER, AND PROGRAM FOR SERVICE PROVISION

CROSS REFERENCE TO RELATED APPLICATION

This application claims priority from Japanese Patent Application No. 2004-322938, filed on Nov. 5, 2004, the entire subject matter of the application is incorporated herein by reference.

FIELD

Aspects of the present invention relate to a system providing services, a device and a server that can be employed in such a system.

BACKGROUND

Conventionally, there is known a system including terminal devices and a host computer, which are interconnected through a network, and each terminal device is capable of using a function of the host computer through the network. An example of such a system is disclosed in Japanese Patent Provisional Publication No. H09-238215. In this system, bit data representing, for example, command codes for control and density of images is sent from the terminal device to the host computer, which analyzes the received command codes and performs image processing utilizing image editing functions specified for the image data and returns the processed data to the terminal device for printing.

In this system, the terminal device receives the service provided by the host computer to process the image data so that the terminal device is capable of printing the image. In such a system, the terminal device should be provided with a function to receive the service. That is, in the above example, the terminal device should be provided with a printing unit.

In the above example, as the terminal device is provided with the printing unit, it can receive the image data processing service provided by the host computer. According to the conventional system, if a user of the terminal device intends to receive another service requiring an un-equipped function of the terminal device, the terminal device cannot receive the service.

SUMMARY

According to aspects of the present invention, there is provided a terminal device capable of receiving services through a network even if the terminal device is not equipped with functions that correspond to the services.

BRIEF DESCRIPTION OF THE ACCOMPANYING DRAWINGS

FIG. 2 is a diagram showing a configuration of the operation unit in accordance with aspects of the present invention.

FIG. 3 is a diagram showing the definition of each tag in the service definition information in accordance with aspects of the present invention.

FIG. 4 is a diagram showing the definition of each tag in the service I/F information in accordance with aspects of the present invention.

FIG. 6 is a diagram showing a method of selecting screen in accordance with aspects of the present invention.

FIG. 7 is a diagram showing a data structure of the service definition information in accordance with aspects of the present invention.

FIG. 9 is a diagram showing a data structure of the service definition information in accordance with aspects of the present invention.

FIG. 13 is service I/F information in accordance with aspects of the present invention.

FIG. 15 is a diagram showing a data structure of specification information in accordance with aspects of the present invention.

FIG. 16 is a diagram showing the definition of tags in the specification information in accordance with aspects of the present invention.

FIG. 27 is a diagram showing a configuration of a conversion module in accordance with aspects of the present invention.

FIG. 29 is a diagram showing service input/output media information in accordance with aspects of the present invention.

FIG. 31 is a diagram showing conversion correspondence information in accordance with aspects of the present invention.

FIG. 35 is a diagram showing the definition of the value of "Value_Name" in service I/F information in accordance with aspects of the present invention.

DETAILED DESCRIPTION

General Overview of the Invention

Figure 1:
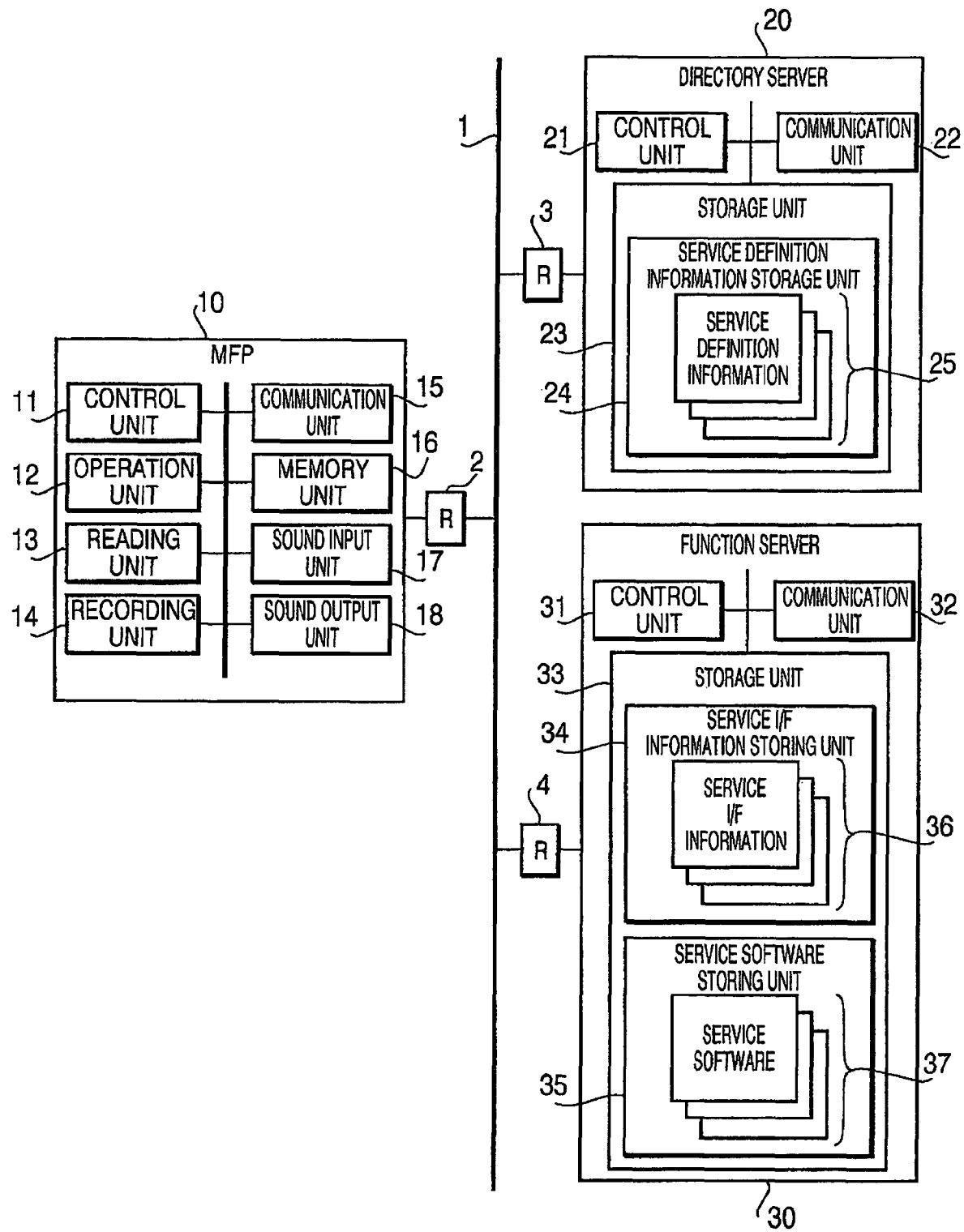
FIG. 1 is a block diagram showing a configuration of the service provision system in accordance with aspects of the present invention.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, Flash memory, EEPROMs, CD-media, DVD-media, temporary storage, hard disk drives, floppy drives, permanent storage, and the like.

According to some aspects of the invention, there is provided a service providing system including a service providing device adapted to provide a service through a network and a device adapted to receive the service from the service providing device. The device includes a service request unit that is adapted to request the service providing device for the service, and a service implementation unit that is adapted to implement a function of the device after receiving the service from the service providing device. The service providing device is provided with a service provision executing unit that is adapted to provide the service to the device when the service providing device receives the request from the service request unit, and a function judging unit that is adapted to judge whether the device is equipped with a function to receive the service based on equipped function information that indicates functions for which the device is equipped. The service provision executing unit is configured to provide the service by executing a format conversion process, which implements the service by utilizing media corresponding to the function when the function judging unit judges that the device is not equipped with the function to receive the service.

With the above configuration, the service providing system can provide a service to the device by executing the format conversion process. As the format conversion process enables the service to be provided through the media corresponding to the function for which the device is equipped, the service is allowed to be received by the device according to the processed results.

The above service providing system may be, for example, a server on a network. In this case, the server may be configured with a single server or multiple servers.

The media corresponding to the function for which the device is equipped refers to data for implementing the function. When the device is equipped with a function to print images or a function to read images, for example, the image data is the media corresponding to the function for which the device is equipped for implementing the function. For another example, when the device is equipped with a function to input/output sounds, the sound data is the media corresponding to the function for implementing the function. The format conversion process executed by the service provision implementation system refers to a process in which data such as described above is obtained as a processed result from the service provision executing system. With this configuration, a function for which the device is equipped can be implemented according to the data obtained as the processed result of the service provision executing system.

The device may be provided with at least one of a function that reads an image and generates image data that represents the image and a function to print an image that is represented by the image data. The service providing device may be adapted to provide a service concerning at least one of the image data generated by the function for which the device is equipped and the image data representing an image to be printed.

With the above configuration, the device can be provided with the service from the service providing system and can implement at least one of the function to read the image and generate image data representing the image and the function to print the image represented by the image data.

The function judging system may be adapted to judge whether the device is provided with a function to receive the service provided by the service provision executing unit when the function indicated in the equipped function information is included in required function information, which is adapted to indicate functions for the device to receive the service provided by the service provision executing unit.

With the above configuration, the service providing system is allowed to keep information on the functions, and the function judging system can judge whether the device is equipped with a function based on the information on the functions.

It should be noted that the equipped function information, which the function judging system uses for judging, may be registered in the service providing system by a user beforehand. However, this may not be preferable if the service providing systems is operated in a network that contains multiple devices, because the work load involving registration may be excessive depending on the number of devices.

The device may be provided with an information notification unit, which is adapted to notify the service providing device of the equipped function information. The function judging unit may be adapted to judge whether the device is provided with a function based on the equipped function information notified by the information notification unit.

With the above configuration, the user does not need to register equipped function information in the service providing system, as the equipped function information of the device can be obtained by the device itself.

Further with the above configuration, a risk that the user may register incorrectly equipped function information may be prevented, as notification of the equipped function information of the device is provided by the device.

The service providing system may be provided with a function determination unit, which is adapted to determine a function among multiple functions provided to the device based on a predetermined condition, when the device is judged by the function judging unit to not be provided with the function. The service provision executing unit may be adapted to provide the service by executing one format conversion process among multiple format conversion processes. The service provision executing unit may be adapted to provide the service by executing the format conversion process, which enables the service to be provided by utilizing the media corresponding to the function determined by the function determination unit.

With the above configuration, the service providing system is allowed to determine the media corresponding to the function among the functions for which the device is equipped, based on the predetermined condition when the service providing system executes the format conversion process.

The device may be provided with a conditioning unit, when the function determination system determines the function, which is adapted to allow the user to specify conditions for the function determination unit, and a condition notifying unit, which is adapted to notify the service providing device of the conditions specified by the user through the conditioning unit. The function determination unit may be adapted to determine the function based on the conditions notified by the condition notifying unit.

With the above configuration, the user is allowed to specify the conditions for the function determination system on the device, and the function is allowed to determine the function on the service providing system, based on the specified conditions.

The service providing system may be adapted to apply the format conversion process to data that is transmitted from the device to the service providing device and to data that is transmitted from the service providing device to the device.

With the above configuration, the device is allowed to receive the service that is transmitted bidirectionally between the device and the service providing system, as well as the service transmitted in one direction from the device to the service providing system, or vice versa.

The service providing system may be provided with a specification request unit, which is adapted to request the device to specify a service to be provided among at least one service available from the service providing device, and a service specifying unit, which allows the user to specify the service to be provided among at least one service available from the service providing device when the device receives a request from the specification request unit for specification of the service. The service request unit may be adapted to request the service providing device to provide the service specified by the service specifying unit.

With the above configuration, the user is allowed to specify the service when the device receives the request from the specification request system. The at least one service available from the service system may include all the services that may be provided by the service providing system, or it may be limited to some extent, for example, to only services corresponding to the functions for which the device is equipped.

The specification request system may be adapted to request the device to specify a service among at least one service including a service provided by the service provision executing unit executing the format conversion process when the function judging unit determines that the device is not equipped with the function to receive the service. The service provision executing unit may be adapted to provide the service by executing the format conversion process when the service is requested from the service request unit.

With the above configuration, the service may be specified by selecting from the services corresponding to the functions for which the device is equipped, when a service specification request system requests the device to specify the service.

The specification request system may be configured as, for example, a server on the network. In this case, the server may be a single server or may be configured with multiple servers. It may also be configured integrally with the service providing system as one server. If the server is configured to be independent separate from the service providing system, the server may be configured to obtain a result of the judgment by the function judging system of the service providing system, and request the specification of the service in accordance with the result.

According to some aspects of the invention, there is provided a device that is adapted to receive a service from a server. The device includes a service request unit that is adapted to request the server for the service concerning one of data being generated and data being output by a function for which the device is equipped, and a service implementation unit that is adapted to implement the function of the device after receiving the requested service provided by the server.

According to some aspects of the invention, there is provided a server, which includes, a service providing unit adapted to provide a service to a device, a function judging unit that judges whether the device is equipped with a function to receive the service based on equipped function information that indicates functions for which the device is, and a service provision executing unit that is adapted to convert the service to be provided by the service providing unit into a format, in which the device is capable of providing the service with the function, when the function judging unit judges that the device is not equipped with the function required to receive the service.

According to some aspects of the invention, there is provided a computer program product having computer-readable instructions that cause a computer system to execute processes to function as a service providing system. The service providing system includes a service providing device adapted to provide a service through a network, and a device adapted to receive the service from the service providing device. The device includes a service request unit that is adapted to request the service providing device for the service, and a service implementation unit. The service providing device includes a service provision executing unit that is adapted to provide the service to the device when the service providing device receives the request from the service request unit, and a function judging unit that is adapted to judge whether the device is equipped with a function to receive the service based on equipped function information that indicates functions for which the device is equipped. The service provision executing unit is configured to provide the service by executing a format conversion process, which implements the service by utilizing media corresponding to the function when the function judging unit judges that the device is not equipped with the function to receive the service.

According to some aspects of the invention, there is provided a computer program product having computer-readable instructions that cause a computer system to execute processes to function as a device. The device includes a service providing device adapted to provide a service through a network, and a device adapted to receive the service from the service providing device. The device includes a service request unit that is adapted to request the service providing device for the service, and a service implementation unit that is adapted to implement a function of the device after receiving the requested service provided by the service providing device. The service providing device includes a service provision executing unit that is adapted to provide the service to the device when the service providing device receives the request from the service request unit, and a function judging unit that is adapted to judge whether the device is equipped with a function to receive the service provided by the service provision executing unit based on equipped function information that indicates functions for which the device is equipped. The service provision executing unit is configured to provide the service by executing a format conversion process, which implements the service to be provided by utilizing media corresponding to the function when the function judging unit judges that the device is not equipped with the function to receive the service.

According to some aspects of the invention, there is provided a computer program product having computer-readable instructions that cause a computer system to execute processes to function as a server. The server includes a service providing device adapted to provide a service through a network, and a device adapted to receive the service from the service providing device. The device includes a service request unit that is adapted to request the service providing device for the service, and a service implementation unit that is adapted to implement a function of the device after receiving the service provided by the service providing device. The service providing device includes a service provision executing unit that is adapted to provide the service to the device when the service providing device receives the request from the service request unit, and a function judging unit that is adapted to judge whether the device is equipped with a function to receive the service based on equipped function information that indicates functions for which the device is equipped. The service provision executing unit is configured to provide the service by executing a format conversion process, which implements the service by utilizing media corresponding to the function when the function judging unit judges that the device is not equipped with the function to receive the service.

Illustrative Embodiments

Referring to the accompanying drawings, illustrative embodiments according to aspects of the present invention will be described.

(1) Entire Configuration

As shown in FIG. 1, a service providing system is provided with an MFP 10, a directory server 20, a function server 30, and the like, which are interconnected via a network 1 so as to perform data communication. According to the illustrative embodiments, the network 1 may be a Wide Area Network (WAN) such as the Internet.

Specifically, the MFP 10, directory server 20 and function server 30 are connected to the network 1 via routers 2 to 4, respectively. (In FIG. 1, the routers 24 are represented by R, which may be known broadband routers).

The MFP 10 includes a control unit 11, an operation unit 12, a reading unit 13, a recording unit 14, a communication unit 15, a memory unit 16, a sound input unit 17, a sound output unit 18, and the like. The control unit 11 includes CPU, ROM, RAM, and the like, and the CPU controls overall operation of the MFP 10 in accordance with programs stored in the ROM.

The operation unit 12 includes a copy key 41, a scanner key 42, a FAX key 43, a service key 44, a setting key 45, up/down/right/left direction keys 46 through 49, an OK key 50, a cancel key 51, and a user interface such as display 52.

The reading unit 13, which is an input device for implementing the scanner function, reads an image recorded (e.g., printed) on a sheet-type recording medium such as paper and generates image data representing the image.

The recording unit 14, which is an output device for implementing the printer function, prints out the image represented by the image data on a sheet-type recording medium such as paper.

The communication unit 15 is configured to connect the MFP 10 to the network 1 and also performs processing necessary for enabling data transmission via the network 1.

The memory unit 16 includes a nonvolatile RAM (not shown) in which data can be stored.

The sound input unit 17 receives a sound signal from a microphone provided to a handset (not shown) provided to the MFP 10, and generates sound data (PCM data) representing the received sound signal.

The sound output unit 18 outputs sound in accordance with the sound data (PCM data) through a speaker provided to the handset (not shown) or a speaker (not shown) provided on a main body of the MFP 10.

The directory server 20 includes a control unit 21, a communication unit 22 and a memory unit 23. The control unit 21 is provided with CPU, ROM, RAM, and the like, and the CPU controls the entire operation of the directory server 20 in accordance with programs stored in the ROM.

The communication unit 22 is connected to the directory server 20 in the network 1 and performs a process to transmit/receive data via this network. Memory unit 23 includes a hard disk (not shown) wherein data is stored. The memory unit 23 is equipped with a service definition information memory unit 24 for recording service definition information 25. The service definition information 25 is XML (eXtensible Markup Language) data, which is described in XML, and is adapted to provide a list, including a type and a request destination address (URL; Uniform Resource Locator) of each service, of the service provided by a function server 30 by showing a service selection screen (see FIG. 8A), in accordance with the content of the XML data. Each tag definition in the service definition information 25 is shown in FIG. 3.

The function server 30 is provided with multiple units including a control unit 31, a communication unit 32, a memory unit 33, and the like. The control unit 31 includes a CPU, ROM, and RAM. The CPU has control over the entire function server 30 in accordance with the program stored in the ROM. The control unit 31 is configured to be sufficiently high-performing compared to the control unit 11 of the MFP 10, and is capable of performing processes, which may be overload for the control unit 11 to perform.

The communication unit 32 is connected to the function server 30 through the network 1, and performs processes for transmitting and receiving data through the network 1.

The memory unit 33 is provided with a hard disk (not shown) wherein data is stored. The memory unit 33 includes a service I/F information memory unit 34 for storing service I/F information 36, and a service software memory unit 25 for storing service software 37, which performs processes for providing various services. The service I/F information 36 is XML data, which is described in XML, and is adapted to provide information (i.e., contents of the services and a request destination address) for requesting service to be provided by the function server 30 by showing a parameter input screen (see FIGS. 14A-14F) in accordance with the content of the XML data. Each tag definition in the service I/F information 36 is shown in FIG. 4.

(2) Process by the MFP 10

A process performed by the control unit 11 of MFP 10 will be explained below. In the present illustrative embodiment, transmission and reception of data, parameters, and the service I/F information 36 between the MFP 10 and the function server 30 is performed via a conversion process, which will be described later.

(2-1) MFP Process

Figure 5:
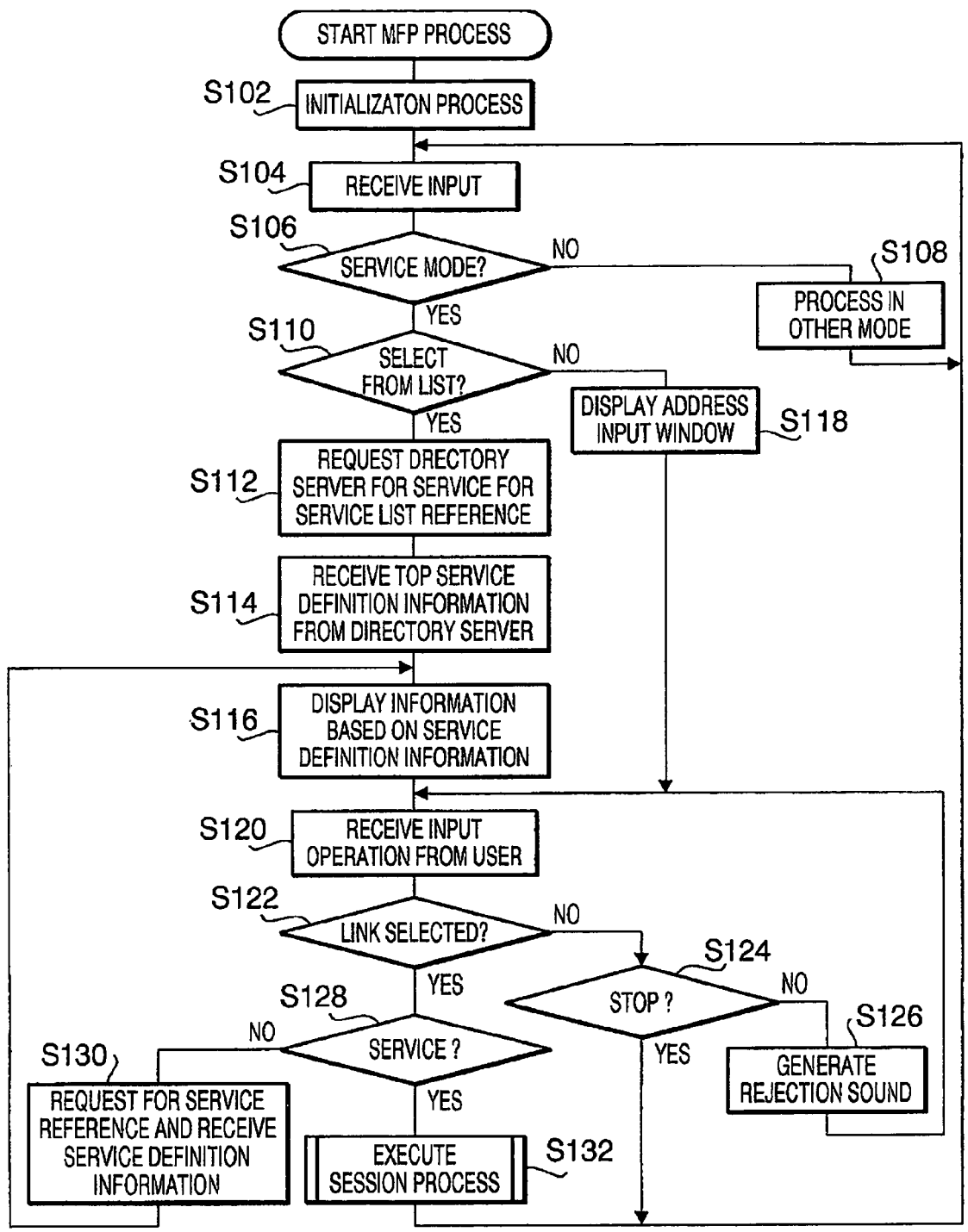
FIG. 5 is a flowchart showing an MFP (Multi Function Peripheral) process performed by an MFP in accordance with aspects of the present invention.

Referring to FIG. 5, an MFP process, which is repeatedly performed by the MFP 10 after the MFP 10 is activated, will be explained.

After the MFP 10 is activated, an initialization process is performed (S102). Thereafter, if an instruction is received from an external source (S104), for example, an input operation to the operation unit 12 or an input of instruction signals via the network 1, the process judges whether the content of the input calls for changing the operation mode to a service mode (S106). In the present illustrative embodiment, an operation of pressing down a service key 44 of the operation unit 12 is judged to be a call for the change to the service mode. As will be seen in the process below, the service mode is one of multiple operation modes to perform a process requesting the function server 30 for a service.

In S106, if the content does not call for a change to the service mode (S106: NO), the process returns to S104 after performing a process for another operation mode depending on the content of the input (S108).

If the content calls for a change to the service mode (S106: YES), the user is required to select a method to specify the service to be requested from the function server 30 (S110). On the display 52, a method selection screen shown in FIG. 6 is displayed, and the user is asked to select the service from a list (i.e., "Select from list" in FIG. 6) or by directly entering the destination address of the request (i.e., "Direct input" in FIG. 6). When the selection screen is displayed, the user can select one of the specification methods by providing an input to the operation unit 12.

In S110, if specifying from the list is selected (S110: YES), reference to the service list is requested to the directory server 20 (S112) by transmitting an HTTP request based on HTTP1.1 (HTTP: HyperTextTransfer Protocol) (hereinafter referred to as an "HTTP request") to an address, which is stored in the memory unit 16 in advance, as the address for requesting the transmission of the service definition information 25 from the directory server 20. The directory server 20, which is requested based on this address, sends an HTTP response based on HTTP1.1 (hereinafter referred to as "HTTP response") including the top service definition information 25.

The service definition information 25 includes information necessary for displaying a service selection screen to prompt the user to select a service in categories such as "data storage service", "printing service" and "copy services", respectively, and information necessary for displaying the service selection screen to prompt the user to select a category. In S112, an HTTP request is sent to an address to access the service definition information 25 to display the service selection screen that prompts the user to select a category (hereinafter referred to as "top service definition information").

After the request for the service list reference is made and the service definition information 25 that is sent from the directory server 20 is received (S114), the process proceeds to the S120 after the service selection screen is displayed in the display 52 based on the service definition information 25 (S116).

After receiving the top service definition information 25, the service selection screen indicates the selectable categories (Link_Title), wherein the characters "Directory Service" are displayed on the upper part of the display 52 as a display title (Title) (see FIG. 8A), and characters "data storage service", "printing service" and "copy services" are displayed on the lower part of the display 52 in accordance with the top service definition information 25 (XML description), shown in FIG. 7. In the service selection screen in this case, an ID of different service definition information corresponding to the category is assigned as a link destination (see "Link_Location" in FIG. 7), and when one of the items is selected, a request for the service definition information 25 of the ID corresponding to the item is sent to the directory server 20.

If the process in S116 is executed after receiving the service definition information 25 other than the top, for example, when the service definition information 25 related to "copy services" is received, the service selection screen indicates the selectable categories (Link_Title), wherein the characters "Copy Services" are displayed on the upper part of the display as a display title (Title), and characters "copy with watermark", "translation copy", "manuscript read out" and "voice-text conversion" are displayed on the lower part of the display (see FIG. 8B and FIG. 8C) in accordance with the service definition information 25 (XML description) such as that is shown in FIG. 9. In the present illustrative embodiment, if the all items cannot be shown at once due to the limitations of the display region, the position of each item is moved vertically by scrolling the screen. FIG. 8B and FIG. 8C show the screen before and after such scrolling. It should be noted, in the service selection screen the ID of different service definition information corresponding to the service is assigned as a link destination (see "Link_Location" in FIG. 9), and when one of the items is selected, a request for the service definition information 25 of the ID corresponding to the item is sent to the function server 30.

In S110 described above, if specifying the request destination address by direct input is selected (S110: NO), after an address input screen (not shown) for entering the destination address of the request is shown in the display 52 (S118), the process proceeds to the S120.

After the service selection screen or the address input screen is shown, the user can select any of the items (i.e., an address input operation) or terminate the service mode (i.e., a termination operation).

In S120, an input operation by the user to the operation unit 12 is received, and the process judges whether the input operation is an operation selecting the link (S122). Here, if the operation for selecting an item in the service selection screen shown in S116 or an operation for entering an address in the address input screen shown in S118 is performed as an input operation, it is determined to be an operation for selecting a link.

In S122, if the input operation is determined not to be an operation for selecting a link (S122: NO), but the operation is determined to be a termination operation (S124: YES), the process in the service mode is completed and returns to S104. If the input operation is not a termination operation (S124: NO), the process returns to S120 after generating a rejection sound, for example, a buzzer (S126).

In S122, if the input operation is determined to be an operation for selecting a link (S122: YES), the process judges whether the selected link is a link to the service, i.e., an ID for requesting the service to be provided from the function server 30 (S128).

In S128, if the selected link is not a link to the service, i.e., it is an ID for a different service definition information 25

(S128: NO), a service list for reference is requested from the directory server 20. After the relevant service definition information 25 is received (S130), the process returns to S116, and the service selection screen is shown on the display 52.

In S128, if the selected link is the link to the service (S128: YES), the process in the service mode is completed and returns to S104 after a session process (see FIG. 10) is executed (S132).

(2-2) Session Process

Figure 10:
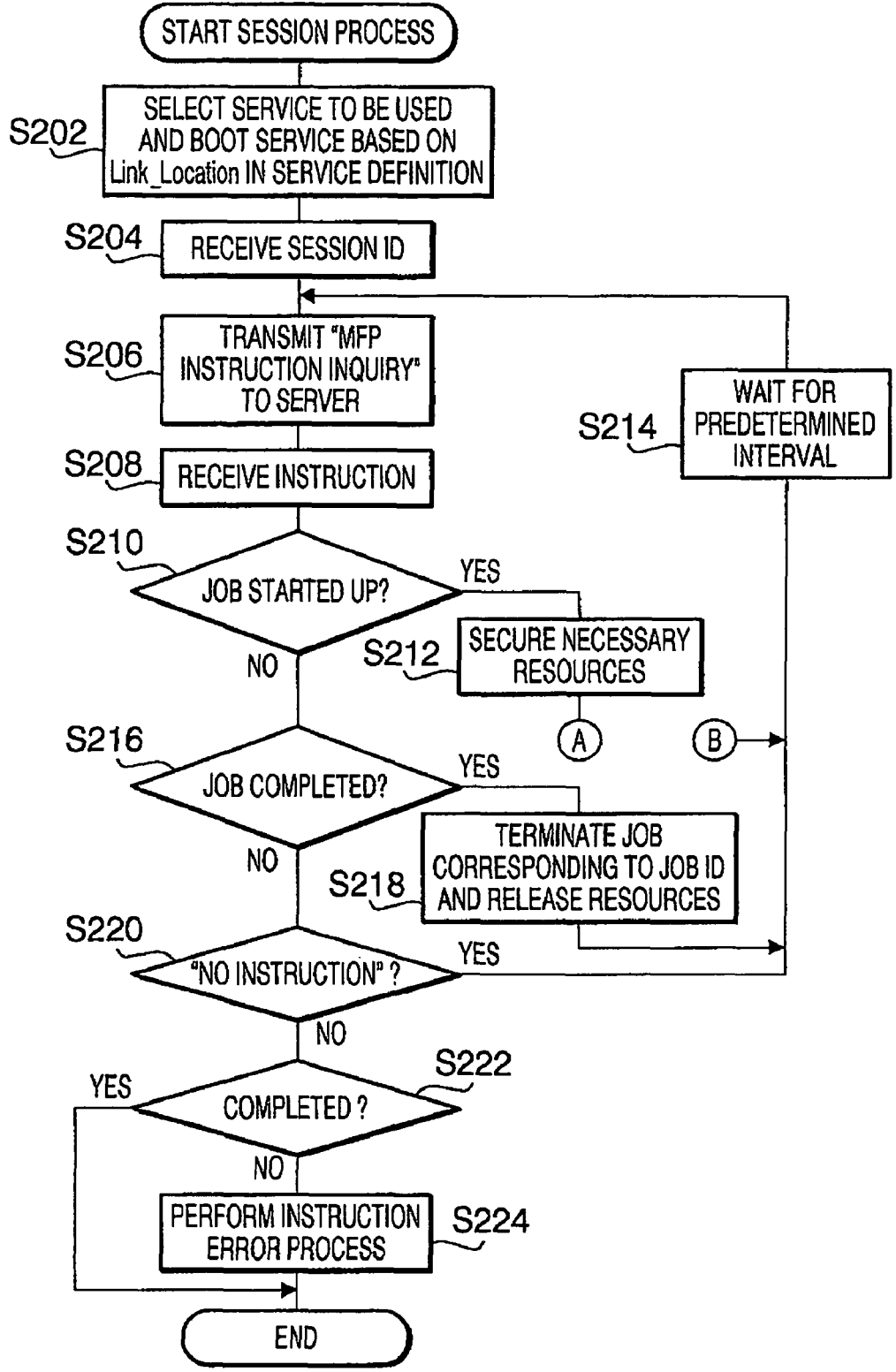
FIG. 10 is a flowchart showing a session process performed by the MFP in accordance with aspects of the present invention.
Figure 11:
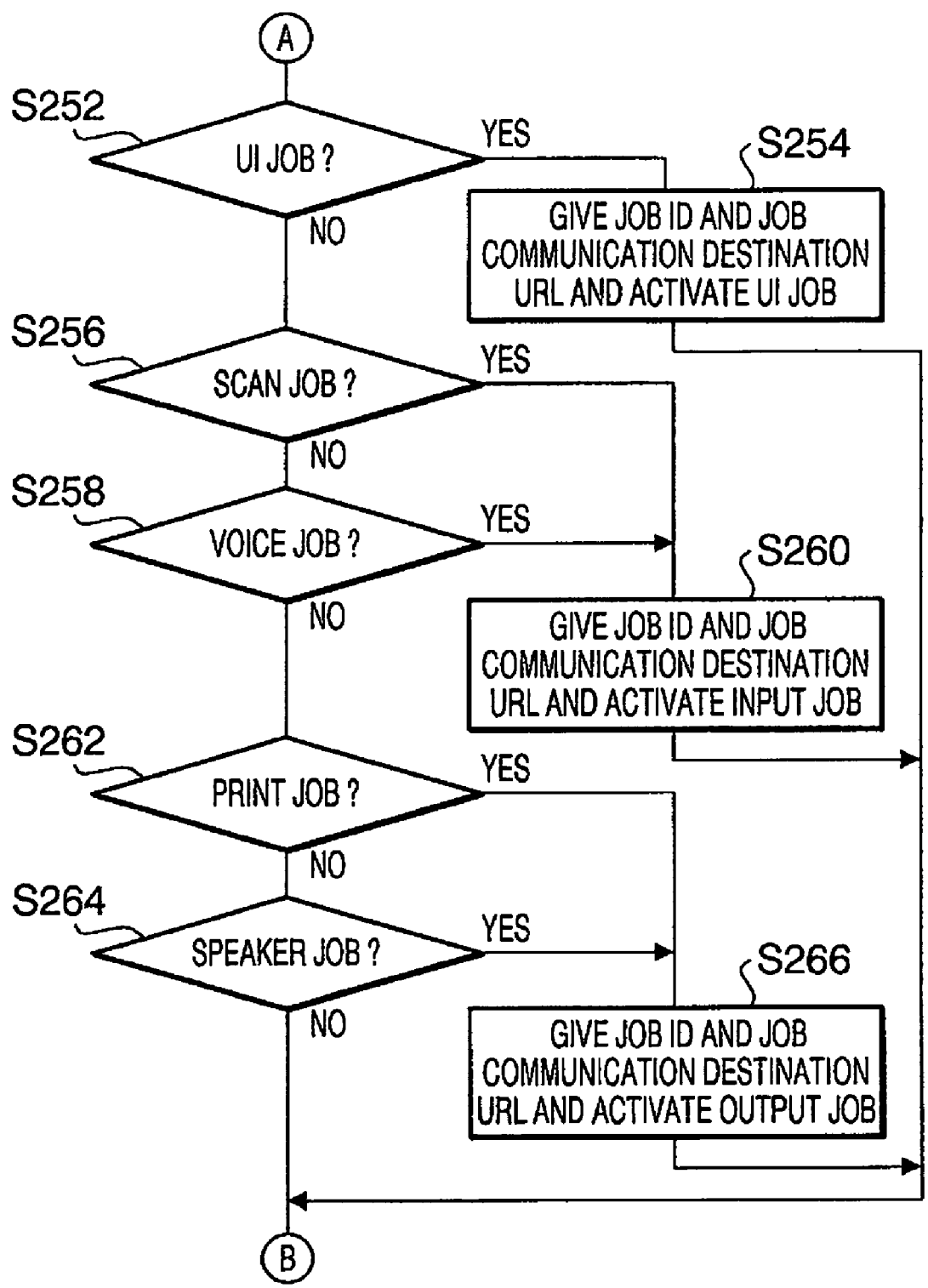
FIG. 11 is a flowchart showing a session process performed by the MFP in accordance with aspects of the present invention.

Referring to FIGS. 10 and 11, the session process derived from S132 will be described in detail.

In the session process, the service to be used is selected, and the selected service is started with reference to Link_Location of the service definition information 25 (or the address, if it is directly entered) (S202). In other words, by transmitting a service start instruction to the service address as an HTTP request, the service selected by the user can be started by the function server 30. A session ID is returned from the function server 30, which received the service start instruction as an HTTP response.

Next, the session ID returned from the function server 30 is received (S204) in accordance with the service start instruction in S202. The HTTP requests and the HTTP responses transmitted in the subsequent process are all sent with the session ID, unless stated otherwise. Further, the function server 30, which received the HTTP request, manages a device in communication based on the session ID (known session management).

Then, an "MFP instruction inquiry" to inquire about the existence of an instruction to the MFP 10 is transmitted to the function server 30 as an HTTP request (S206). If the instruction to the MFP 10 has been generated, the function server 30, which received the "MFP instruction inquiry" returns an instruction indicating the content of the instruction (an instruction indicating "no instruction", if no instruction has been generated) as an HTTP response.

Next, if the instruction (the MFP instruction) returned in response to the inquiry in S206 has been received (S208), the process judges whether the instruction is a job activation instruction (S210). This "job activation instruction" is generated on the function server 30 after the service start instruction has been transmitted in S202, and instructs the activation of one of "UI job", "input job (scan job or voice job)", and "output job (i.e., print job or speaker job)", depending on the timing and the service content. A job ID of the job to be activated, a type of job (UI job, input job (i.e., scan job or voice job), or output job) and the destination address for communication are added to the job activation instruction.

In S210, if the instruction is determined to be a job activation instruction (S210: YES), the activation of the job instructed in the job activation instruction is executed in a process through S252 to S266, which will be described below, after the resources required for the job activation is secured (S212).

Referring to FIG. 11, a process through S252 to S266 will be described below.

In S252, the process judges whether the job instructed by the job activation instruction is a UI job. If the instruction is determined to be a UI job (S252: YES), after the UI job is activated according to the job ID and the destination address for communication attached to the job activation instruction (S254), the process proceeds to S214 (see FIG. 10). The UI job is executed simultaneously with another process after being activated by the process in S254, and will be described in further detail hereinbelow.

In S252, if the job designated by the job activation instruction is determined not to be a UI job (S252: NO), but the instruction is determined to be a scan job (S256: YES) or a voice job (S256: NO, S262: YES), the process proceeds to S214 (see FIG. 10) after the input job is activated according to the job ID and the destination address for communication attached to the job activation instruction (S260). The input job is executed simultaneously with another process after being activated by the process in S260, which will be described in further detail hereinbelow.

In S258, if the job designated by the job activation instruction is determined not to be any of one the foregoing jobs (S258: NO), but the instruction is determined to be either a print job (S262: YES) or a speaker job (S262: NO, S264: YES), the process proceeds to S214 (see FIG. 10) after the output job is activated according to the job ID and the destination address for communication attached to the job activation instruction (S266). The output job is executed simultaneously with another process after being activated by the process in S266, which will be described in further detail hereinbelow.

In S264, if the job instructed by the job activation instruction is determined not to be any one of the foregoing jobs (S264: NO), the process proceeds to S214 (see FIG. 10) without executing a job activation.

After the job is activated, the process returns to B shown in FIG. 10. In S214, after holding for a predetermined interval, the process returns to S206.

In S210, if the instruction is determined not to be a job activation instruction, the process judges whether the instruction received in S208 is a job termination instruction (S216). The "job termination instruction" is generated by the function server 30 after a job activated by each process in FIG. 11 is completed, which will be described hereinbelow. The job ID of the completed job is attached to this job termination instruction.

In S216, if the instruction is determined to be a job termination instruction (S216: YES), the job with the job ID attached to this job termination instruction is terminated (a termination instruction is sent to a relevant job), and the process proceeds to S214 after the resources reserved in S212 prior to activating the job are released (S218).

In S216, if the instruction is determined not to be a job termination instruction (S216: NO), the process judges whether "no instructions" is indicated (S220). If "no instructions" is indicated (S220: YES), the process proceeds to S214. If "no instruction" is not indicated, the process judges whether the instruction is a session termination instruction (S222). The "session termination instruction" is generated in the function server 30 when the service to the MFP 10 is completed.

In S222, if the instruction is determined to be a session termination instruction (S222: YES), the current session process is terminated. If the instruction received in S208 is not any one of the foregoing instructions, the current session process is terminated after the process for notifying an error (a process for instruction error) is executed (S224). In S224, an error is notified to a user by displaying an error message in the display 52.

(2-3) UI Job

Figure 12:
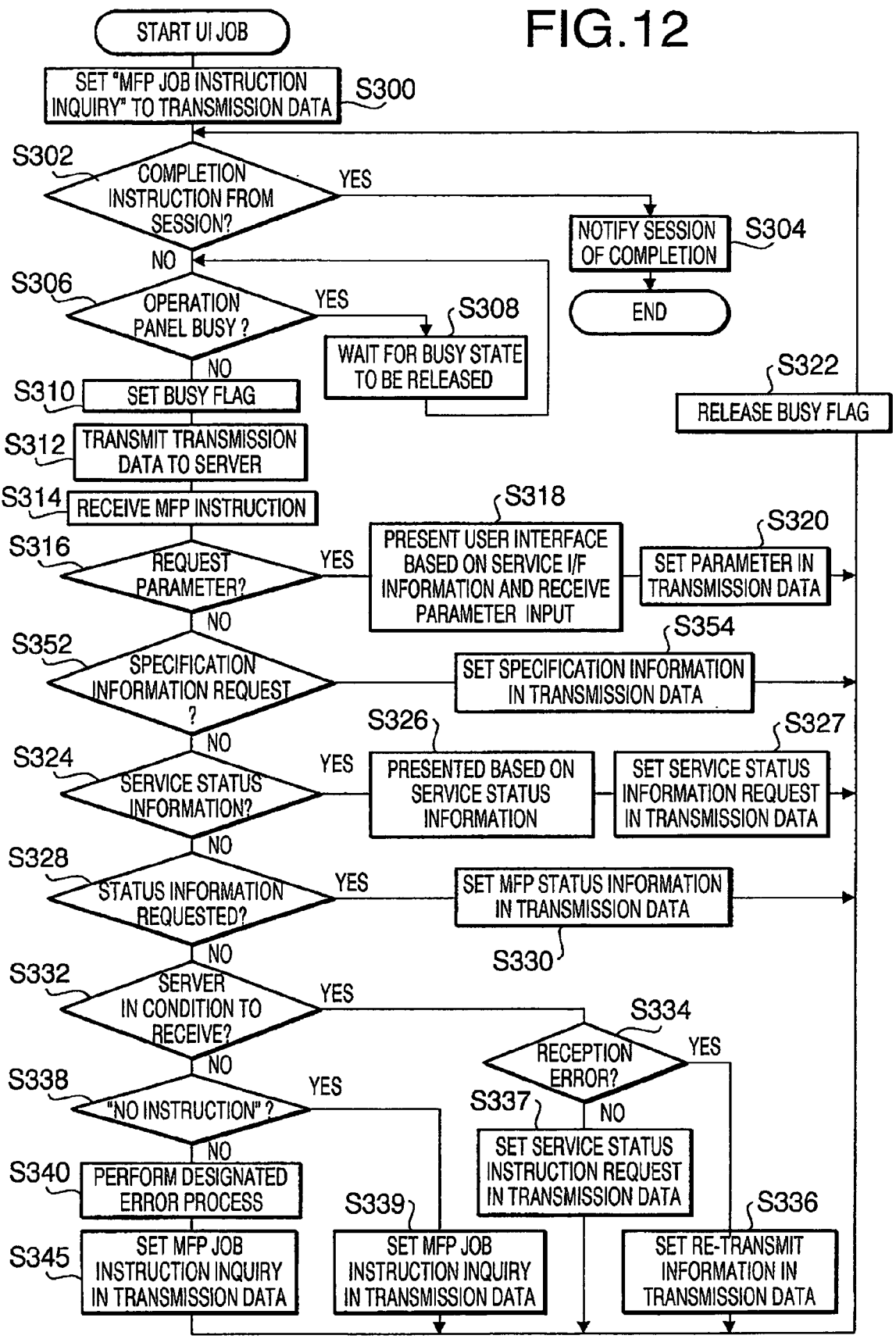
FIG. 12 is a flowchart showing a UI job performed by the MFP in accordance with aspects of the present invention.

Referring to FIG. 12, the UI job process activated in S254 (see FIG. 11) will be described in detail.

When the UI job is started, the MFP job instruction inquiry for making an inquiry regarding instructions to the MFP 10 is set in the transmission data storage area (S300). In the present illustrative embodiment, the MFP job instruction inquiry is set in the transmission data storage area by writing the MFP instruction inquiry to the storage area for transmission data provided to the RAM of the control unit 11. The MFP job instruction inquiry is sent to the function server 30 with a session ID and a job ID in S312, which will be explained hereinafter. When the MFP job instruction inquiry is transmitted, if an instruction for the current UI job has been generated, the function server 30, which received the transmission data, sends an MFP instruction indicating the content of the instruction (an instruction indicating "no instruction", if no instruction has been generated) as an HTTP response.

In S302, the process judges whether there has been a termination instruction from the foregoing session process. The termination instruction is received from the foregoing session process in S218.

In S302, if a completion instruction from the session process is issued (S302: YES), the current UI job is terminated after notifying the user of the termination of the UI job is completed by generating the session termination instruction to the session process (S304). The session termination instruction is received during the process in foregoing S218. In S218, the process judges whether the job has been completely terminated by receiving the session termination instruction and the subsequent procedures are implemented.

In S302, if no termination instruction is issued from the session process (S302: NO), the process judges whether the operation unit 12 is busy (S306). The operation unit 12 is determined to be busy if a busy flag Fu has a value "1" when a job is in process, and it is determined to be not busy when the flag Fu has no value (i.e., "0") when no job is in process.

In S306, if the operation unit 12 is determined to be busy (S306: YES), the process returns to S306 after waiting until the operation unit 12 is released from the busy state, in other words, until the busy flag Fu is released (S308). If the operation unit 12 is determined not to be busy (S306: NO), the busy flag Fu is set (S310), and the operation unit 12 becomes busy with the current UI job.

In S312, information stored to the transmission data storage area is transmitted to the function server 30 with a session ID and a job ID as an HTTP request.

Then, when the MFP instruction is returned in response to the inquiry in S312 and received (S314), the process judges whether the instruction is a parameter request (S316). The "parameter request" is generated by the function server 30, which has received the MFP job instruction inquiry, which will be described hereinbelow. Based on the service I/F information 36 added to this parameter request (see FIG. 13; with regards to translation copy), specification of the parameter is requested by the MFP 10.

In S316, if the instruction is determined to be a parameter request (S316: YES), based on the service I/F information 36 added to the parameter request, a parameter input screen is shown on the display 52, and the user is prompted to enter parameter settings (S318).

The parameter input screen display will be described with an example of the service I/F information 36 corresponding to the translation copy service. The translation copy service refers to a service that generates and provides text data by translating text data entered via an input unit (keyboard) of the MFP 10 to a designated language, and prints the document expressed by the text data with the recording unit 14 in the MFP 10. With this service, based on image data read by the reading unit 13 in the MFP 10, the function server 30 is allowed to recognize text by OCR (Optical Character Recognition) processing the image represented by the image data, perform text recognition by A-D conversion processing voice input via the sound input unit 17, or generate and provide image data representing the image of the text, which has been translated into the designated language, and print the image represented by the image data with the recording unit 14 in the MFP 10.

In the present illustrative embodiment, a translation copy service is received in the MFP 10, which is not equipped with an input unit, and the MFP 10 receives the service with the image data inputted via the input unit 13 being converted through the foregoing conversion process. In accordance with the service I/F information 36 in XML (see FIG. 13), a parameter input screen is displayed, wherein the characters "translation copy" are displayed on the upper part of the display region as the display title (Title), the characters "language selection" are displayed therebelow as an input item (Disp_Name), and further below, the characters "English→Japanese" and "Japanese→English", which are items (Disp_Select) indicating the selectable parameters of the input items, "language selection", are displayed (see FIG. 14A). Although there are "scanner setting", "print setting", and "comments" as input items related to "translation copy", in addition to the foregoing "language selection", only input items regarding "language selection" is shown at this phase. This is merely due to a limitation in the size of the display 52, and the input items shown in the lower part of the display region can be switched between four types, including "scanner setting", "print setting", and "comments", by pressing the left and right direction keys 48 and 49 (hereinafter referred to as switching operation) from this state.

The selectable parameters of the above input items will be described below. The characters "normal font" and "small font" are shown as the items (Disp_Select) indicating selectable parameters for "scanner setting" (see FIG. 14B). "Normal font" refers to the resolution (read resolution), which is a parameter of a reading unit 13 being set to 300×300 dpi, and "small font" refers to the resolution, which is set to 600×600 dpi.

Figure 14A:
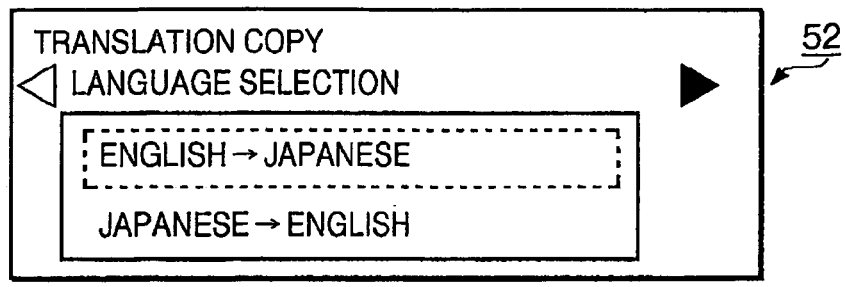
FIGS. 14A-14F are diagrams showing parameter input screens in accordance with aspects of the present invention.
Figure 14B:
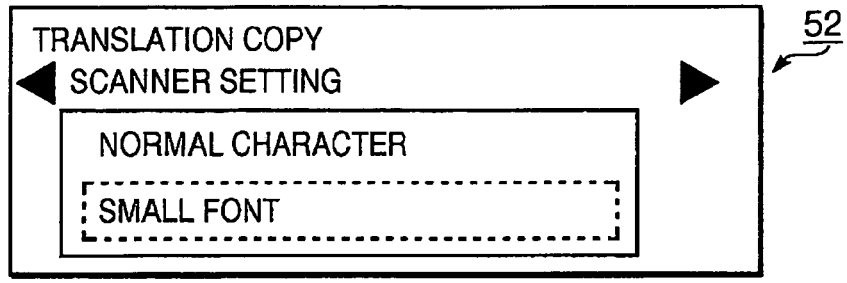
Figure 14C:
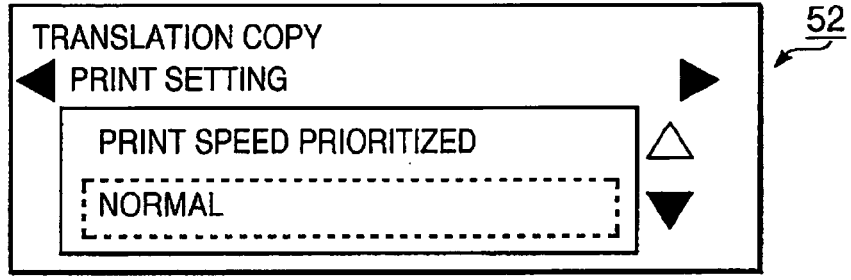
Figure 14D:
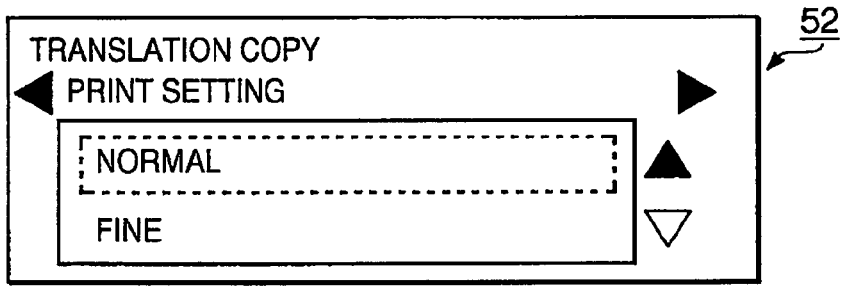

The characters "printing speed prioritize", "normal", and "high-definition" are shown as the items (Disp_Select) indicating selectable parameters for "print setting" (see FIG. 14C). Although "high-definition" is not initially shown due to limitations in the size of the display 52 (see FIG. 14C), it can be shown by scrolling the screen (see FIG. 14D). "Printing speed prioritized" refers to the resolution (print resolution), which is a parameter of the record unit 14 being set to 200×200 dpi, "normal" refers to the resolution, which is set to 300×300 dpi, and "high-definition" refers to a resolution set to 600×600 dpi.

Figure 14E:
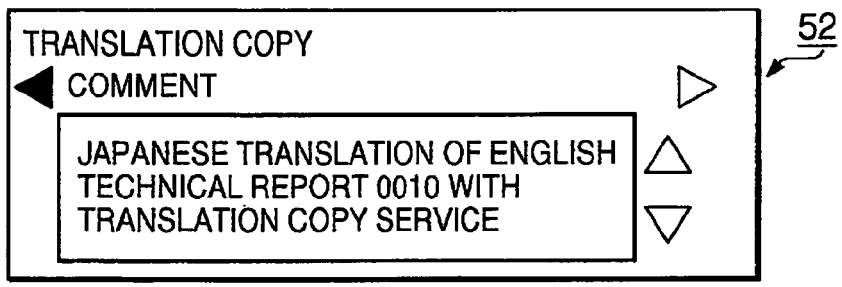
Figure 14F:
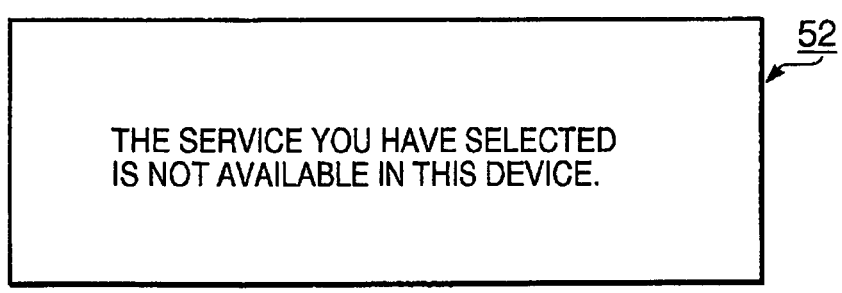

An entry field is shown below the characters "comment", and the set character string (Default_String) appears (see FIG. 14E). The character string appearing in the entry field as a comment is used as a header or a footer of an image to be printed.

After the parameter input screen is shown in the display 52, the user is allowed to select the parameters of each item by operating the keys to switch the displayed contents to other items, which are not shown due to limitation with the display region in the display 52 (switch to $n-1^{th}$ and $n+1^{th}$ item by pressing the right and the left arrow keys 48 and 49), specifying operations to specify the parameters (specify the parameter by pressing the up and the down arrow keys 46 and 47 (see the broken-line square in FIGS. 14A-14D)), scroll operations for showing other parameters, which could not be shown in the display 52 (the parameters that are not shown can be shown by continuing the specifying operation and specifying the parameter), and a complete operation for completing the parameter setting (i.e., pressing OK key 50).

After the parameter input screen is shown in S318, and the user executed the completion operation to complete setting of the parameters, the parameters of the all items are set in the transmission data storage area (S320). Then, the busy flag Fu, which was set in S310 is released (S322), and the process returns to S302. Subsequently, if there is no termination instruction from the session (S302: NO), and the operation panel is not busy (S306: NO), these parameters are sent to the function server 30 through the process in S312. In the present illustrative embodiment, although the service I/F information 36 with the content corresponding to the input/output device, equipped to the MFP 10, is sent with the parameter request, if the service from the function server 30 cannot be received by the input/output device, the process returns to S322 without executing S320 after showing an error message on the display 52 (see FIG. 14F).

In S316, if the MFP instruction returned in response to the inquiry in the foregoing S312 is not determined to be a parameter request (S316: NO), the process judges whether the MFP instruction received in S314 is a specification information request (S352). The "Specifications information request" is issued on the function server 30, which has received the MFP job instruction inquiry, in accordance with the setting of the function server 30. Furthermore, this is an instruction to request the MFP 10 to provide specification information including the registered parameter settings related to the input/output device in the MFP 10. This specification information is the contents of parameter setting related to the input/output device of the MFP 10 as XML data, which is stored in the memory unit 16 (see FIG. 15). Tag definitions in this specification information are shown in FIG. 16.

In S352, if the instruction is determined to be a specification information request (S352: YES), the process proceeds to S322 after specification information is stored in the transmission data storage area (S354). This specification information is subsequently sent to the function server 30 in S312, when no termination instruction from the session is issued (S302: NO), and the operation panel is not busy (S306: NO). Then, the function server 30, which received the specification information, returns a parameter request as an HTTP response after executing a predetermined process, which will be described hereinbelow.

In S352, if the instruction is determined not to be a specification information request (S352: NO), the process judges whether the MFP instruction received in S314 is service status information (S324). The "service status information" is generated from the function server 30, which receives an MFP job inquiry or MFP status information, transmitted in subsequent processes (S330 and S312). The service status information provides status of the service; whether the process related to the service is being executed successfully, or the service will be terminated due to a problem.

In S324, if the instruction is determined to be a service status information (S324: YES), the service status information is shown on the display 52 (S326), and the process proceeds to S322 after a service status information request for information on the service operation status is stored in the transmission data storage area (S327).

In S324, if the instruction is determined not to be a service status information (S324: NO), the process judges whether the MFP instruction received in S314 is a status information request (S328). The "status information request" requests for the transmission of information related to the status of the MFP 10, which will be described hereinbelow.

In S328, if the instruction is determined to be a status information request (S328: YES), the process proceeds to S322 after the MFP status information is stored in the transmission data storage area (S330). The status information request is an instruction to request status on the MFP 10 to be transmitted. Here, the status information indicating "no paper", "cover is open", and the like is stored in the transmission data storage area as the MFP status information.

In S328, if the instruction is determined not to be a status information request (S328: NO), the process judges whether the MFP instruction received in S314 is the server reception status (S332). The "server reception status" is an instruction sent to indicate whether the function server 30 successfully received the information from the MFP 10.

In S332, if the instruction is determined to be a server reception status (S332: YES), and if the content of the server reception status indicates an error (S334: YES), the process proceeds to S322, after the information causing the transmission of this server reception status is stored again in the transmission data storage area (S336). If the content of the server reception status does not indicate a reception error (S334: NO), the process proceeds to S322 after service status information request for requesting the information on the service operation status is stored in the transmission data storage area (S337).

In S332, if the instruction is not determined to be a server reception status (S332: NO), the process judges whether the MFP instruction received in S314 indicates "no instructions" (S338). In S338, if the MFP instruction indicates "no instructions" (S338: YES), the process proceeds to S322, after the MFP job instruction inquiry is stored in the transmission data storage area (S339), similarly to S300. If the MFP instruction does not indicate "no instruction" (S338: NO), an error process (process for a specified error) is executed (S340), and the process proceeds to S322, after the MFP job instruction inquiry is stored in the transmission data storage area (S339), similarly to S300.

(2-4) Input Job

Figure 17:
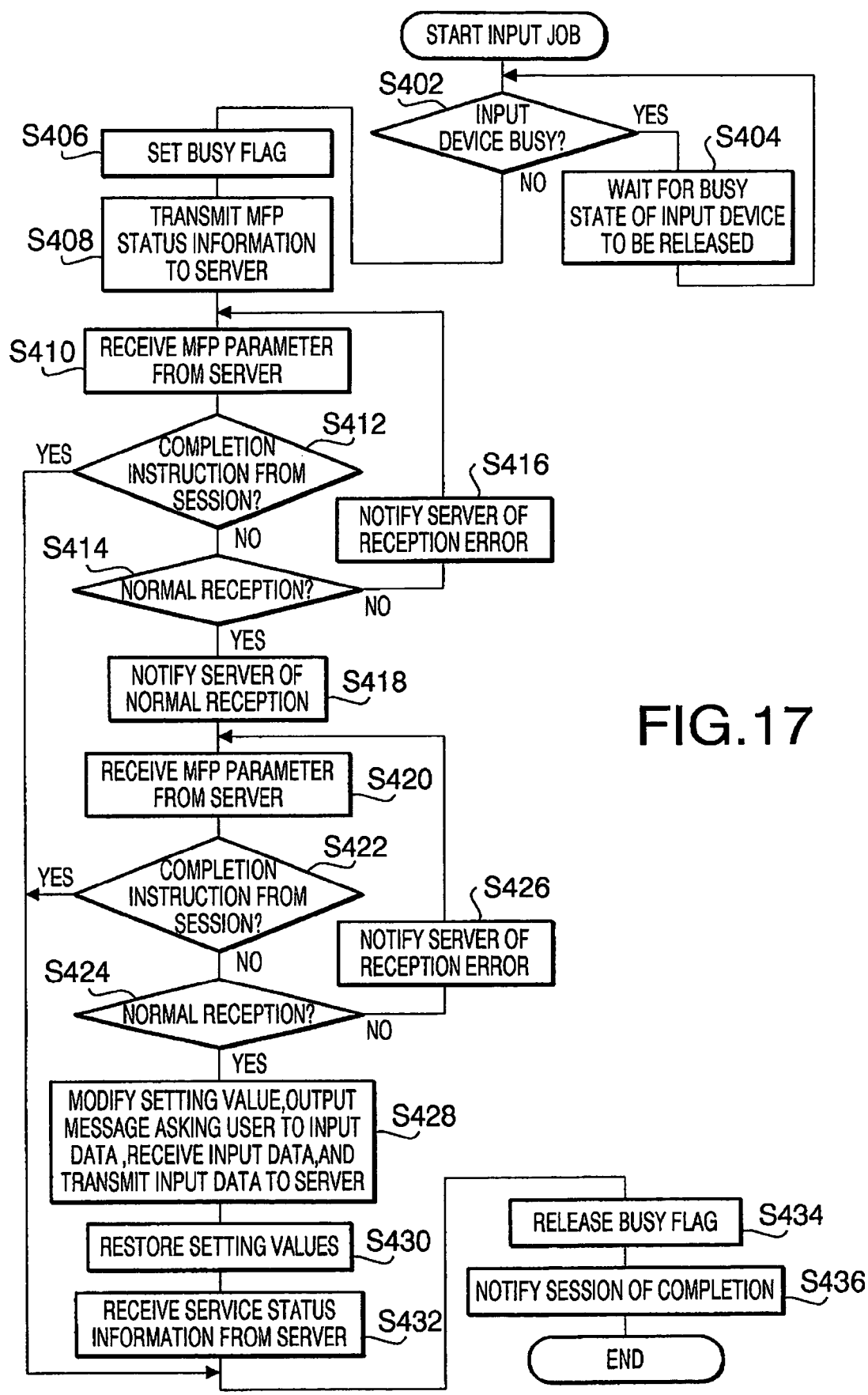
FIG. 17 is a flowchart showing an input job performed by the MFP in accordance with aspects of the present invention.

Referring to FIG. 17, the input job process activated in S260 (see FIG. 11) will be explained in detail. This input job is executed in parallel with the foregoing session process and the UI job.

When the input job is started, the process judges whether the input device is busy (S402). If the input device is determined to be busy the busy flag Fi is set (set to "1"), and is determined to be not busy when the flag is off (set to "0"). Here, the "input device" refers to the reading unit 13, when the reading unit 13 receives the service related to the image data generated in the reading unit 13, and refers to the sound input unit 17, when the sound input unit 17 receives the service related to the sound data generated in the sound input unit 17.

In S402, if the input device is determined to be busy (S402: YES), the process returns to S402 after waiting until the input device is released from its busy state (S404). If the input device is determined to be not busy (S402: NO), the busy flag Fi is set (S406).

In S408, the MFP status information related to the MFP 10 status is transmitted as an HTTP request to the function server 30 with a job ID assigned in S260 in the session process (S408). The function server 30, which received the MFP status information, returns an MFP parameter, which is information based on the parameter transmitted to the function server 30 in S312 (see FIG. 12) after being stored in the transmission data storage area in S320, as an HTTP response.

In S410, after the MFP parameter is returned in response to the MFP status information transmitted in S408, the process judges whether a termination instruction has been issued from the session process (S412). This termination instruction is issued from the session process to the current input job when the job to be terminated in S218 (see FIG. 10) is an input job.

In S412, if the session process has not received the termination instruction (S412: NO), and if the MFP parameter returned in S410 has not been received normally (S414: NO), the MFP reception status indicating that the information from the function server 30 is not received normally (i.e., a reception error) is sent to the function server 30 as an HTTP request (S416), with a job ID assigned in S260 in the session process. The function server 30, which received the MFP reception status, sends the MFP parameter again as an HTTP response, and the process returns to S410 after notifying the function server 30 of the reception error in S416.

If the MFP parameter is received normally (S414: YES), the MFP reception status for indicating that the information from the function server 30 was received normally (i.e., a normal reception) is sent to the function server 30 as an HTTP request (S418), with a job ID assigned in S260 in the session process. The function server 30, which received the MFP reception status, returns an input data request to request a transmission of data to be processed by the function server 30.

In S420, after the input data request is returned from the function server 30, which received the MFP reception status, the process judges whether the session process has received a termination instruction (S422).

In S422, if the session process has not issued the termination instruction (S422: NO), the MFP reception status indicating a reception error is sent to the function server 30 (S426), similarly to S416, if the input data request returned in S420 is not received normally (S426: NO). The function server 30, which received the MFP reception status, sends an input data request again, and the process returns to S420 after notifying the function server 30 of the reception error in S426.

If the input data request returned in S420 has been received normally (S424: YES), the input data to be processed by the function server 30 is transmitted as an HTTP request to the function server 30 (S428), with a job ID assigned in S260 in the session process.

Here, after the values of the input device is modified to the MFP parameter received in S410, the user is prompted to enter the data into the MFP 10 by showing a data input screen for entering data to be processed by the function server 30. Then, the data obtained from the user is transmitted to the function server 30 as an HTTP request, with a job ID assigned in S260 in the session process. Specifically, messages, for example, "Set original document and press OK key" and "Pick up receiver and speak" are shown in the display 52, and subsequently, data obtained from the reading unit 13 or the sound input unit 17 is transmitted to the function server 30 sequentially. The function server 30, which received the input data, returns the service status information to indicate whether the data process based on this input data was completed normally.

The method to obtain data in this process may be that the data is read from a memory card set in a memory card slot (not shown), or is read from a certain memory area within the memory unit 16. In this case, a message prompting the user to specify the memory area to be the data source is shown in the display 52.

After the input data is transmitted to the function server 30, the setting of the input device modified by the process in S428 is returned to the original values (S430), and subsequently, the service status information returned from the function server 30 is received (S432).

Then, after the service information is received in S432, or if it has been determined in S412 and S422 that the session process issued a termination instruction (S412: YES, S422: YES), the busy flag Fi, which is set in S406, is released (S434). Then, the notification of the termination of the input job to the session process is issued with a job ID assigned in S260 in the session process (S436), and the current input job is terminated. The notification of this input job termination is received during the process in the foregoing S218. By receiving this instruction, it is determined in S218 that the job has been completely terminated and the following procedures are executed.

(2-5) Output Job

Figure 8A:
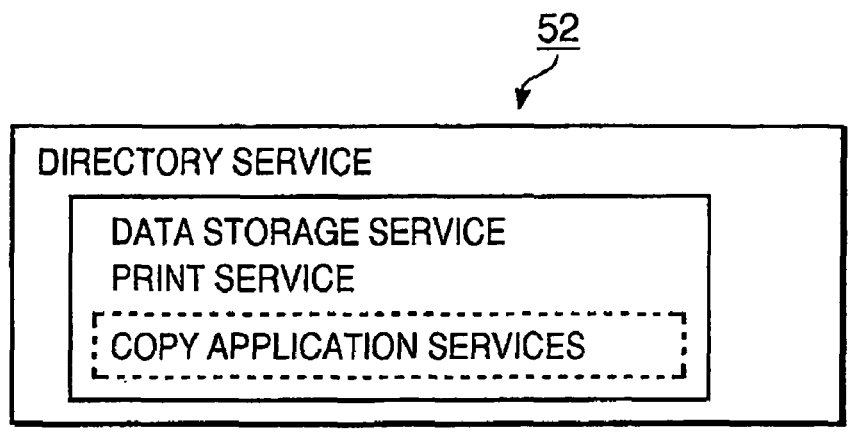
FIGS. 8A-8C are diagrams showing service selection screens in accordance with aspects of the present invention.
Figure 8B:
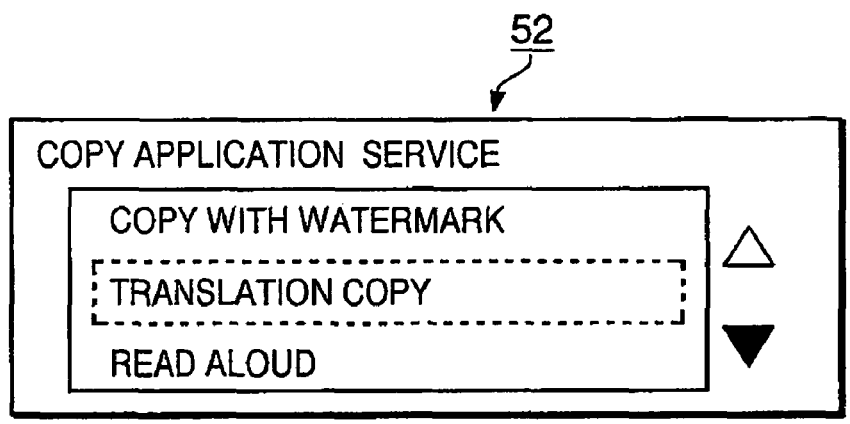
Figure 8C:
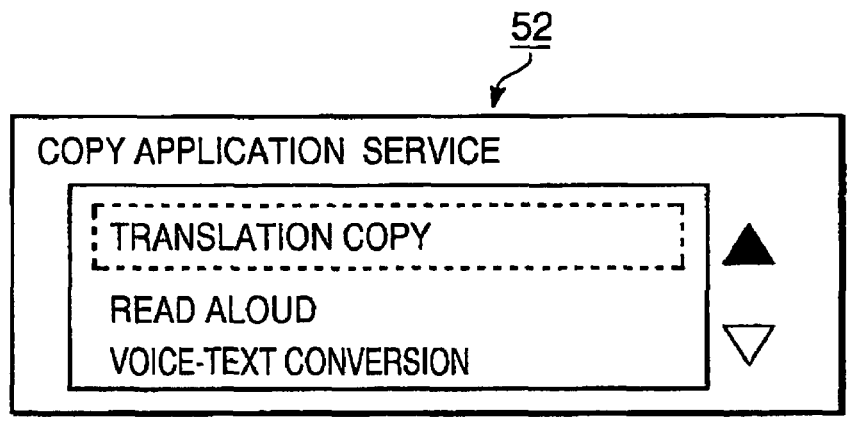

Referring to FIGS. 8A-8C, the output job process activated in S266 (see FIG. 11) is explained in detail. The output job is executed in parallel with the foregoing session process and the UI job.

When the output job is started, the process judges whether the output device is busy (S502). If the output device is determined to be busy the busy flag Fo is set (set to "1"), and is determined to be not busy when the flag is off (set to "0"). Here, the "output device" refers to the recording unit 14, when the recording unit 14 receives the service related to the image data printed by the recording unit 14, and refers to the sound output unit 18, when the sound output unit 18 receives the service related to the sound data output from the sound output unit 18.

In S502, if the output device is busy (S502: YES), the process returns to S502, after waiting until the output device is released from its busy state (S504). If the output device is determined to be not busy (S502: NO), the busy flag Fo is set (S506).

In S508, the MFP status information, related to the MFP 10 status, is transmitted as an HTTP request to the function server 30, with a job ID assigned in S266 in the session process (S508). The function server 30, which received the MFP status information, returns an MFP parameter, which is information based on the parameter transmitted to the function server 30 in S312 (see FIG. 12) after being stored in the transmission data storage area in S320, as an HTTP response.

In S510, after the MFP parameter is returned in response to the MFP status information transmitted in S508, the process judges whether a termination instruction has been issued from the session process (S512). This termination instruction is issued from the session process to the current output job when the job to be terminated in S218 (see FIG. 10) is an output job.

In S512, the session process has not received the termination instruction (S512: NO), and if the MFP parameter returned in S510 has not been received normally (S514: NO), the MFP reception status to indicate that the information from the function server 30 is not received normally (i.e., a reception error) is sent to the function server 30 as an HTTP request (S516), with a job ID assigned in S266 in the session process. The function server 30, which received the MFP reception status, sends the MFP parameter again, and the process returns to S510 after notifying the function server 30 of the reception error in S516.

If the MFP parameter is received normally (S514: YES), the MFP reception status for indicating that the information from the function server 30 was received normally (i.e., a normal reception) is sent to the function server 30 as an HTTP request (S518), with a job ID assigned in S266 in the session process. The function server 30, which received the MFP reception status, returns output data generated by the process based on the input data transmitted in S428 (see FIG. 17).

In S520, after the output data is returned from the function server 30, which received the MFP reception status, the process judges whether the session process has received a termination instruction (S522), similarly to S512.

In S522, if the session process has not issued the termination instruction (S522: NO), the MFP reception status indicates a reception error is sent to the function server 30 (S526), similarly to S516, if the output data returned in S520 is not received normally (S524: NO). The function server 30, which received the MFP reception status, sends output data again, and the process returns to S520 after notifying the function server 30 of the reception error in S526.

If the output data returned in S520 has been received normally (S524: YES), the output data is output through the output device (S528).

Here, after the values of the output device is modified to the MFP parameter received in S510, the output data is output through the output device (for example, printing of image represented by the image data, or voice represented by sound data).

After output of output data by the output device is completed, the setting of the output device modified by the process in S528 is returned to the original values (S530), and the MFP status information, which is information related to the MFP 10 status, is sent to the function server 30 as an HTTP request (S532), with a job ID assigned in S260 in the session process. The function server 30, which received the MFP status information, returns service status information.

After service status information returned from the function server 30 is received (S534), or it has been determined that the session process issued a termination instruction in S512 and S522 (S512: YES, S522: YES), the busy flag Fo set in S506 is released (S536). Then, the notification of the termination of the input job to the session process is issued with a job ID assigned in S260 in the session process (S538), and the current output job is completed. The notification of this output job termination is received during the process in the foregoing S218. By receiving this instruction, it is determined in S218 that the job has been completely terminated and the following procedures are executed.

(3) Process by the Function Server 30

Each process performed by the control unit 31 of the function server 30 will be described below.

(3-1) Function Server Process

Figure 19:
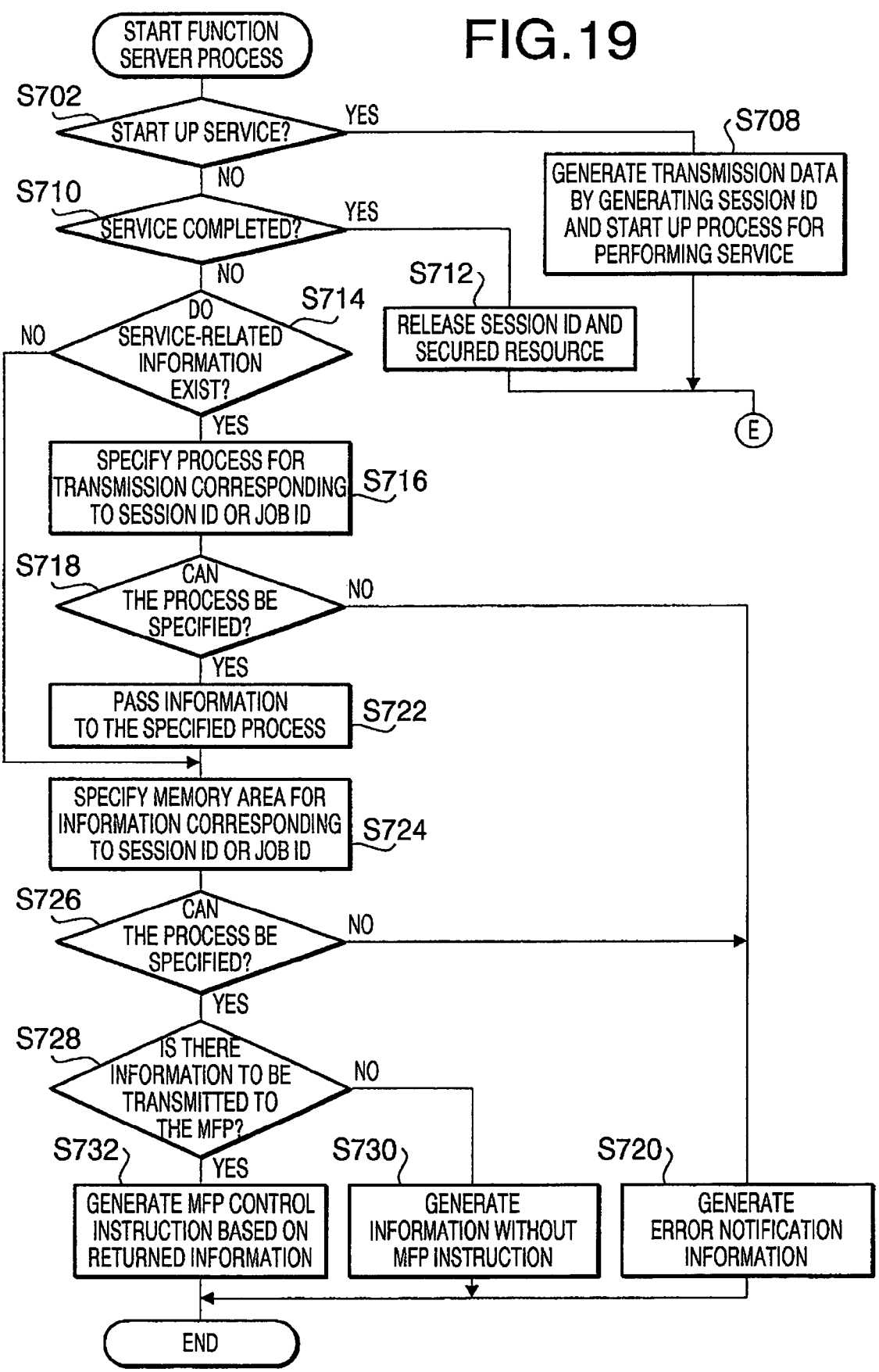
FIGS. 19 and 20 show a flowchart illustrating a function server process performed by a function server in accordance with aspects of the present invention.
Figure 20:
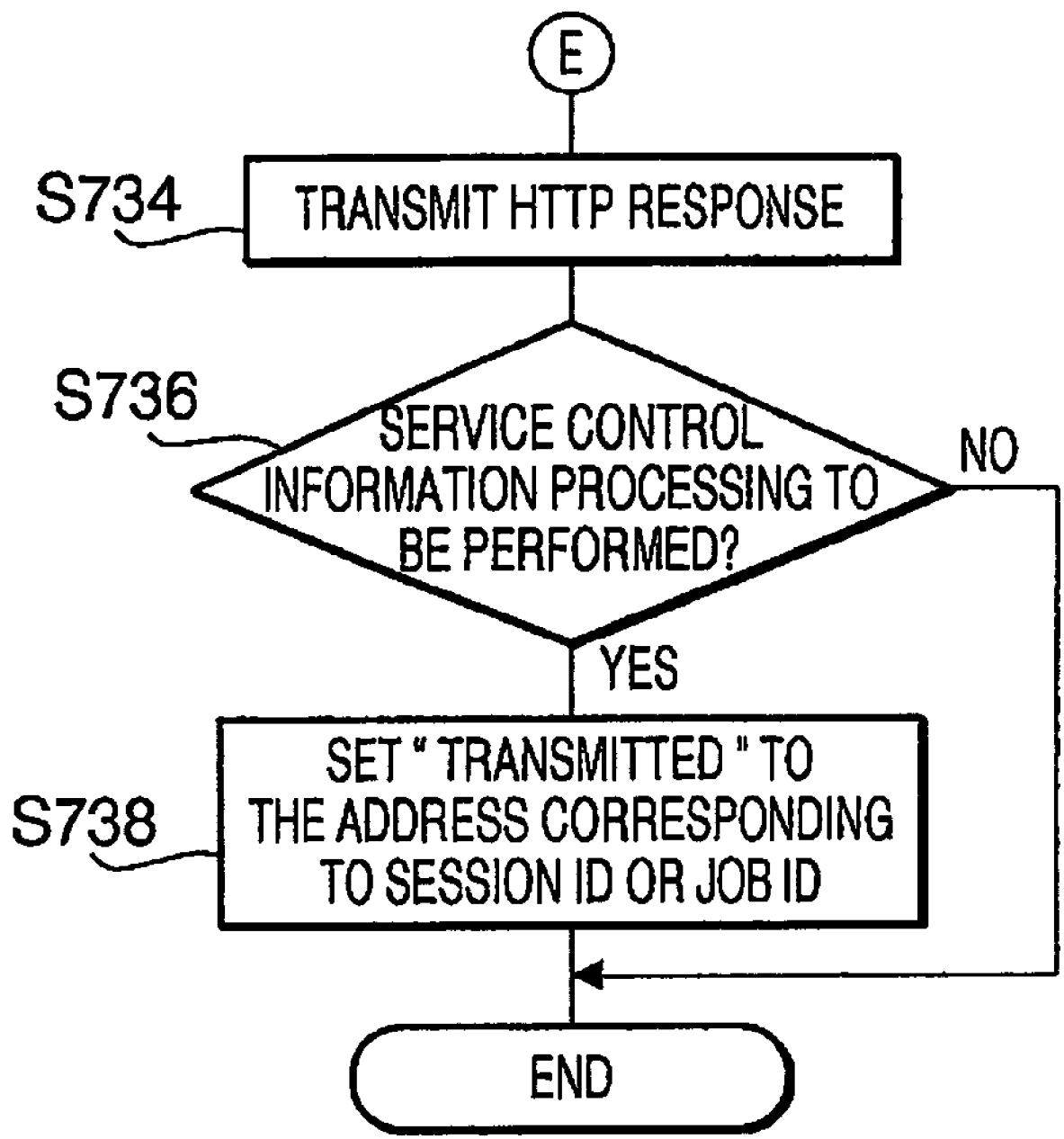

Referring to FIGS. 19 and 20, the procedures of the function server performed every time an HTTP request is received will be described.

When the function server process is activated, the process judges whether the received HTTP request is a service activation instruction (S702). This "service activation instruction" is transmitted by the MFP 10 in S202 (see FIG. 10).

In S702, if the request is a service activation instruction (S702: YES), a session ID is generated, transmission data showing this session ID is generated, resources to execute the service are reserved, and the relevant process is activated (S708). Then, the process proceeds to S734. The process activated here refers to a session process (see FIG. 21), which will be described hereinbelow.

In S702, if the request is determined not to be a service activation instruction (S702: NO), the process judges whether the HTTP request is a service termination instruction (S710). This "service termination instruction" is transmitted from the MFP 10 by instructing the termination of the service operation by, for example, pressing the cancel key 51 on the MFP 10.

In S710, if the request is determined to be a service termination instruction (S710: YES), the session ID and the resources reserved in S708 are released and the process proceeds to S734 after creating transmission data indicating the service termination (S712). If the instruction is determined not to be a service termination instruction (S710: NO), the process judges whether the information related to the service (i.e., session or job) is included, or more specifically, whether it is an HTTP request transmitted by the MFP 10 during the session process or the job (any one of the UI job, the input job, and the output job) (S714).

In S714, if the service-related information is included (S714: YES), the process to transmit this HTTP request (any one of the session process, the UI job, the input job, and the output job) is specified (S716).

In S718, if the process is not specified (S718: NO), the process proceeds to S734 after generating information to indicate an error (i.e., an error notification information).

If the process can be specified in S716 (S718: YES), the information transmitted as an HTTP request is passed to the specified process (S722).

After S722, or if it has been determined in S714 that the service-related information is not included (S714: NO), the memory area for the information corresponding to the session ID or the job ID is specified (S724).

If the memory area is not specified in S724 (S726: NO), the process proceeds to S720, generates an error notification information, and proceeds to the S734. If the memory area can be specified (S726: YES), the process judges whether the information, which should be returned to the MFP 10, exists within the memory area (S728).

In S728, if it has been determined that no information that should be returned to the MFP 10 exists (S728: NO), the process proceeds to S734, after information stating "no instruction" is generated in S730. If it has been determined that information exists that should be returned to the MFP 10 (S728: YES), the process proceeds to S734 after an MFP control instruction is generated based on the returned information (S732).

Thus, the information generated through S708, S712, S720, S730, and S732 is returned to the MFP 10 as an HTTP response. Here, the data generated in S708 as an HTP response is received by the MFP 10 in S208 (see FIG. 10). The data generated in S712 indicating a service termination, is received by the MFP 10 in S208 (see FIG. 10), and is to be determined as "YES" in S222. Furthermore, an error notification generated in S720 is received by the MFP 10 in S208, is determined as "NO" in S222, and the process in S224 is executed accordingly. Still further, "no instruction" information generated in S730 is received by the MFP 10 in S208, and is determined as "YES" in S220. And, the MFP control instruction generated in S732 will have different contents in each job, which will be described hereinbelow, and is received by the MFP 10 during a corresponding job, respectively.

If a service control information process, which is from S714 to S732, is executed, or in other words, if it has been determined as "NO" in S710 (S736: YES), the current function server process is terminated, after the memory address corresponding to the session ID or the job ID (S738) is set as "transmission completed". If the service control information process has not been executed (S736: NO), the current function server process is terminated without setting the memory address. This service control information process refers to an information transfer process in a session or a job between the MFP 10 and the function server 30, described in S714 to S732.

(3-2) Session Process

Figure 21:
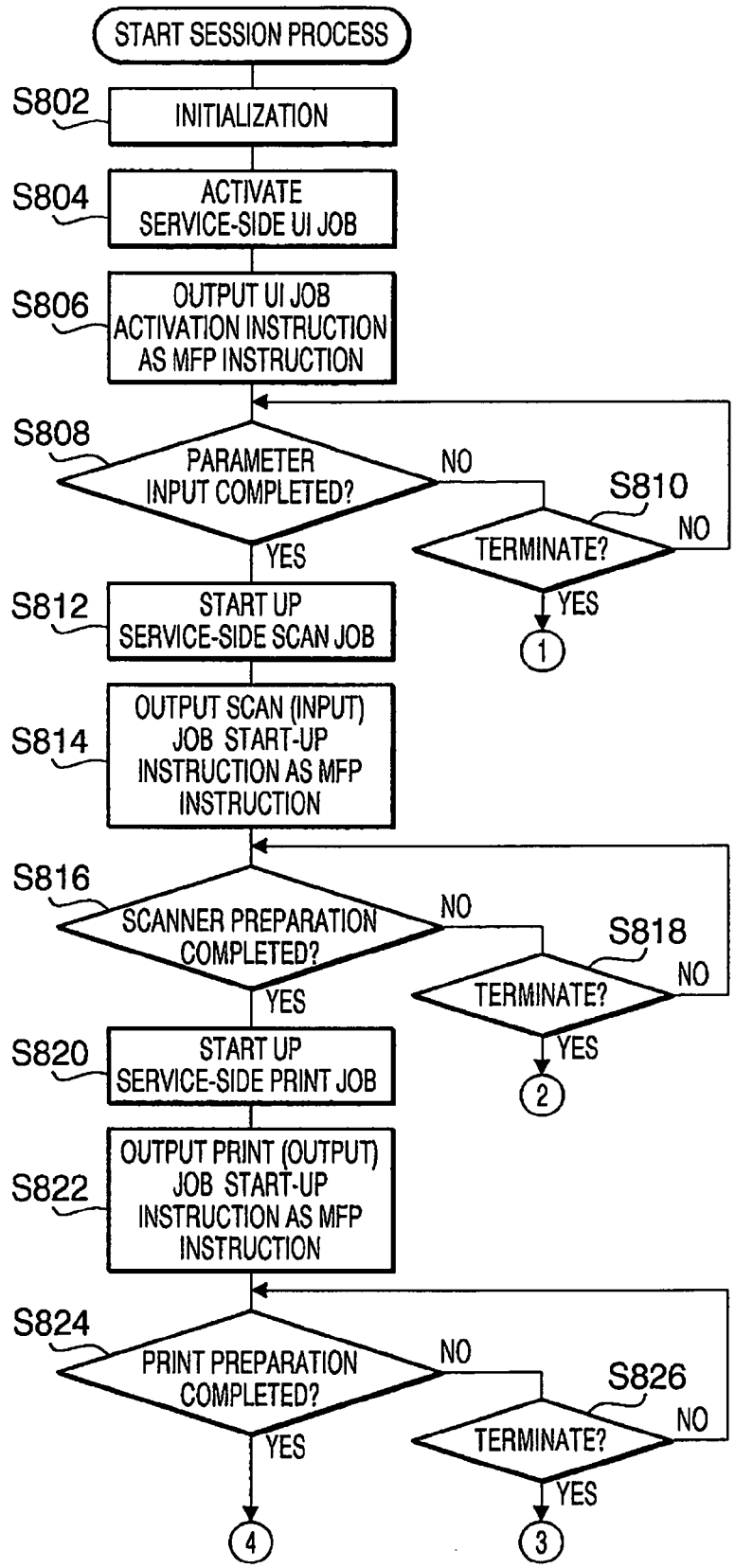
FIGS. 21 and 22 show a flowchart illustrating a session process performed by the function server in accordance with aspects of the present invention.
Figure 22:
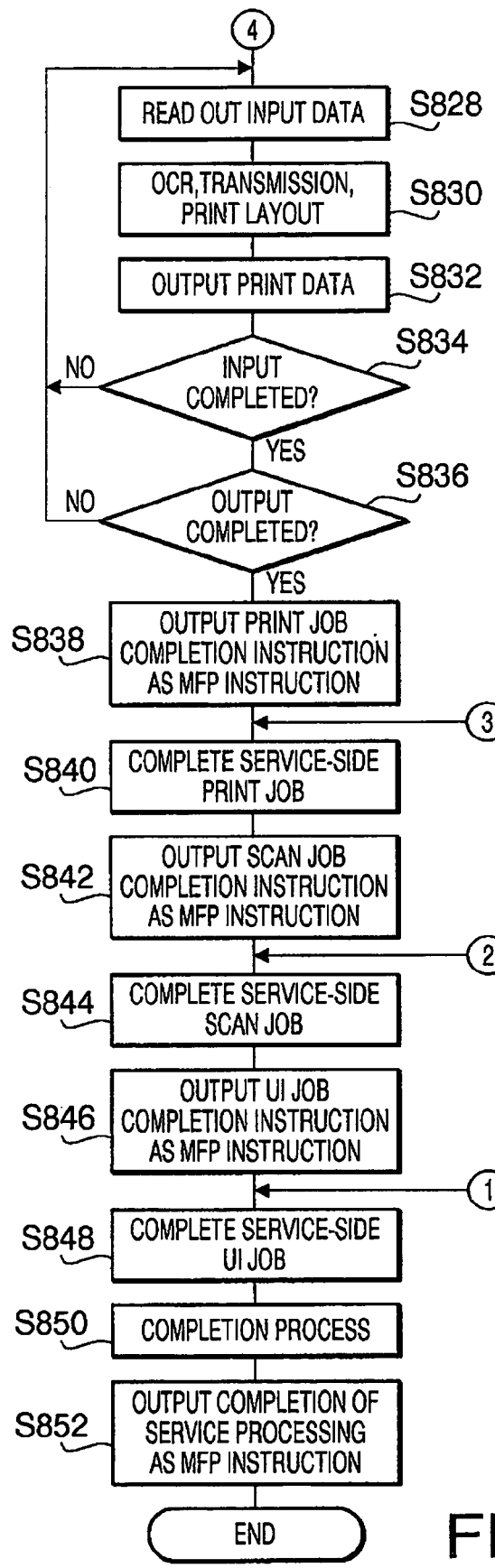

Referring to FIGS. 21 and 22, a session process, which is executed in parallel with the function server process will be explained. In the present illustrative embodiment, a session process regarding a translation copy service will be described as an example.

When a session process is started, an initialization process is executed (S802). Next, a UI job on the service is activated (S804). This UI job is a process executed in parallel with the current session process, which will be described in detail hereinbelow.

In S806, a UI job activation instruction is output as an MFP instruction. Here, a process is executed to write the UI job activation instruction in the memory area, in which return information is stored, as well as the job ID and the destination address for communication. Based on the written information, the MFP control instruction is generated in S732 (see FIG. 19), and transmitted as an activation instruction to the MFP 10 in S734 (see FIG. 20). This activation instruction is received on the MFP 10 in S208 (see FIG. 10), and based on this, the UI job is activated on the MFP 10 (S254).

Next, in S808, the process judges whether a parameter input from the MFP 10 has been completed. As explained below, in the UI job activated in S804, the parameter is obtained from the MFP 10, and it is notified to the current session process. If there is no notification of the parameter acquisition from the UI job, it is determined that the parameter input from the MFP 10 has been completed.

In S808, if the parameter input is not completed (S808: NO), the process judges whether the UI job was terminated (S810). As explained below, in the UI job activated in S804, if acquisition of the parameter from the MFP 10 was not executed normally, the UI job itself is terminated (completed), and it is notified to the current session process. Therefore, if notification of termination is issued from the UI job in S810, it is determined that the UI job is terminated.

In S810, if the UI job is determined not to be terminated (S810: NO), the process returns to S808. If it is determined that the UI job is terminated (S810: YES), the process proceeds to S848.

In S808, if the parameter input is completed (S808: YES), a scan job, which is a type of an input job on the service, is activated (S812). This scan job is a process executed in parallel with the current session process, which will be described in detail hereinbelow.

Next, the scan (input) job activation instruction is output as an MFP instruction (S814). Here, a process is executed to write the scan job activation instruction in the memory area, in which return information is stored, as well as the job ID and the destination address for communication. Based on the written information, the MFP control instruction is generated in S732 (see FIG. 19), and transmitted as an activation instruction to the MFP 10 in S734 (see FIG. 20). This activation instruction is received on the MFP 10 in S208 (see FIG. 10), and based on this, the input job is activated on the MFP 10.

Next, in S816, the process judges whether preparation of the scanner (i.e., the reading unit 13) on the MFP 10 is completed. In the scan job activated in S812, a notification of the completion of the scanner preparation on the MFP 10 is received, and it is notified to the current session process. Therefore, in S816, if notification of the completion of the scanner preparation is issued from the scan job, it is determined that the scanner preparation on the MFP 10 has been completed.

In S816, if it has been determined that the scanner preparation is not completed on the MFP 10 (S816: NO), the process judges whether the scan job is terminated (S818). In the scan job activated in S812, if notification that the scanner preparation has been completed on the MFP 10 cannot be received normally, the scan job itself is terminated (completed), and it is notified to the current session process. Therefore, in S818, if notification of termination is issued from the scan job, it is determined that the scan job is terminated.

In S818, if the scan job is not terminated (S818: NO), the process returns to S816. If the scan job has been terminated (S818: YES), the process proceeds to S844.

In S816, if the scanner preparation is completed (S816: YES), a print job, which is a type of an output job of the service, is activated (S820). This print job is a process executed in parallel with the current session process, which will be described in detail hereinbelow.

Next, the print (output) job activation instruction is output as an MFP instruction (S822). Here, a process is executed to write the print job activation instruction in the memory area, in which return information is stored, as well as the job ID and the destination address for communication. Based on the written information, the MFP control instruction is generated in S732 (see FIG. 19), and transmitted as an activation instruction to the MFP 10 in S734 (see FIG. 20). This activation instruction is received on the MFP 10 in S208 (see FIG. 10), and based on this, the output job is activated on the MFP 10 in S266 (see FIG. 11).

Next, in S824, the process judges whether preparation of the printer (i.e., the reading unit 13) on the MFP 10 is completed. In the print job activated in S820, a notification of the completion of the print preparation on the MFP 10 is received, and it is notified to the current session process. Therefore, in S824, if notification of the completion of the print preparation is issued from the scan job, it is determined that the print preparation on the MFP 10 has been completed.

In S824, if it has been determined that the print preparation is not completed on the MFP 10 (S824: NO), the process judges whether the print job is terminated (S826). In the print job activated in S820, if indication that the print preparation has been completed on the MFP 10 cannot be received normally, the print job itself is terminated (completed), and it is notified to the current session process. Therefore, in S826, if notification of termination is issued from the print job, it is determined that the print job is terminated.

In S826, if the print job is not terminated (S826: NO), the process returns to S824. If the print job has been terminated (S826: YES), the process proceeds to S840.

In S824, if the print preparation is completed (S824: YES), input data acquired from the MFP 10 is read (S828). If the scan job activated in S812, as the image data read by the reading unit 13 in the MFP 10 is adapted to be acquired from the MFP 10, in S828, a data area equivalent to one page, out of the data (input data) reserved and stored within the predetermined memory area, is read.

Next, in S830, image data is generated through a process such as OCR, translation, and print layout based on the input data read in S828. Here, the text part within the image in the input data is recognized by performing an OCR process on the input data scanned in S828.

Then, the text part is converted to text represented in a designated language by executing a translation process to this text part. This translation process is executed according to the parameter obtained in the UI job activated in S804, and data is converted to the language indicated in this parameter. Then, image data for printing is generated by setting the designated print layout with regards to the text part recognized.

Next, the image data generated in S830 is output (S832). Here, a process is executed to write the image data generated in S830 in the memory area, as well as the job ID and the destination address for communication. Based on the written data, a print command adapted for the MFP 10 is created in S1120, in FIG. 25, and transmitted to the MFP 10.

Subsequently, the process judges whether reading of all input data in S828 (data area for all pages) has been completed (S824). If it has not been completed (S834: NO), the process returns to S828. If it has been completed (S834: YES), the process judges whether output of the output data in S832 (writing in the memory area) has been completed (S836).

If output of the output data is not completed in S836 (S836: NO), the process returns to S828. If the output has been completed (S836: YES), a print (output) job termination instruction is output as an MFP instruction (S838). Here, a process is executed to write the print job termination instruction in the memory area, in which return information is stored, as well as the job ID. Based on the written information, the MFP control instruction is generated in S732, and is transmitted to the MFP 10 as a termination instruction in S734 (see FIG. 20). This termination instruction is received on the MFP 10 in S208 (see FIG. 10I, and based on this, the output job is terminated (completed) on the MFP 10 (S218).

After the print job termination instruction is output, or it has been determined in S826 that the print job has been terminated (S826: YES), the print job on the service activated in S820 is terminated (S840).

Next, a scan (input) job termination instruction is output as an MFP instruction (S842). Here, a process is executed to write the scan job termination instruction in the memory area, in which return information is stored, as well as the job ID. Based on the written information, the MFP control instruction is generated in S732 (see FIG. 19), and transmitted to the MFP 10 as a termination instruction in S734 (see FIG. 20). This completion instruction is received on the MFP 10 in S208 (see FIG. 10), and based on this, the input job is terminated (completed) on the MFP 10 (S218).

After the scan job termination instruction is output, or it has been determined in S818 that the scan job has been terminated (S818: YES), the scan job on the service activated in S812 is terminated (S844).

Next, a UI job termination instruction is output as an MFP instruction (S846). Here, a process is executed to write the scan job termination instruction in the memory area, in which return information is stored, as well as the job ID. Based on the written information, the MFP control instruction is generated in S732 (see FIG. 19), and transmitted to the MFP 10 as a termination instruction in S734 (see FIG. 20). This termination instruction is received by the MFP 10 in S208 (see FIG. 10), and based on this, the UI job is terminated (completed) on the MFP 10 (S218).

After the UI job termination instruction has been output, or it has been determined that the parameter input has been terminated in S810 (S810: YES), the UI job on the service activated in S804 is terminated (S848).

Then, after a completion process including releasing resources reserved in each job has been executed (S850), a service termination instruction is output as an MFP instruction (S852) and the current session process is completed.

In S852, a process is executed to write the service termination instruction in the memory area, in which return information is stored. Based on the written information, the MFP control instruction is generated in S732, (see FIG. 19), and transmitted to the MFP 10 as a termination instruction in S734 (see FIG. 20). This termination instruction is received by the MFP 10 in S208 (see FIG. 10), and based on this, the session process on the MFP 10 is terminated (S222).

(3-3) UI Job

Figure 23:
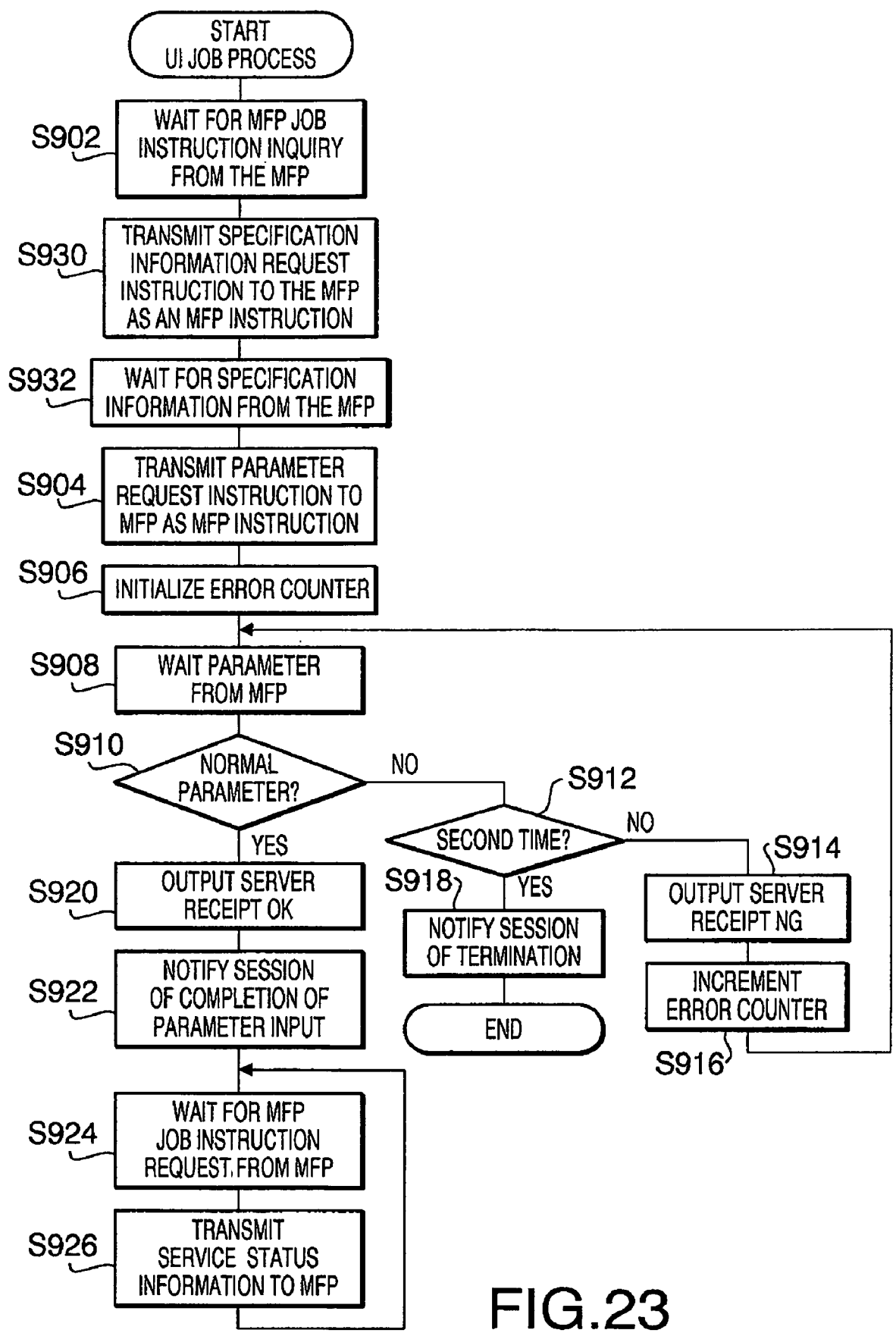
FIG. 23 is a flowchart showing a UI job performed by the function server in accordance with aspects of the present invention.

Referring to FIG. 23, a UI job process, which is activated in S804 (see FIG. 21), will be described.

When the UI job is started, the process waits until an MFP job instruction inquiry is received from the MFP 10 (S902). Then, a specification information request requesting information on the specifications of the MFP 10 is returned to MFP 10 as an HTTP response (S930). This specification information request is received from the MFP 10 by the process in S314 (see FIG. 12), and the MFP 10, which received this request, transmits the specification information through the process in S320.

After the specification information request has been returned, the process waits for transmission of the specification information from the MFP 10 as an HTTP request. After the specification information transmitted has been received (S932), a parameter request instruction requesting a parameter setting necessary to execute the service is returned to the MFP 10 as an MFP instruction (S904). The "MFP job instruction inquiry" received in S902 is an HTTP request transmitted from the MFP 10 in S312 (see FIG. 12). The MFP instruction transmitted in S904 is an HTTP response received by the MFP 10 in S314, to which the service I/F information 36 (for example, a translation copy service) is added. The MFP 10, which has received this MFP instruction, stores the parameter in the transmission data storage area in S316 through S320 and transmits the parameter as an HTTP response in S312.

Next, the error count is initialized (S906). Here, a counter for counting the occurrence when a parameter cannot be normally received is reset (set to "0").

Next, after waiting for the parameter to be transmitted from the MFP 10, which has received the MFP instruction transmitted in S904, and receiving the parameter (S908), the process judges whether the parameter has been received normally (S910).

In S910, if the parameter cannot be received normally (S910: NO), the process judges whether this has occurred consecutively for a predetermined number of times (e.g., twice), based on the counter value of the error count (S912). If the parameter has not been received normally for the predetermined number of times (S912: NO), a server reception status indicating that the parameter could not be received normally (server reception failed; i.e., a reception error) is output (S914), and after the error count is incremented (S916), the process returns to S908. In S914, a process is executed to write the server reception status in the memory area, in which return information is stored. Based on the written information, an MFP control instruction is generated in S732 (see FIG. 19), and transmitted as the server reception status to the MFP 10 in S734 (see FIG. 20). This server reception status is received by the MFP 10 in S314 (see FIG. 12), and based on this, the parameter is re-transmitted in the MFP 10 (S334, S336, and S312).

In S912, if the parameter cannot be received normally for the predetermined number of times consecutively (S912: YES), the current UI job is terminated after the session process is notified of the UI job termination (completion) (S918). This notification in S918 is received by the session process in S810 (see FIG. 21).

In S910, if the parameter can be received normally (S910: YES), the server reception status indicating that the parameter was received normally (server reception successful; a normal reception) is output (S920). Here, a process is executed to write the service reception instruction in the memory area, in which return information is stored. Based on the written information, an MFP control instruction is generated in S732 (see FIG. 19), and is transmitted to the MFP 10 as a server reception status in S734 (see FIG. 20). This server reception status is received by the MFP 10 in S314 (see FIG. 12), and based on this, it is verified that the parameter does not have to be re-sent by the MFP 10 (S334).

Next, the session process is notified of the termination of the parameter input (parameter acquisition) (S922). This notification is received by the session process in S808 (see FIG. 21).

Then, after S922, the process waits until the MFP job instruction inquiry is received from the MFP 10. When this MFP job instruction inquiry is received (S924), the service status information is output (S926) repeatedly until the current UI job is terminated (completed) by another process (for example, S846 in FIG. 22). In S926, a process is executed to write the service status information in the memory area, in which return information is stored. Based on the written information, an MFP control instruction is generated in S732 (see FIG. 19), and transmitted to the MFP 10 in S734 (see FIG. 20), as service status information.

(3-4) Scan Job

Figure 24:
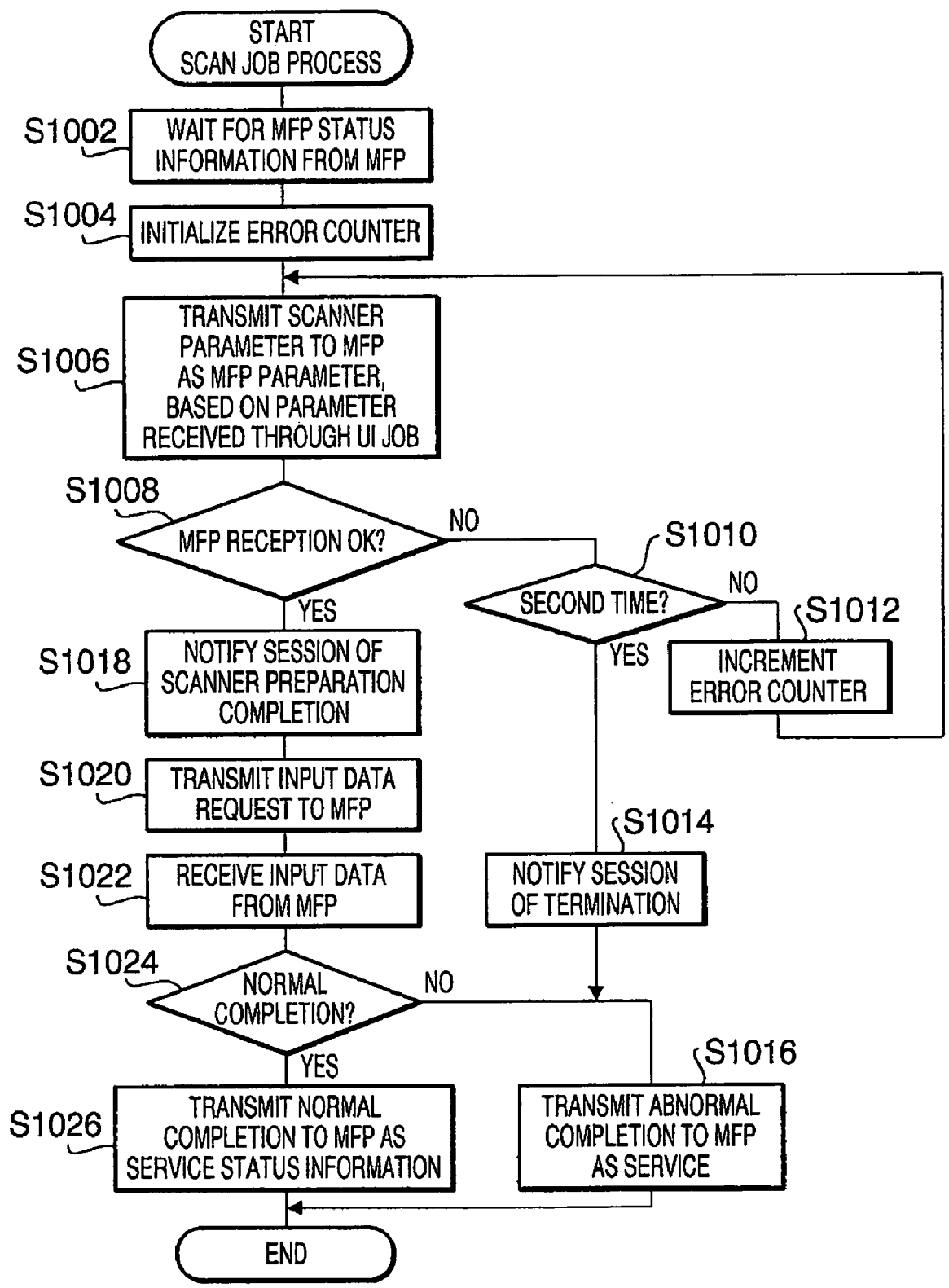
FIG. 24 is a flowchart showing a scanning job performed by the function server in accordance with aspects of the present invention.

Referring to FIG. 24, a scan job process, which is activated in S812 (see FIG. 21), will be described.

When scan job is started, the process waits until the MFP status information is received from the MFP 10. When this MFP status information is received (S1002), after the error count has been initialized (S1004), the MFP parameter is output (S1006). The MFP status information received in S1002 is an HTTP request transmitted from the MFP 10 in S408 (see FIG. 17), and the MFP parameter is returned as an HTTP response in S1006. This MFP parameter has been received in S908 (see FIG. 23), and is the parameter corresponding to the MFP 10, which is the transmission source of the MOP status information received in S1002.

The MFP reception status indicating whether the process judges that the MFP parameter was received normally is transmitted from the MFP 10, which received the MFP parameter (S1008). Specifically, if the MFP reception status indicates a reception error, it is determined that reception cannot be executed normally, and if normal reception is indicated, it is determined that the reception can be executed normally.

In S1008, if the MFP parameter cannot be received normally by the MFP 10 (S1008: NO), the process judges whether the reception failure has occurred consecutively for a predetermined number of times (e.g., twice), based on the counter value of the error count (S1010). If it has not occurred consecutively for the predetermined number of times (S1010: NO), the process returns to S1006 after the error count is incremented (S1012).

In S1010, if the parameter cannot be received normally for the predetermined number of times consecutively (S1010: YES), a notification instruction is output as service status information to indicate the abnormal termination (S1016), after notifying the session process of the scan job termination (completion) (S1014). This notification in S1014 is received by the session process in S818 (see FIG. 21).

In S1016, a process is executed to write the notification instruction in the memory area, in which return information is stored. Based on the written information, an MFP control instruction is generated in S732 (see FIG. 19), and transmitted as a notification instruction to the MFP 10 in S734 (see FIG. 20). This notification instruction is received by the MFP 10 in S410 (see FIG. 17). As notification of information based on the instruction received by session in S1014 (see FIG. 29) passed from S818 (see FIG. 24) is passed by the function server 30, this instruction is determined to be completed in the MFP 10 in S412 (see FIG. 20) (S412: YES).

In S1008, if the MFP parameter has been received normally by the MFP 10 (S1008: YES), it is determined that scanner (i.e., the reading unit 13) preparation has been completed on the MFP 10 with the reception of the MFP parameter, and the session process is notified of the scanner preparation completion. This notification is received by the session process in S816 (see FIG. 21).

Next, an input data request requesting the transmission of data to be processed by the function server 30 is output (S1018). Here, a process is executed to write the input data request in the memory area in which return information is stored (S1020). Based on the written information, an MFP control instruction is generated in S732 (see FIG. 19), and transmitted to the MFP 10 as an input data request in S734 (see FIG. 20). This input data request is received by the MFP 10 in S420 (see FIG. 17), and with this input data request received, an operation by the user is received and input data is transmitted.

When the input data from the MFP 10, which received the input data request, is received (S1022), if the reception of this input data is completed normally (S1024: YES), the current scan job is completed after a notification instruction indicating a normal completion is output as service status information (S1026). In S1026, a process is executed to write the notification instruction in the memory area in which return information is stored. Based on the written information, an MFP control instruction is generated in S732 (see FIG. 19) and transmitted as a notification instruction to the MFP 10 in S734 (see FIG. 20). This notification instruction is received by the MFP 10 in S432 (see FIG. 17).

If the input data reception is not completed normally (S1024: NO), the process proceeds to S1016, and terminates the current scan job after a notification instruction indicating an error termination is output as service status information. This notification instruction is received by the MFP 10 in S432 (see FIG. 17).

(3-5) Print Job

Figure 25:
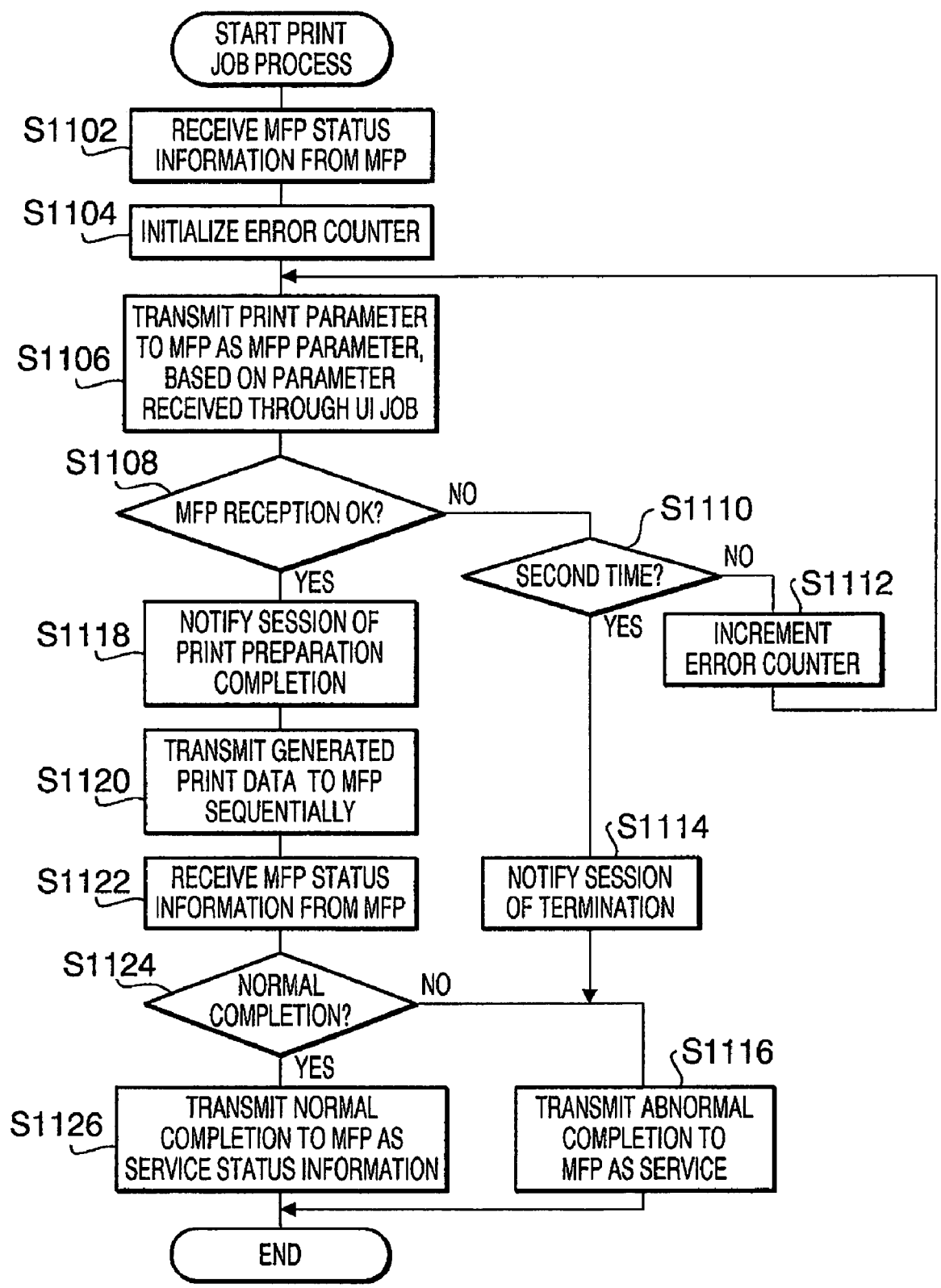
FIG. 25 is a flowchart showing a printing job performed by the function server in accordance with aspects of the present invention.

Referring to FIG. 25, a print job process, which is activated in S820 (see FIG. 21) will be described.

When the print job is started, the process waits until MFP status information is received from the MFP 10. When this MFP status information is received (S1102), the MFP parameter is output (S1106), after the error count is initialized (S1104). The MFP status information received in S1102 is an HTTP request transmitted from the MFP 10 in S508 (see FIG. 18), and the MFP parameter is returned as an HTTP response in S1106. This MFP parameter is received in S908 (see FIG. 23), and is the parameter corresponding to the MFP 10, which is the transmission source of the MAP status information received in S1102.

The MFP reception status indicating whether the process judges that the MFP parameter was received normally is transmitted from the MFP 10 which received this MFP parameter (S1108), as in S1008 (see FIG. 24).

In S1108, if the MFP parameter cannot be received normally by the MFP 10 (S1108: NO), the process judges whether this has occurred consecutively for a predetermined number of times (e.g., twice) based on the counter value of the error count (S1110). If it has not occurred consecutively for the predetermined number of times (S1110: NO), the process returns to S1106 after the error count is incremented (S1112).

If the parameter cannot be received normally for a predetermined number of times in S1110 (S1110: YES), a notification instruction indicating an error termination is output as service status information (S1116) after notifying the session process of the print job termination (completion) (S1114). This notification in S1114 is received by the session process in S826 (see FIG. 21).

In S1116, a process is executed to write the notification instruction in the memory area, in which return information is stored. Based on the written information, an MFP control instruction is generated in S732 (see FIG. 19) and transmitted as a notification instruction to the MFP 10 in S734 (see FIG. 20). This notification instruction is received by the MFP 10 in S510 (see FIG. 18). As notification of the information based on the instruction received in S826 (see FIG. 21), issued in S1114 (see FIG. 25), is passed by the function server 30 in S852 (in FIG. 21), this instruction is determined to be completed in MFP 10 in S512 (see FIG. 18) (S512: YES).

In S1108, if the MFP parameter has been received normally by the MFP 10 (S1108: YES), it is determined that the print (i.e., the recording unit 14) preparation has been completed for the MFP 10 with the reception of the MFP parameter, and the session process is notified of the print preparation completion (S1118). This notification is received by the session process in S824 (see FIG. 21). In the session process, S828 through S836 (see FIG. 22) is performed, and the print data is generated upon receiving this notification.

Next, a process is executed to write data generated in the session process to the memory area in which return information is stored (S1120), the data having been converted into print data (S832 in FIG. 22), to enable the process executed by the MFP 10. Here, the process is executed to issue a print command, which can be output by the MFP 10, based on the image data written in the memory area in S832 (see FIG. 22), and to write the print command to the memory area, in which return information is stored, as well as the job ID and the destination address for communication. Based on the written information, an MFP control instruction is generated in S732 (see FIG. 19), and transmitted to the MFP 10 as output data in S734 (see FIG. 20). This output data is received by the MFP 10 in S520 (see FIG. 18), and based on this, recording (i.e., printing) of the image represented by the output data is executed by the recording unit 14.

Figure 18:
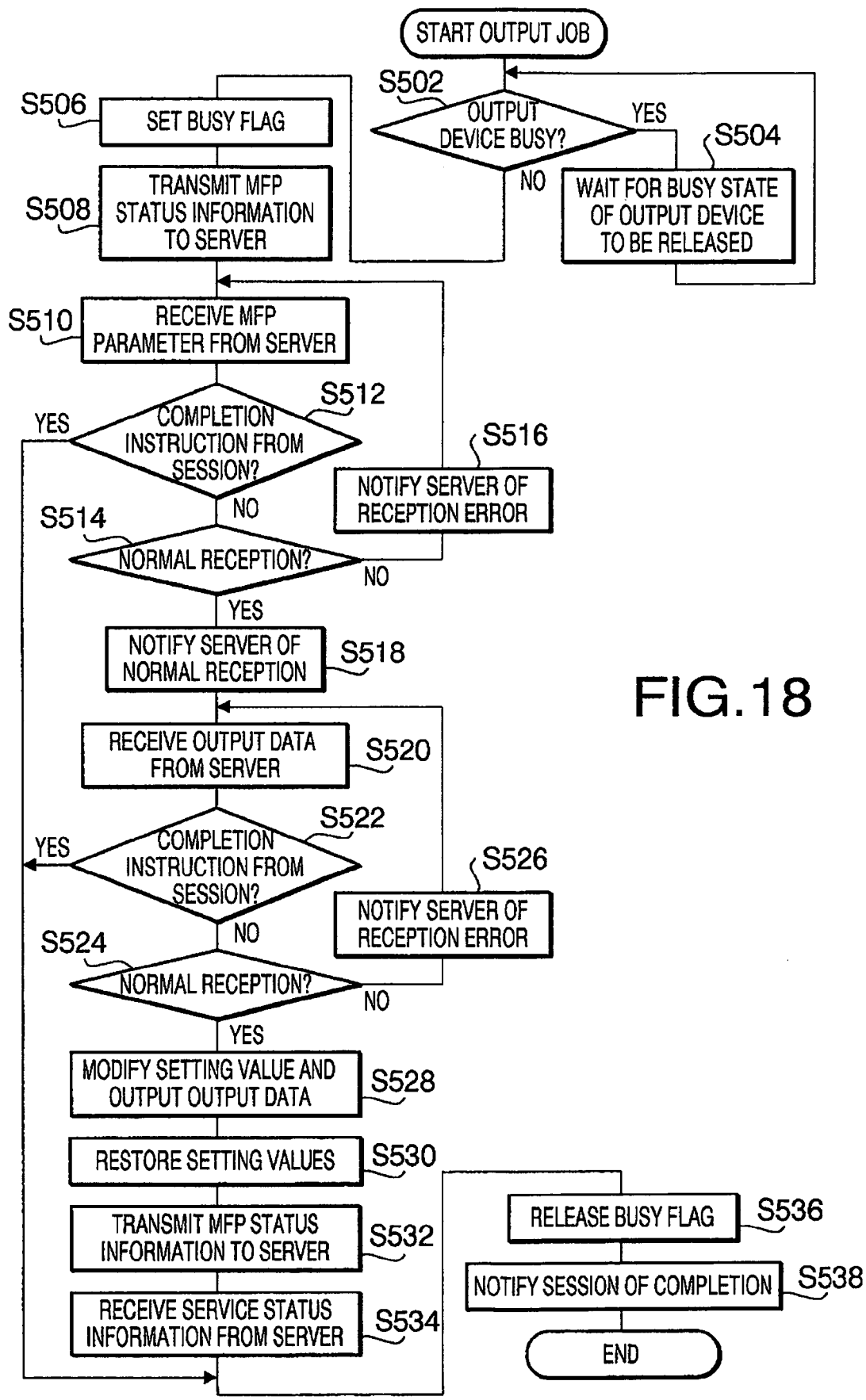
FIG. 18 is a flowchart showing an output job performed by the MFP in accordance with aspects of the present invention.

The MFP 10, which has received the transmitted print data, transmits MFP status information as an HTTP request in S532 (see FIG. 18).

When the MFP status information is received from the MFP 10, which had received the print data (S1122), if the reception of this MFP status information has been completed normally (S1124: YES), the current print job is completed after a notification instruction to notify of a normal completion is output as service status information (S1126). In S1126, a process is executed to write the notification instruction in the memory area in which return information is stored. Based on the written information, an MFP control instruction is generated in S732 (see FIG. 21) and transmitted to the MFP 10 as a notification instruction in S734 (see FIG. 20). This notification instruction is received by the MFP 10 in S532 (see FIG. 18).

If the reception of the MFP status information is not completed normally (S1124: NO), the process proceeds to S1116, and the current print job is terminated, after a notification indicating an error termination is output as service status information. This notification instruction is received by MFP 10 in S534 (see FIG. 18).

(3-6) Information Conversion Process

Figure 26:
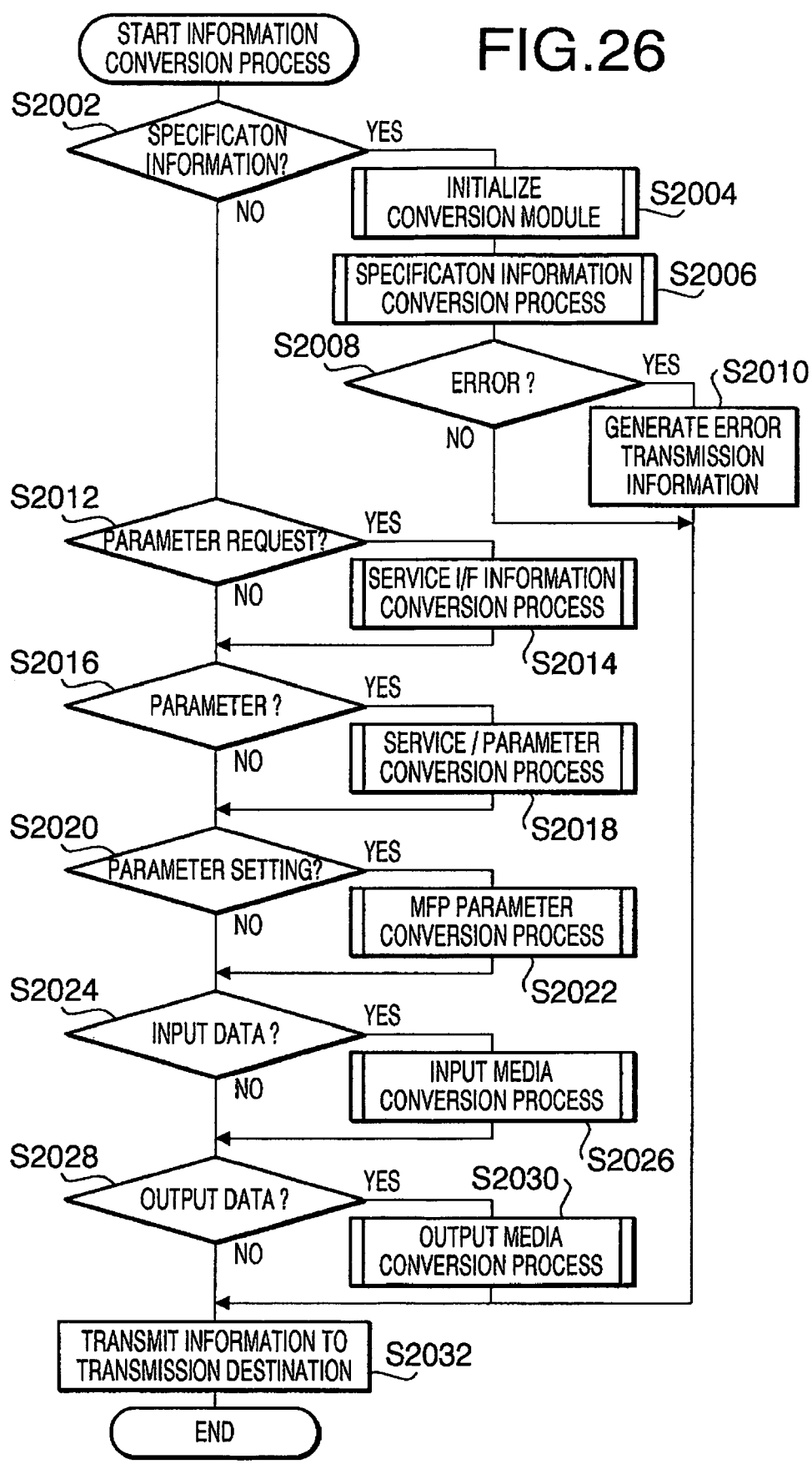
FIG. 26 is a flowchart showing an information conversion process performed by the function server in accordance with aspects of the present invention.

Referring to FIG. 26, an information conversion process, which is executed during all the communications with the MFP 10 will be described. This information conversion process is performed by the control unit 31 of the function server 30, functioning as a relay module for communication between each of the foregoing process (i.e., service) and the communication unit 15, and is started when information transfer is generated between both. The "generation of communication" refers to the transmission of information from the function server 30 to the MFP 10, or reception of information from the MFP 10.

When this information conversion process is activated, the process judges whether information related to communication generated before the current information conversion process is specification information (S2002). This specification information is transmitted from the MFP 10 in 312 (see FIG. 12), through S354.

In S2002, if the information is specification information (S2002: YES), a conversion module initialization process, which will be described hereinbelow, is executed (S2004). Although a process for loading a conversion module used in the media conversion of input/output data is executed, if an appropriate conversion module cannot be loaded, an error flag is set. The configuration of the conversion module is shown in FIG. 27.

Next, a specification information conversion process is executed (S2006). Here, a process is performed for storing the foregoing specification information in the memory area reserved by the conversion module activated in S2004.

In S2008, the process judges whether the error flag is set. If the error flag is set (S2008: YES), the process proceeds to S2032 after generating error transmission information (S2010). If the error flag is released (S2008: NO), the process proceeds to S2032 without generating error transmission information.

In S2002, if the process determines that the information is not specification information (S2002: NO), the process judges whether the information received before the current conversion process is a parameter request (S2012). The parameter request is an HTTP response transmitted (returned) to the MFP 10, along with the service I/F information 36, in S904 (see FIG. 23).

In 2012, if the process determines that the information is a parameter request (S2012: YES), the process proceeds to S2016 after a service I/F information conversion process is performed. If the process determines it is not a parameter request (S2012: NO), the process proceeds to S2016 without performing the service I/F information conversion process. This service parameter information conversion process converts the service I/F information 36, which is added to the parameter request, according to the conversion module loaded in S2004.

In S2016, the process judges whether the information received before the current information conversion process is a parameter. The parameter is transmitted from the MFP 10 in S312 through S320 (see FIG. 12).

In S2016, if the process determines that the information is a parameter (S2016: YES), the process proceeds to S2020 after performing the service parameter conversion process (S2018). If the information is not a parameter (S2016: NO), the process proceeds to S2020 without performing service parameter conversion process. This service parameter conversion process converts the foregoing parameter in accordance with the conversion module loaded in S2004.

In S2020, the process judges whether the information received before the current information conversion process is parameter settings. The parameter settings refer to the MFP parameters transmitted from the MFP 10 in S1006 (see FIG. 24) and S1106 (see FIG. 25).

In S2020, if the process determines that the information is parameter settings (S2020: YES), the process proceeds to S2024 after performing the MFP parameter conversion process. If the information is not parameter settings (S2020: NO), the process proceeds to S2024 without performing the MFP parameter conversion process. This MFP parameter conversion process converts the foregoing parameter settings (the MFP parameters) in accordance with the conversion module loaded in S2004.

Next, the process judges whether information received before the current information conversion process is input data (S2024). The input data is transmitted from the MFP 10 in S428 (see FIG. 17).

In S2024, if the process determines that the information is input data (S2024: YES), the process proceeds to S2028 after performing an input media conversion process (S2026). If the information is not input data (S2024: NO), the process proceeds to S2028 without performing the input media conversion process. In this input media conversion process, media conversion is performed on the input data by the conversion module loaded as described above.

Next, the process judges whether the information received before the current conversion process is output data (S2028). This output data is transferred from the MFP 10, after being written in the memory area, in which return information is stored by the MFP 10, in S1102 (see FIG. 25).

In S2028, if the process determines that the information is output data (S2028: YES), the process proceeds to S2032 after performing an output media conversion process (S2030). If the information is not output data (S2028: NO), the process proceeds to S2032 without performing the output media conversion process. This media conversion process performs media conversion on the output data using the conversion module loaded as described above.

After output media conversion process has been performed, if the process determines in S2028 that the information is not the output data (S2028: NO), or after error transmission information is generated in S2010, the information generated by each of the foregoing process is relayed (transmitted) (S2032). Here, if the information that has been generated and converted in S2010 through S2030 is that transmitted to the MFP 10 from the function server 30, this information is written in the storage area for return information. If the information is transmitted from the MFP 10, the information is passed to a relevant process.

(3-7) Conversion Module Initialization Process

Referring to FIG. 26, a conversion module initialization process will be described.

When the conversion module initialization process is activated, specification information, which is the information related to communication is generated before the foregoing information conversion process is read (S2102). Then in S2104, service I/O (input and output) media information is read. This service I/O media information has been stored in the memory unit 16 of the function server 30 in advance, and serves as a data table, which indicates correspondence between service identification information of each service and I/O media, as shown in FIG. 29. In S2104, the input media and the output media corresponding to the service identification information indicating the service that is to be provided to the MFP 10 is read.

Figure 30:
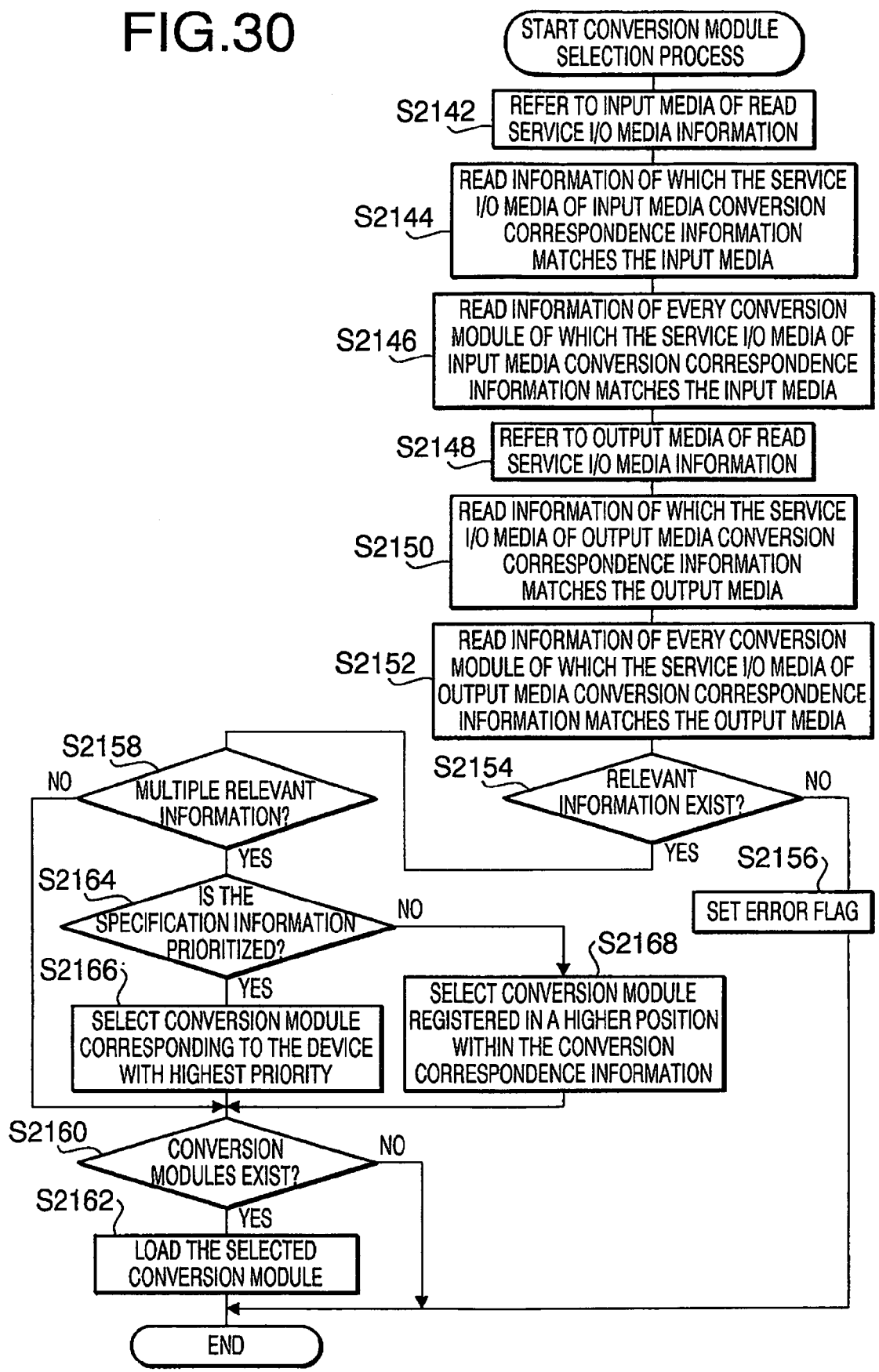
FIG. 30 is a flowchart showing a conversion module selection process performed by the function server in accordance with aspects of the present invention.

Next, an input conversion module is loaded (S2106). Here, a process is executed to select and load an appropriate conversion module in S2142 through S2168. Referring to FIG. 30, S2142 through S2168 will be described below. In S2142, the input media of the service I/O media information read in S2104 (see FIG. 28) is referenced.

Next, among the service input media registered to conversion correspondence information, the information matching the input media referenced in S2142 is read (S2144). This conversion correspondence information has been stored in the memory unit 16 of the function server 30 in advance and serves as a data table, which indicates correspondence between the service I/O media, I/O devices, conversion types, and conversion modules. Then, in S2144, information corresponding to the input media respectively referenced in S2142, among the information registered to the conversion correspondence information, is read. The conversion modules registered to the conversion correspondence information are not necessarily prepared to all of the I/O devices, and some I/O devices may have no module provided. The sections marked as "(blank)" in FIG. 31 indicate that no conversion is required (in other words, conversion modules that are not provided are not listed).

Next, all the information on the conversion modules, among the information corresponding to each input media read in S2144, is read (S2146). Then, in S2148, the output media of the service I/O media information read in S2104 (see FIG. 28) is referenced.

Next, the information matching to the output media referenced in S2148, among the service input media registered to the conversion correspondence information, is read (S2150). Then, all the information on the conversion module, among the information corresponding to the each output media read in S2150, is read (S2152).

Next, in S2154, the process judges whether at least one of the relevant conversion modules is read in S2142 through S2152. If the process determines that the module is not read (S2154: NO), the process proceeds to S2108 (see FIG. 28) after setting an error flag (S2156).

If the process determines that at least one module is selected and read, (S2154: YES), the process judges whether at least one conversion module is selected (S2158). If there is a single module selected (S2158: NO), the process judges whether the selected module exists, which means the selected module is a module corresponding to I/O devices that are provided with conversion modules (S2160).

In S2160, if the process determines that the conversion module exists (S2160: YES), the process proceeds to S2108 (see FIG. 28) after loading the conversion module (S2162). If the process determines that the selected conversion module does not exist (S2160: NO), the process proceeds to S2108 (see FIG. 28) without loading the conversion module.

In S2158, if the process determines that there are multiple conversion modules selected (S2158: YES), the process judges whether a priority is provided in the specification information (S2164). In the present illustrative embodiment, as there is specification information that indicates priority levels regarding each I/O device in the MFP 10 (see "Device_Priority" tag in FIG. 15; the smaller of the value indicates the higher priority), the process judges whether the priority level is provided in the specification information in S2158.

In S2158, if the process determines that the priority level is provided (S2158: YES), the input device with the highest priority level in accordance with the specification information (i.e., the smallest value) is selected from among the devices registered to the conversion correspondence information in correspondence to the selected conversion module (S2166).

In S2158, if the process determines that the priority level is not provided (S2158: NO), the conversion module at the highest position (registered in the uppermost part) in the conversion correspondence information is selected from among the input devices registered to the conversion correspondence information corresponding to the selected conversion module (S2168).

When the conversion module is selected in S2166 and S2168, the process proceeds to S2160. If no conversion module exists, the process proceeds to S2108 (see FIG. 28). If there is a conversion module, the process proceeds to S2162 and then to the next procedure (S2108 in FIG. 28) after loading the selected conversion module.

Figure 28:
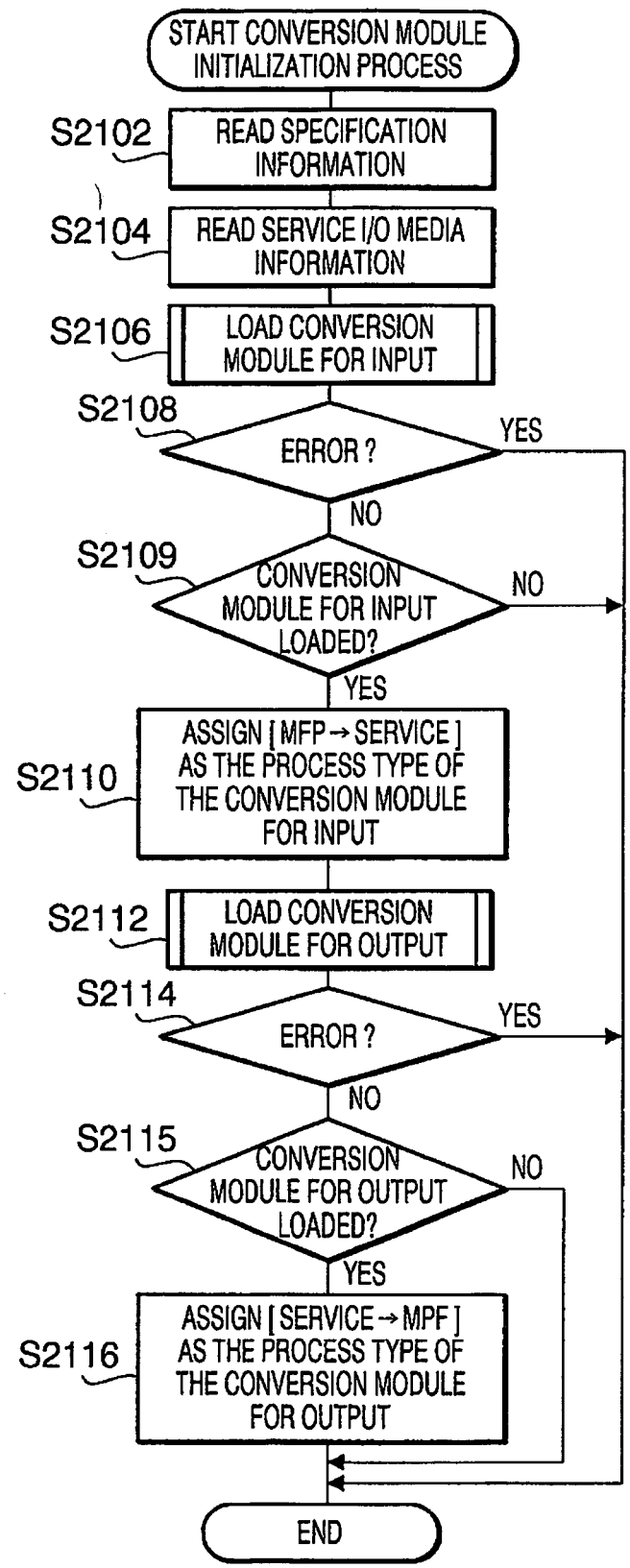
FIG. 28 is a flowchart showing a conversion module initialization process performed by the function server in accordance with aspects of the present invention.

After the process through S2152 to S2168 is completed, the process returns to S2108 (see FIG. 28). Then, the process judges whether the error flag is set (S2108). If no conversion module has been selected in S2156, the error flag is set in S2156, therefore, the process substantially judges whether the input conversion module has been selected.

In S2108, if the process determines that the error flag is set (S2108: YES), the process proceeds to S2006 (see FIG. 26) after completing the current conversion module initialization process. If the process determines that the error flag is released (S2108: NO), the process judges whether the input conversion module is loaded (S2109).

In S2109, if the process determines that the conversion module has been loaded (S2109: YES), the process proceeds to S2112 after the process type of the input conversion module is substituted with "MFP" from "Service" (S2110). If the process determines that the conversion module was not loaded (S2109: NO), the process proceeds to S2112 without changing the process type. The "input conversion module process type" is reserved by the loaded conversion module as a storage area for information (refer to "Processing type storage area" in FIG. 27).

Next, the output conversion module is loaded (S2112). Here, a process for loading the appropriate conversion module is performed similarly to the process in S2106 to S2110. Therefore, a detailed description is omitted. More specifically, however, in the process in S2112 to S2116, it is necessary to replace "input device" with "output device", and "input media" with "output media", in the description of the process in S2106 to S2110.

After S2112, the process judges whether the error flag is set (S2114). In S2114, if the process determines that the error flag is set (S2114: YES), the current conversion module initialization process is completed, and the process proceeds to S2006 (see FIG. 26).

If the process determines that the error flag is not set (S2114: NO), the process judges whether the output conversion module is loaded (S2115).

In S2115, if the process determines that the output conversion module is loaded (S2115: YES), the current conversion module initialization process is completed and the process proceeds to S2006 (see FIG. 26), after the output conversion module process type is substituted with "Service" from "MFP". In S2115, if the process determines that the output conversion module is not loaded (S2115: NO), the current conversion module initialization process is completed and the process proceeds to S2006 (see FIG. 26) without substituting the process type. The "output conversion module process type" is reserved by the loaded conversion module as the storage area for information (refer to "Processing type storage area" in FIG. 27).

(3-8) Specification Information Conversion Process

Figure 32:
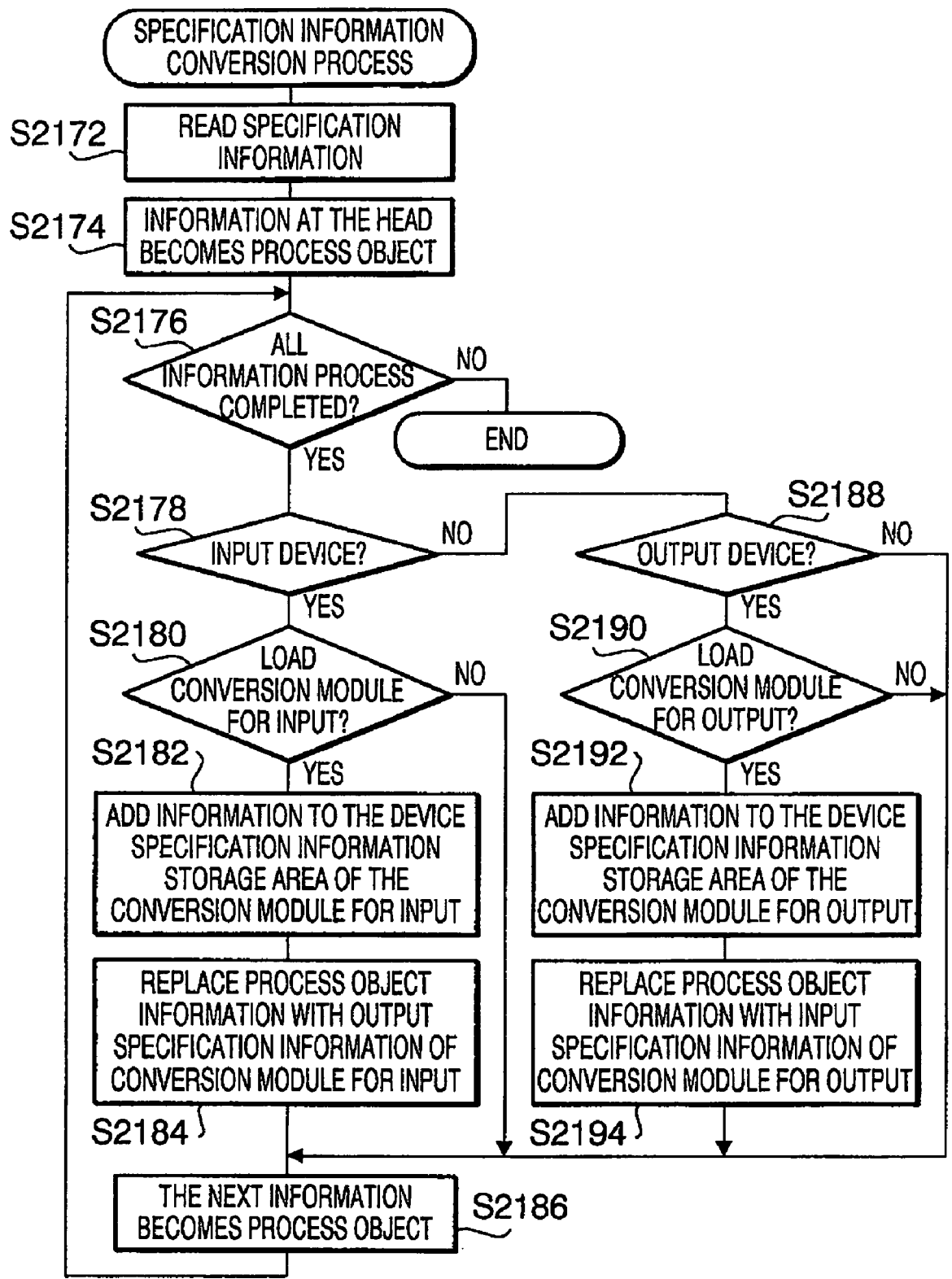
FIG. 32 is a flowchart showing a specification information conversion process performed by a function server in accordance with aspects of the present invention.

Referring to FIG. 32, a specification information conversion process, which is in S2006 (see FIG. 26) will be described.

When the specification information conversion process is activated, specification information is read similarly to S2102 in FIG. 28 (S2174).

Next, the information at the head of the specification information read in S2172 becomes a process object to which the process described below is performed (S2174).

In S2176, the process judges whether process for all the information in the specification information has been completed (S2176). If it has not been completed (S2176: NO), the process judges whether the process object information is related to an input device (S2178).

In S2178, if the process determines that the information is related to the input device (S2178: YES), and if the input conversion module is loaded in S2162 (see FIG. 30) (S2180: YES), the process object information is added to the device specification information storage area of the input conversion module (S2182). Then, the process object information is replaced with output specification information of the input conversion module (S2184). In S2186, the next information becomes the process object (S2186), and the process returns to S2176. The "device specification information storage area" is reserved by the loaded conversion module as a storage area for information (refer to "Device specification information storage area" in FIG. 27). The "output specification information" is reserved by the loaded conversion module as a storage area for information (refer to "output specification information" in FIG. 27) in which predetermined specification information has been stored in advance.

In S2180, if the input conversion module has not been loaded in S2162 in FIG. 30, (S2180: NO), the process proceeds to S2186 with no information added or replaced, and returns to S2176 with the next information as the process object.

In S2178, if the process determines that the information is not related to the input device (S2178: NO), the process judges whether it is related to the output device (S2188). If the process determines that the information is related to the output device (S2188: YES), and if the output conversion module has been loaded in S2162 in FIG. 30 (S2190: YES), the information is added to the device specification information storage area of the output conversion module (S2192). Then, in S2194, the process object information is replaced with the input specification information of the output conversion module (S2194). Then, the process proceeds to S2186 and returns to S2176 after the next information becomes the process object. This "input specification information" is reserved as a storage area for information by the loaded conversion module (refer to "Input specification information" in FIG. 27), in which predetermined specification information as been stored in advance.

After S2176 through S2194, the process judges whether the process for all the information in the specification information has been completed in S2176 (S2176: YES), and the current specification information conversion process is completed. Thus, the specification information read in S2172 is converted to I/O specification information of the conversion module as required by the specification information conversion process. It is also converted to the specification information, input in S932 (see FIG. 23) if necessary.

(3-9) Service I/F Information Conversion Process

Figure 33:
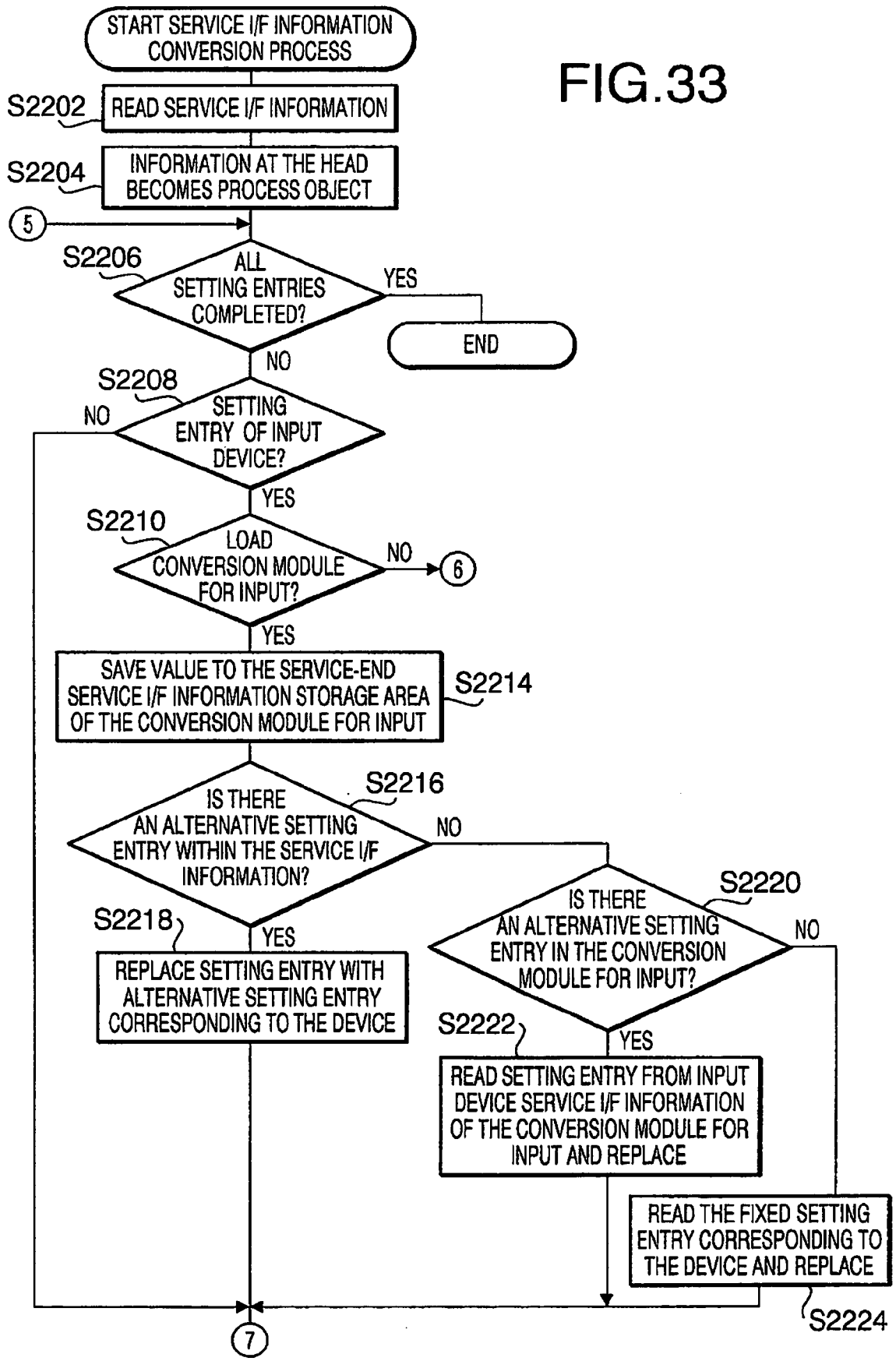
FIGS. 33 and 34 show a flowchart illustrating a service I/F information conversion process performed by the function server in accordance with aspects of the present invention.
Figure 34:
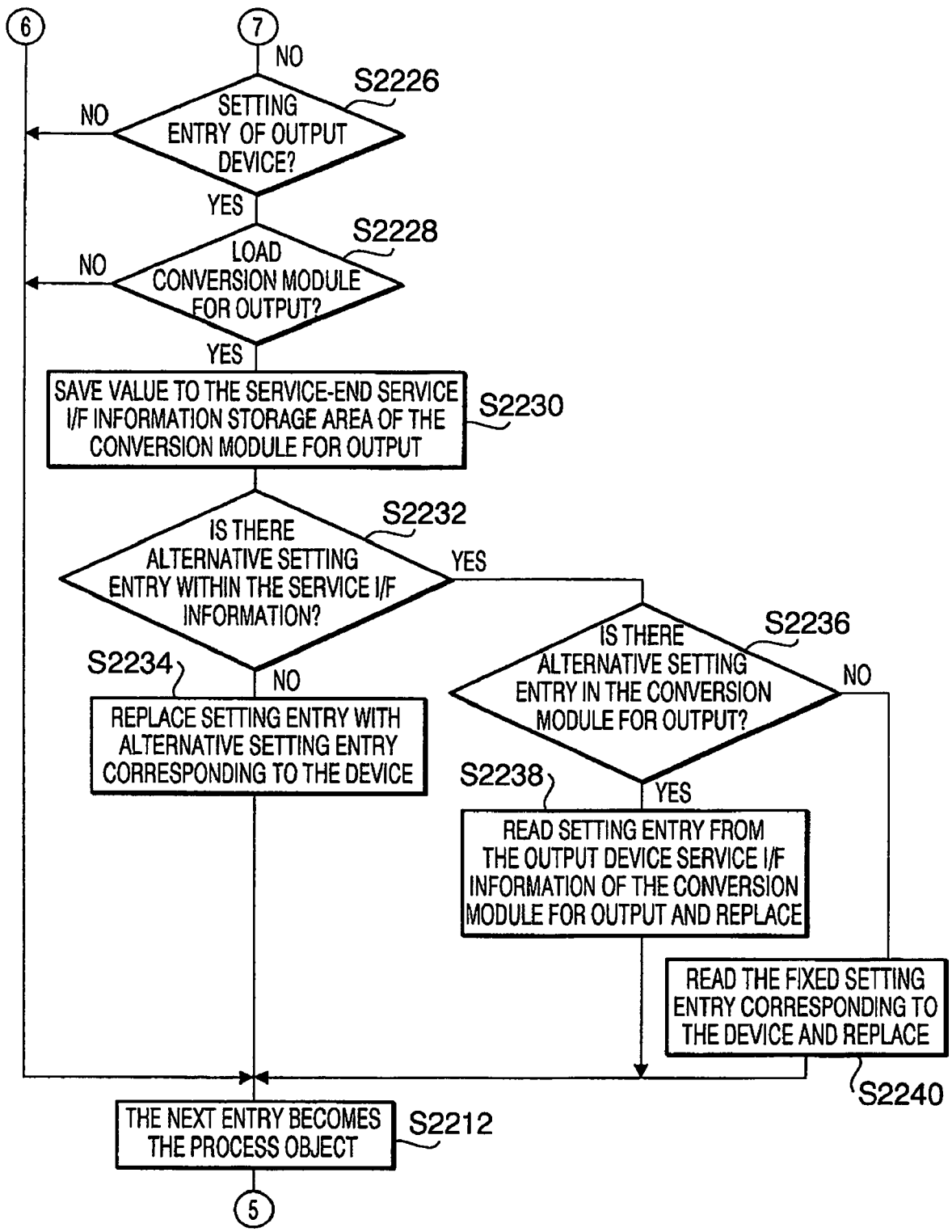

Referring to FIGS. 33 and 34, a service I/F information conversion process in S2014 (see FIG. 26) will be described. The configuration of the conversion module described below includes, for example, a memory area for input device service I/F information and output device service I/F information, and storage areas reserved for storing information in the process described below such as a process type storage area, a device specification information storage area, a service-end service I/F information storage area, an input parameter storage area, and output parameter storage area for predetermined parameters, as well as the main unit of the conversion process program.

Among the above information, the input specification information, which includes predetermined parameters is passed to the UI job, when used as an output conversion module, and becomes the input specification information in the conversion process executed by the conversion process program. The output specification information is passed to the UI job, when used as an input conversion module, and becomes the output specification information in the conversion process executed by the conversion process program. The input device service I/F information is transmitted to the MFP 10 when used as an input conversion module and defines the input device setting entries described in the same format as the foregoing service I/F information 36. Furthermore, the output device service I/F information is transmitted to the MFP 10 when used as an output conversion module and defines the output device setting entries described in the same format as the foregoing service I/F information 36.

The process type storage area including a storage area reserved to store information, stores information indicating the direction of the conversion performed by the conversion process program. Based on the information stored therein, the conversion process program is determined whether the operation is executed as an input filter (in case "from MFP to Service") or the operation is executed as an output filter (in case "from Service to MFP"). The device specification information storage area therein stores information defining the specifications regarding the device related to input and/or output, among the specification information received from the MFP 10. The service-end service I/F information storage area therein stores information defining the setting entries regarding parameters related to input and/or output, among the service I/F information 36 received from the service. The input parameter storage area therein stores the parameters of the input (virtual) device when performing the conversion process. Furthermore, the output parameter storage area therein stores the parameters of the output (virtual) device when performing the conversion process.

When the service I/F information conversion process is activated, the service I/F information 36 added to a parameter request is read (S2202). The parameter request refers to information related to communication that has been generated before the information conversion process.

Next, the head setting entry in the service I/F information 36 read in S2202 becomes the process object (S2204). Then, the process judges whether the process for all the setting entries in the service I/F information 36 has been completed (S2206). If it has not been completed (S2206: NO), the process judges whether the process object setting entry is related to the input device (S2208).

In S2208, if the process determines that it is not a setting entry related to the input device (S2208: NO), the process proceeds to S2226. If the process determines that it is a setting entry related to the input device (S2208: YES), and if the input conversion module has not been loaded in S2162, in FIG. 30 (S2210: NO), the process returns to S2206, after the next setting entry becomes the process object (S2212).

In S2210, if the process determines that the input conversion module has been loaded in S2162 in FIG. 30 (S2210: YES), the parameter in the process object setting entry is registered (stored) in the service-end service I/F information storage area of the input conversion module (S2214). The "service-end service I/F information storage area" is reserved by the loaded conversion module as a storage area for information (refer to "service-end service I/F information storage area" in FIG. 27).

Next, the process judges whether there is an alternative setting entry in the service I/F information 36 (S2216). The alternative setting entry refers to a setting entry, wherein a character string "_alt_" is inserted into the head of the value of "value_Name". In S2216, if this "value_Name" with a value that has the character string "_alt_" inserted into the head is included, it is determined that there is an alternative setting entry. The definitions of devices, I/O (whether used for input or output) and values corresponding respectively to the value of "value_Name" are shown in FIG. 35.

In S2216, if the process determines that there is an alternative setting entry (S2216: YES), after switching the setting entry to the alternative setting entry corresponding to the input device (S2218), the process proceeds to S2226. In S2218, the parameter of the process object setting entry is switched to the alternative setting entry corresponding to the input device, of which "_alt_" has been deleted. For example, in the translation copy service in FIG. 13, if there is no keyboard (i.e., the input unit 12), even though it is required, as an input device for text entry (refer to FIG. 29), the setting entry is rewritten to "scan_res", "_alt_scan_res" without the "_alt_", as its alternative setting entry.

In S2216, if the process determines that there is no alternative setting entry (S2216: NO), the process judges whether there is an alternative setting entry in the input conversion module (S2220). The "alternative setting entry" is a parameter set in the input device service I/F information in the input conversion module.

In S2220, if the process determines that there is an alternative setting entry (S2220: YES), after reading and switching the setting entry from the input device service I/F information in the input conversion module (S2222), the process proceeds to S2226. The "input device service I/F information" is reserved by the loaded conversion module as a storage area for information (refer to "Input device service I/F information" in FIG. 27), and although predetermined service I/F information has been set in advance, in the present illustrative embodiment, it can also be set to have no information.

In S2222, if the process determines that there is no alternative setting entry (S2222: NO), the process proceeds to S2226 after reading and switching the fixed setting entry corresponding to the device (S2224). The "fixed setting entry" is setting entry information corresponding to the I/O device stored in advance in a hard disk (not shown) within the function server 30.

Next, the process judges whether the process object setting entry is related to the output device (S2226). In S2226, if the process determines that the setting entry is not related to the output device (S2226: NO), the process proceeds to S2212, and after the next setting entry becomes the process object, returns to S2206. If the process determines that the setting entry is related to the output device (S2226: YES), the process proceeds to S2212 if the output conversion module has not been loaded in S2162 in FIG. 30 (S2228: NO) and after the next setting entry becomes the process object, returns to S2206.

If the output conversion module has been loaded in S2162 in FIG. 30 (S2228: YES), the parameter in the process object setting entry is stored in the service-end service I/F information storage area of the output conversion module (S2230).

Next, the process judges whether the service I/F information 36 has an alternative setting entry similarly to S2216 (S2232). In S2232, if the process determines that there is an alternative setting entry (S2232: YES), the process proceeds to S2212 after switching the setting entry to the alternative setting entry corresponding to the output device (S2234), and after the next setting entry becomes the process object, returns to S2206. In S2234, the parameter of the process object setting entry is switched to the alternative setting entry corresponding to the output device, of which "_alt_" has been deleted.

In S2232, if the process determines that there is no alternative setting entry (S2232: NO), the process judges whether there is any alternative setting entries in the output conversion module (S2236). In S2236, if the process determines that there is an alternative setting entry in the output conversion module (S2236: YES), after reading and switching setting entry from the output device service I/F information in the output conversion module (S2238), the process proceeds to S2212. Then after the next entry becomes the process object, the process returns to S2206. The "output device service I/F information" is reserved by the loaded conversion module as a storage area for information (refer to "Output device service I/F information" in FIG. 27), and although predetermined service I/F information has been stored in advance in the present illustrative embodiment, it can also be set to have no information therein.

In S2236, if the process determines that there is no alternative setting entry (S2236: NO), after reading and switching the fixed setting entry corresponding to the device (S2240), the process proceeds to S2212, and returns to S2206 after the next setting entry becomes the process object.

When the process through S2206 to S2240 is performed on all setting entries in the service I/F information 36, it is determined in S2206 that the process for all setting entries has been completed, and the current service I/F information conversion process is completed. Thus, the service I/F information 36 read in S2202 is converted by the service I/F information conversion process to the service I/F information 36 as required. It is also converted to the service I/F information 36 received by the MFP 10 in S318 in FIG. 12 as required.

(3-10) Service Parameter Conversion Process

Figure 36:
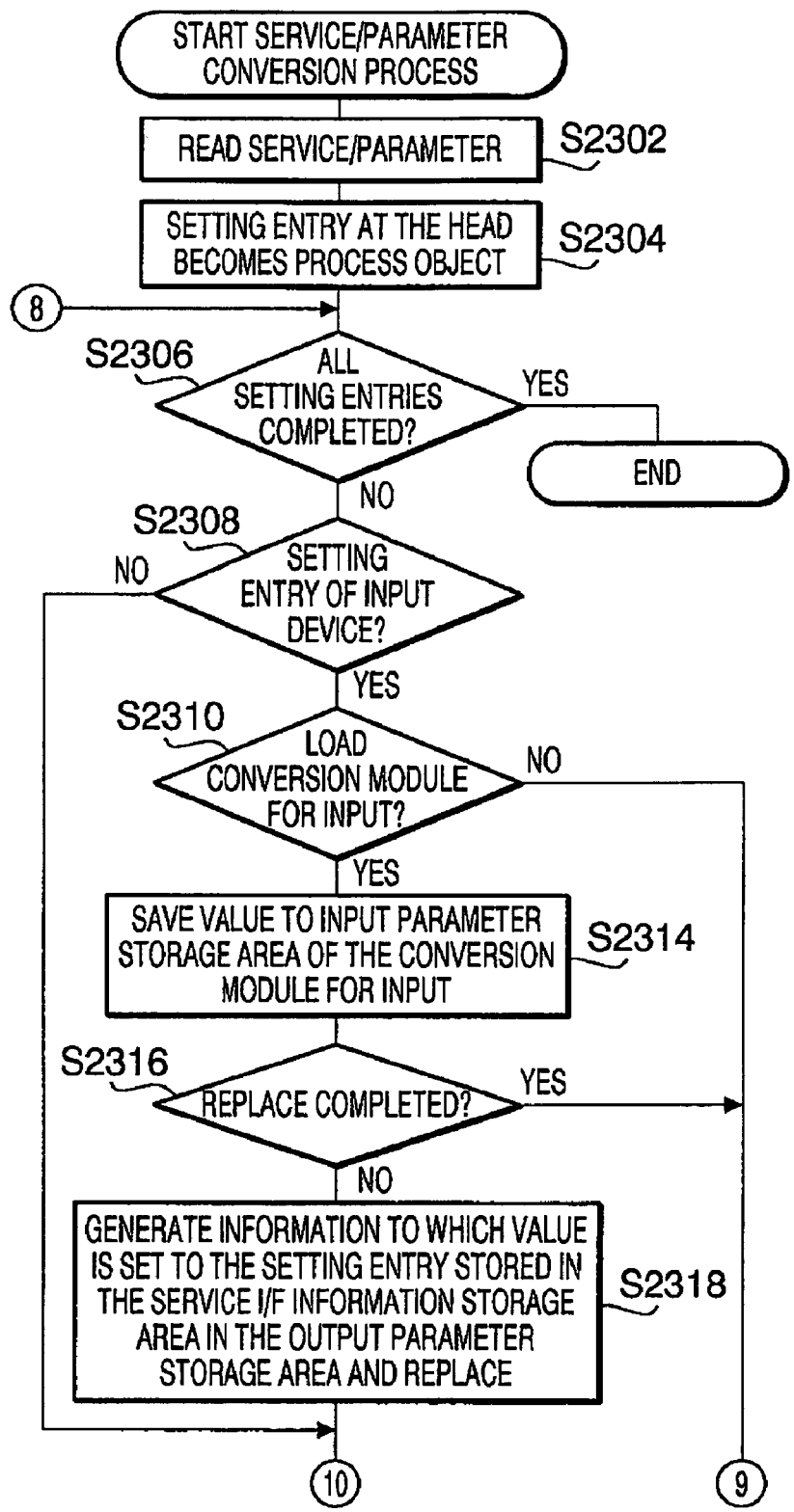
FIGS. 36 and 37 show a flowchart illustrating a service parameter conversion process performed by the function server in accordance with aspects of the present invention.
Figure 37:
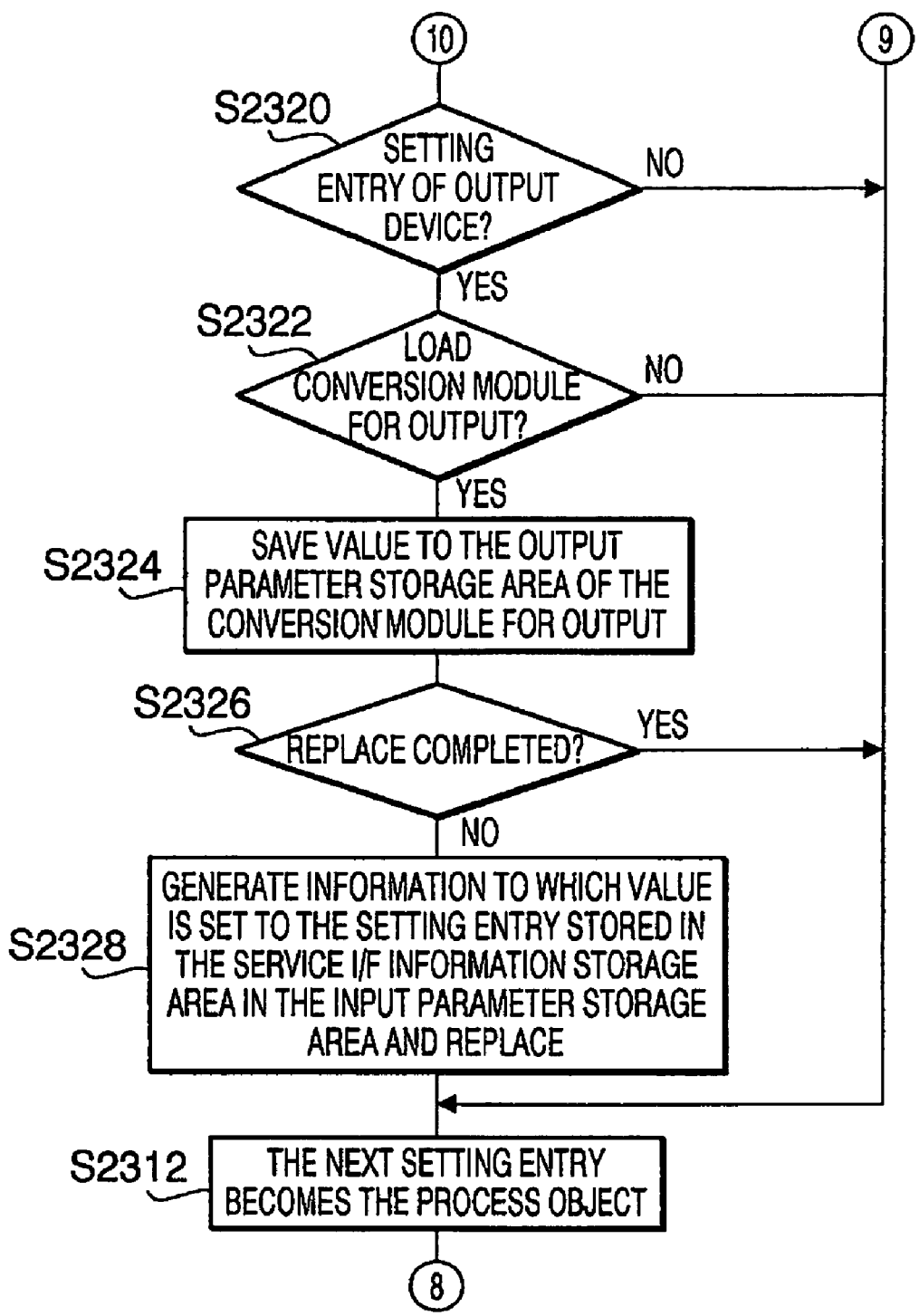

Referring to FIGS. 36 and 37, a service parameter process, which is S2018 (see FIG. 26) will be described.

When the service parameter conversion process is started, a parameter (i.e., a service parameter) is read (S2302). The service parameter refers to information related to communication that is generated before the foregoing information conversion process.

Next, the setting entry at the head of the parameter read in S2302 becomes the process object to which the process described below is performed (S2304).

Then, the process judges whether the process described below for all the setting entries in the service parameter has been completed (S2306). If it is not completed (S2306: NO), the process judges whether the process object setting entry is related to the input device (S2308).

In S2308, if the process determines that the setting entry is related to the input device (S2308: YES) after the next setting entry becomes the process object (S2312), and if the input conversion module has not been loaded in S2162 in FIG. 30 (S2310: NO), the process returns to S2306.

In S2310, if the process determines that the input conversion module has been loaded in S2162 in FIG. 30 (S2310: YES), the parameter in the process object setting entry is registered (stored) in the input parameter storage area in the input conversion module (S2314). The "input parameter storage area" is reserved by the loaded conversion module as a storage area for information (refer to "Input parameter storage area" in FIG. 27).

Next, the process judges whether the parameter in the process object setting entry has been replaced (S2316). In S2316, if the process determines that the replacement is completed (S2316: YES), the process proceeds to S2312, and after the next setting entry becomes the process object, the process returns to S2306.

In S2316, if the process determines that the replacement is not completed (S2316: NO), information corresponding to the value in the setting entry stored in the service I/F information storage area is generated and stored in the output parameter storage area. Then, the parameter in the process object setting entry is replaced with this information (S2318). Here, the information is generated by setting the value embedded in advance in the conversion process program within the input conversion module, and replacing the parameter in the process object setting entry with information generated.

After S2318, or if the setting entry is not related in the input device in S2308 (S2308: NO), the process judges whether the process object setting entry is related to the output device (S2320).

In S2320, if the process determines that the setting entry is not related to the output device (S2320: NO), the process proceeds to S2312, and after the next setting entry becomes the process object, returns to S2406.

In S2320, if the process determines that the setting entry is related to the output device (S2320: YES), and if the output conversion module has not been loaded in S2162 in FIG. 30 (S2322: NO), the process proceeds to S2312, and after the next setting entry becomes the process object, the process returns to S2306.

In S2322, if the process determines that the output device module has been loaded in S2162 in FIG. 30 (S2322: YES), the parameter in the process object setting entry is stored in the output parameter storage area in the output conversion module (S2324). The "output parameter storage area" is reserved by the loaded conversion module as a storage area for information (refer to "Output parameter storage area" in FIG. 27).

Next, the process judges whether the parameter in the process object setting entry has been replaced (S2326). In S2326, if the process determines that the replacement is completed (S2326: YES), the process proceeds to S2312, and after the next setting entry becomes the process object, the process returns to S2306.

In S2326, if the process determines that the replacement is not completed (S2326: NO), information corresponding to the value in the setting entry stored in the service I/F information storage area is generated and stored in the output parameter storage area. Then, the parameter in the process object setting entry is replaced with this information (S2328). Here, the information is generated by setting the value embedded in advance in the conversion process program within the output conversion module, and replacing the parameter in the process object setting entry with information generated.

After S2328, the process proceeds to S2313, and after the next setting entry becomes the process object, returns to S2306. Subsequently, after a process through S2306 to S2328 has been performed for all the setting entries in the service parameter, it is determined in S2306 that the process for all the setting entries has been completed (S2306: YES), and the current service parameter conversion process is completed. Thus, the service parameter read in S2302 is converted by this service parameter conversion process to an I/O parameter of the conversion module or the parameter entered in S908 in FIG. 23 as required.

(3-11) MFP Parameter Conversion Process

Figure 38:
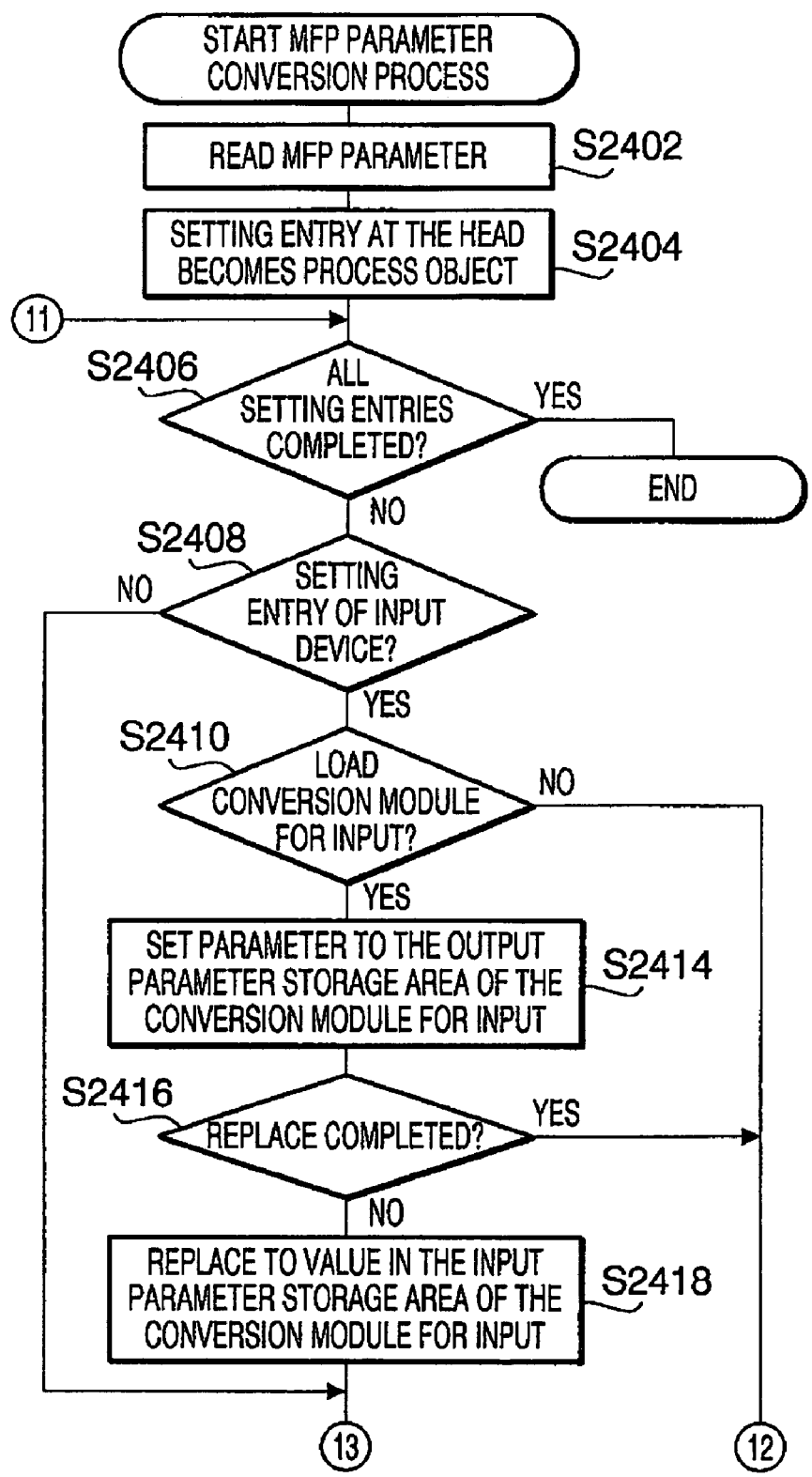
FIGS. 38 and 39 show a flowchart illustrating an MFP parameter conversion process performed by the function server in accordance with aspects of the present invention.
Figure 39:
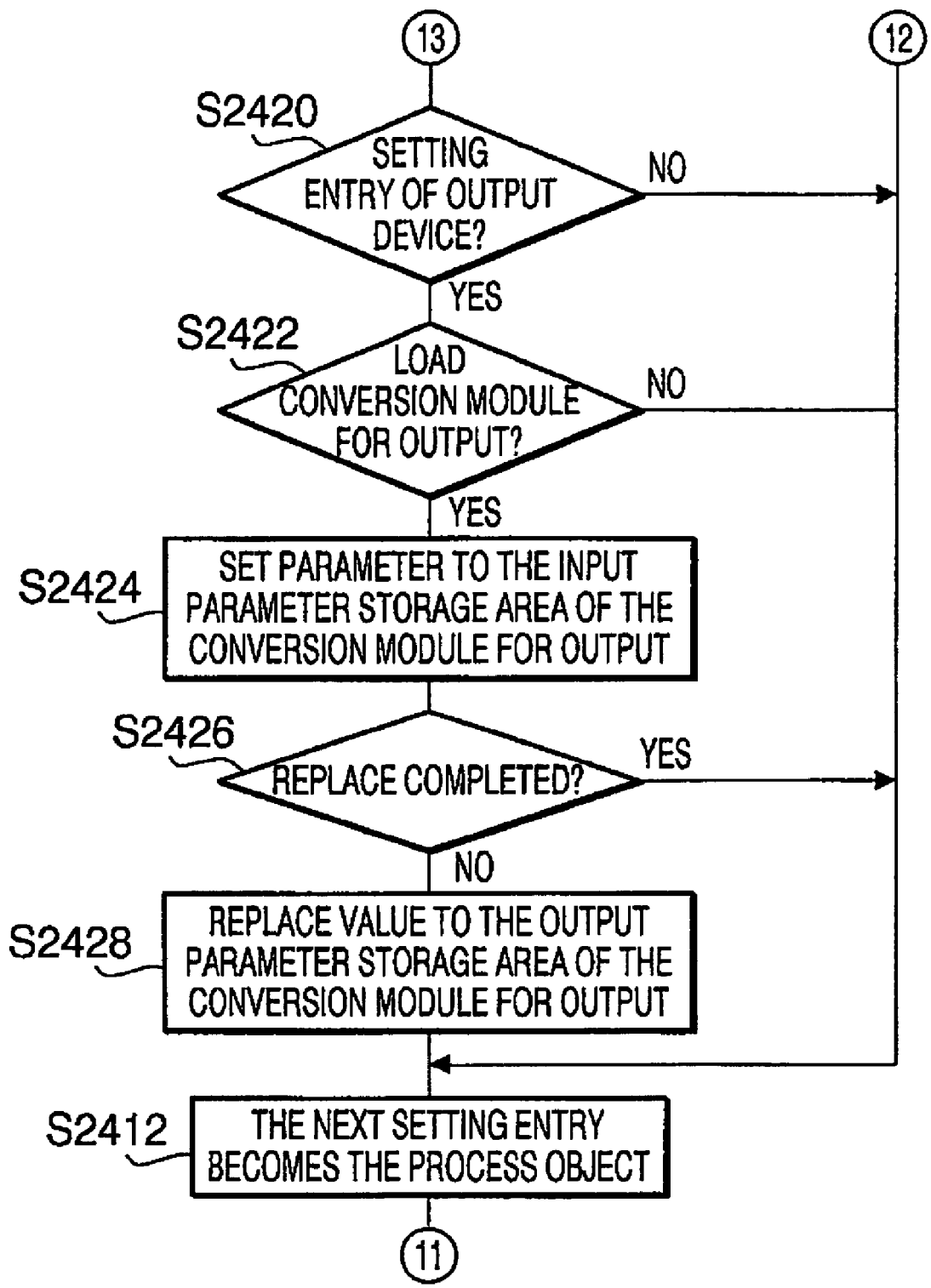

Referring to FIGS. 38 and 39, an MFP parameter conversion process, which is in S2022 in FIG. 26 will be described.

When the MFP parameter conversion process is started, an MFP parameter (i.e., a parameter setting), which is information related to communication generated before the foregoing information conversion process, is read (S2402).

Next, the setting entry at the head of the parameter read in S2402 becomes the process object to which the process below is performed (S2404).

Then, the process judges whether the process described below for all the setting entries in the MFP parameter has been completed (S2406). If it is not completed (S2406: NO), the process judges whether the process object setting entry is related to input device (S2408).

In S2408, if the process determines that the setting entry is related to the input device (S2408: YES), after the next setting entry becomes the process object (S2412), and if the input conversion module has not been loaded in S2162 in FIG. 30 (S2410: NO), the process returns to S2406.

In S2410, if the process determines that the input conversion module has been loaded in S2162 in FIG. 30 (S2410: YES), the parameter in the process object setting entry is registered (stored) in the output parameter storage area in the input conversion module (S2414).

Next, the process judges whether the parameter in the process object setting entry has been replaced (S2416). In S2416, if the process determines that the replacement is completed (S2416: YES), the process proceeds to S2412, and after the next setting entry becomes the process object, the process returns to S2406.

In S2416, if the process determines that the replacement is not completed (S2416: NO), the parameter in the process object setting entry is replaced with the parameter stored in the input parameter storage area in the input conversion module (S2418).

After S2418, or if the setting entry is not related to the input device in S2408 (S2408: NO), the process judges whether the process object setting entry is related to the output device (S2420).

In S2420, if the process determines that the setting entry is not related to the output device (S2420: NO), the process proceeds to S2412, and after the next setting entry becomes the process object, returns to S2406.

In S2420, if the process determines that the setting entry is related to the output device (S2420: YES), and if the output conversion module has not been loaded in S2162 in FIG. 30 (S2422: NO), the process proceeds to S2412, and after the next setting entry becomes the process object, the process returns to S2406.

In S2422, if the process determines that the output conversion module has been loaded in S2162 in FIG. 30 (S2422: YES), the parameter in the process object setting entry is stored in the input parameter storage area in the output conversion module (S2424).

Next, the process judges whether the parameter in the process object setting entry has been replaced (S2426). In S2426, if the process determines that the replacement is completed (S2426: YES), the process proceeds to S2412, and after the next setting entry becomes the process object, the process returns to S2406.

In S2426, if the process determines that the replacement is not completed (S2426: NO), the parameter in the process object setting entry is stored in the output parameter storage area in the output conversion module (S2428).

After S2428, the process proceeds to S2412, and after the next setting entry becomes the process object, the process returns to S2306.

Subsequently, if the process through S2406 to S2428 is performed on all the setting entries in the service parameter, it is determined in S2405 that the process for all the setting entries has been completed (S2406: YES), and the current service parameter conversion process is completed. Thus, the MFP parameter read in S2402 is converted to I/O parameter in the conversion module as required, by this service parameter conversion process. It is also converted to the MFP parameter received by the MFP 10 in the process in S410 in FIG. 17 and S510 in FIG. 18, as required.

(3-12) I/O Media Conversion Processing

Figure 40A:
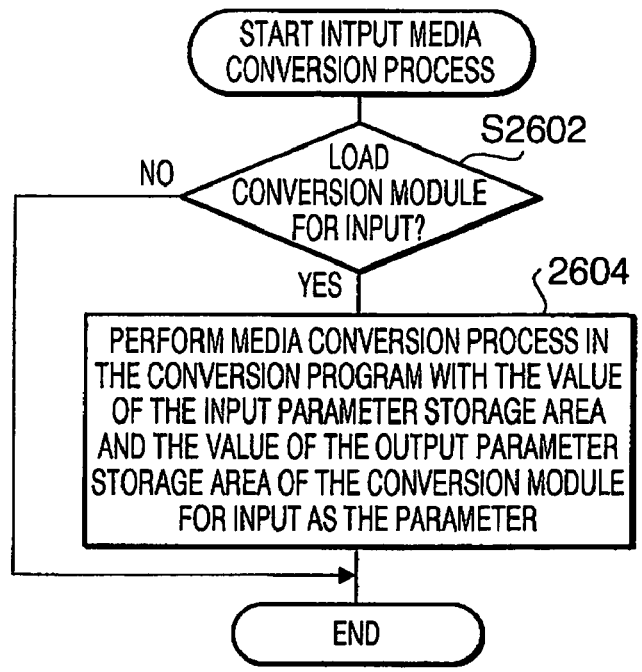
FIGS. 40A and 40B are flowcharts showing input/output media conversion processes performed by the function server in accordance with aspects of the present invention.
Figure 40B:
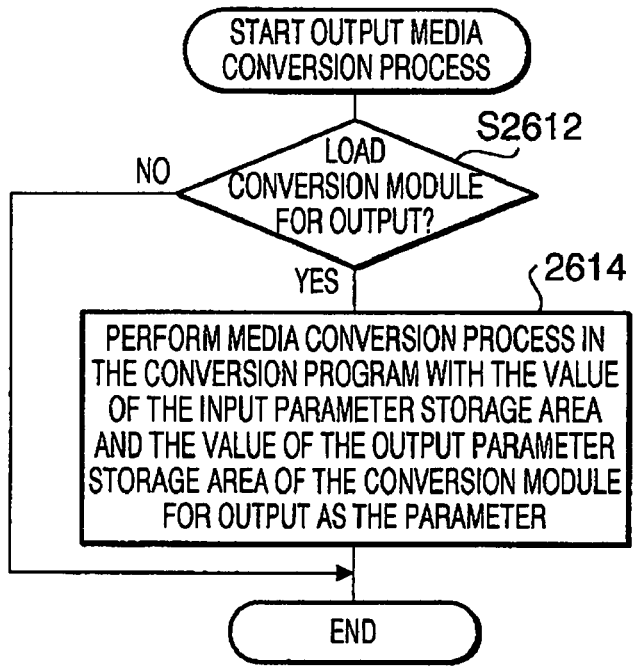

Referring to FIGS. 40A and 40B, an input media conversion process and an output media conversion process, which are in S2026 and S2030 in FIG. 26 will be described.

When an I/O media conversion process is activated, the process judges whether the I/O conversion module is loaded (S2602, S2612). Here, in the input media conversion process, the conversion module is loaded in S2162 in FIG. 30 and the process judges whether the conversion module loaded is an input conversion module. Furthermore, in the output media conversion process, the conversion module is loaded in S2162 in FIG. 30 and the process judges whether the conversion module loaded is an output conversion module.

In S2602 and S2612, if the process determines that the I/O conversion module is loaded (S2602: YES; S2612: YES), the media conversion process of the I/O data is performed by the conversion module (S2604 and S2614). The I/O data refers to information related to communication, which is generated before the foregoing information conversion process.

Here, in the input media conversion process (FIG. 40A), the input data (i.e., the data transmitted from the MFP 10 during the process in S428 in FIG. 17) is input as that is defined by the parameter of the input parameter storage area in the input conversion module. Media conversion is performed on the input data through the media conversion process, and the data obtained subsequent to the process is that defined by the parameters of the output parameter storage area in the input conversion module.

In the output media conversion process (FIG. 40B), the output data (the data output from the print job in the process in S112 in FIG. 25) is input is that defined by the parameter of the input parameter storage area in output conversion module. Media conversion is performed on the output data through the media conversion process, and the data obtained subsequent to the process is that defined by the parameters of the output parameter storage area in the output conversion module.

In the foregoing media conversion process, for example, image data representing an image composed of text can be converted to text data by performing an OCR process, the text data can be converted to voice data by known text reading programs, and media conversion from voice data to text data can also be performed.

(3-13) Device Priority Setting Processing

Figure 41:
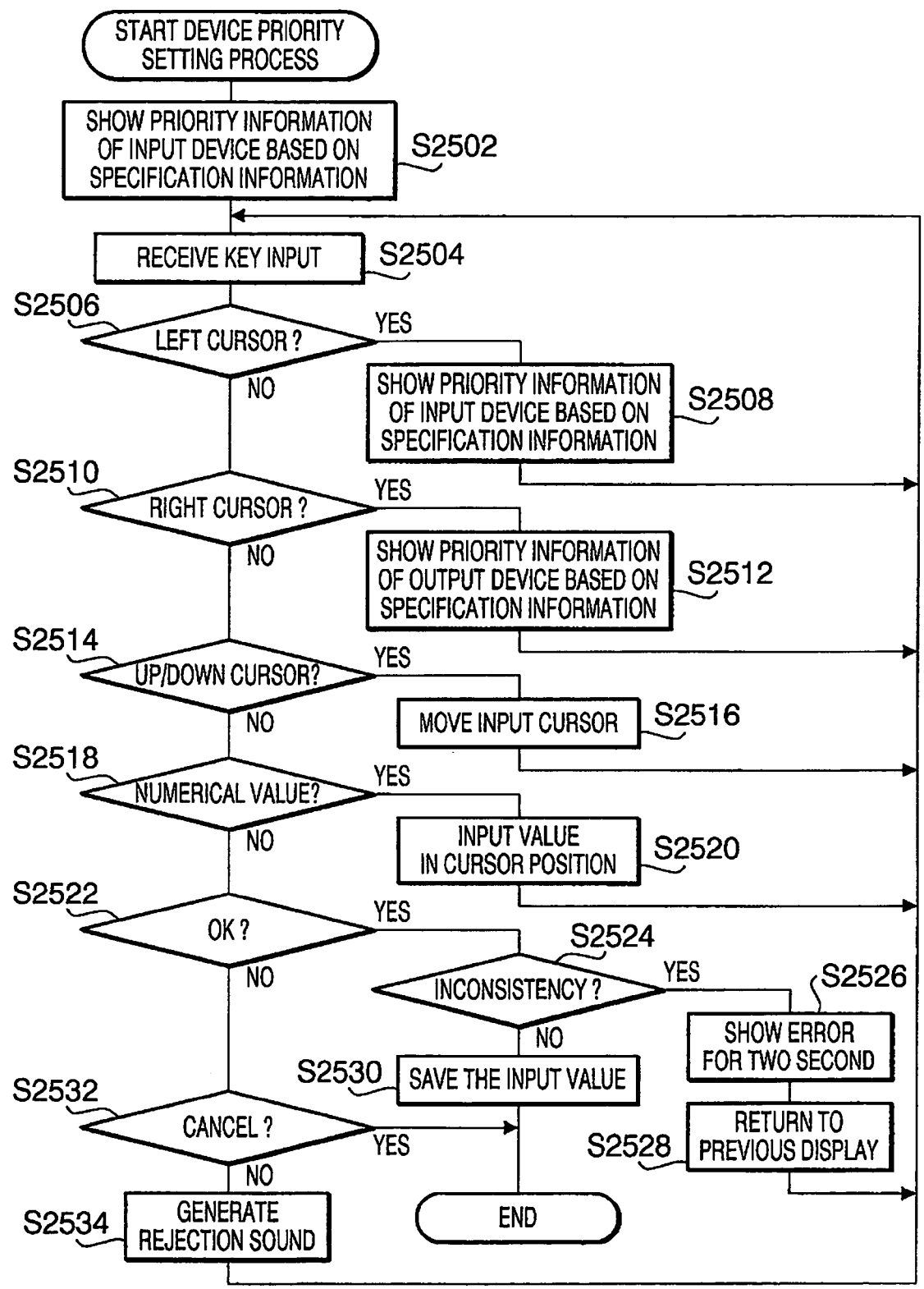
FIG. 41 is a flowchart showing a device priority setting process performed by the function server in accordance with aspects of the present invention.

Referring to FIG. 41, a device priority setting process, which is started when a predetermined operation is performed by the operation unit 12, will be described.

Figure 42A:
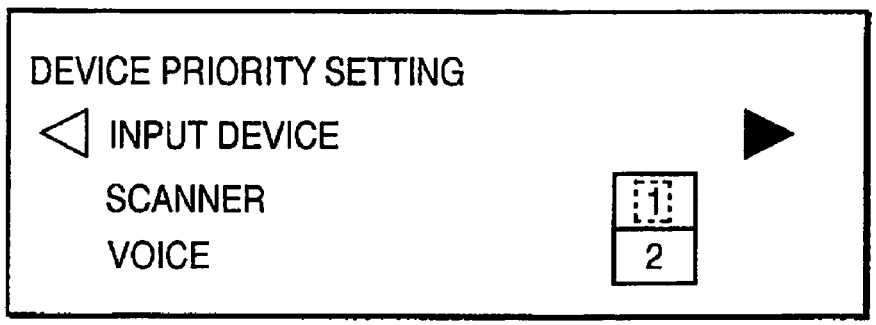
FIGS. 42A-42C are diagrams showing priority selection screens in accordance with aspects of the present invention.
Figure 42B:
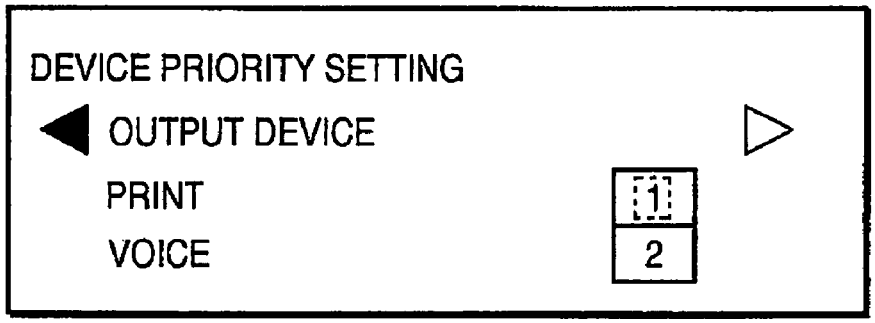

When a device priority setting process is stated, priority information of an I/O device is shown in the display 52 (S2502), based on the specification information (FIG. 15) stored in the MFP 1. Here, as shown in FIG. 42A and FIG. 42B, a priority selection screen for showing the priority information of the I/O device is displayed. The priority selection screen includes an input device selection screen, which can be switched by an operation to the operation unit 12 (see FIG. 42A), and an output device selection screen (see FIG. 42B), as well as an entry field to enter the priority level of each device, is provided for every device. After the priority selection screen is shown, the user can perform an input switching operation to switch to the input device selection screen (by pressing the left direction key 48), an output switching operation to switch to the output device selection screen (by pressing the right direction key 49), a specification operation to specify the I/O device (by pressing the up direction key 46 and the down direction key 47), a modification operation to modify the priority level of the specified I/O device, a confirmation operation to confirm the modified priority level (by pressing the OK key 50), a cancel operation to cancel the modification of the priority level (by pressing the cancel key 51), and the like, through the operation unit 12.

Thus, if an operation (i.e., a key input) is generated by the user (S2504) after the priority screen is displayed and the operation is an input switching operation (S2506: YES), the process returns to S2504 after the priority selection screen is switched to the input device selection screen in accordance with the specification information (S2508).

If the user performs an output switching operation (S2506: NO, S2510: YES), the process returns to S2504 after the priority selection screen switches to output device selection screen in accordance with the specification information (S2512).

If the user performs a specification operation (S2510: NO, S2514: YES), the process returns to S2504 after the content specified by the specification operation is reflected on the priority selection screen by moving the input cursor (S2516). In S2516, the cursor shown in the entry field in the priority selection screen (see the broken line-square in FIGS. 42A and 42B) is moved to another entry field located in the direction of the up direction key 46 and the down direction key 47.

If the user performs a modification operation (S2514: NO, S2518: YES), the process returns to S2504 after the content modified by the modification operation by entering a value to the curser position is reflected on the priority selection screen (S2520). In S2520, the priority level modified by the modification operation is entered into the entry field indicated by the cursor.

If the user performs a confirmation operation (S2518: NO, S2522: YES), and there is no inconsistency in the priority level value entered into the each entry field at this point (S2524: NO), the priority level value entered in this entry field is stored (saved) in the specification information as the priority level of the I/O device corresponding to the entry field (S2530), and the current device priority setting process is completed.

Figure 42C:
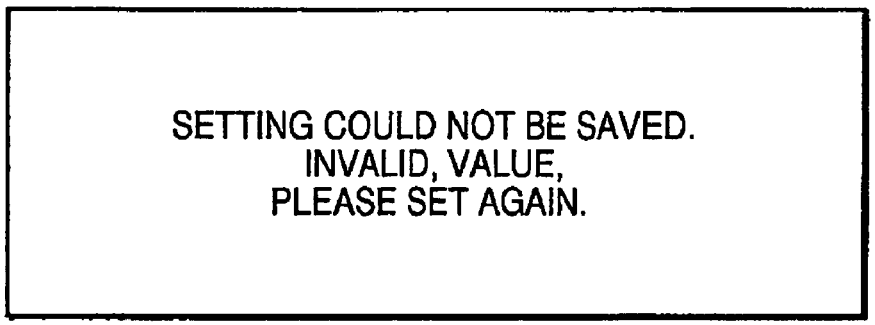

If there is an inconsistency between the priority level values entered into each entry field (S2524: YES), an error display is shown for a designated amount of time (e.g., two seconds) (S2526), the priority selection screen immediately before the device priority setting process is returned to the display (S2528), and then the process returns to S2504 (see FIG. 42C). In S2524, the process judges whether the same value is entered into the each entry field for the priority level, and if the same value is entered, it is determined that there is an inconsistency in the priority level values.

If the user performs a cancel operation (S2522: NO, S2532: YES), the device priority setting process is completed.

If the user performs an operation that is not any one of the operations described above, (S2532: NO), the process returns to S2504 after generating a rejection sound, for example, a buzzer.

[Effects]

In the service providing system configured as described above, the function server 30 can provide a service to the MFP 10 by performing the I/O media conversion process illustrated in FIG. 40. The I/O media conversion process is performed by the I/O device adapted in the MFP 10, through the information conversion process illustrated in FIG. 26, in other words, the conversion module of which the process result (i.e., I/O data) can be obtained by the media corresponding to the function implemented to those I/O devices. Therefore, the functions for which the MFP 10 is equipped can be implemented based on the process results if the process results are obtained as described above. Thus, even the service requiring the function, for which the MFP is not equipped per se, can be received indirectly at the MFP 10, by the process results of the media corresponding to the MFP 10 (the media which can be handled by the function, which can be implemented).

In the foregoing illustrative embodiment, at least one function, among the image data representing an image to be printed by the printer included in the MFP 10, and the image data generated by reading image through the scanner function, can be implemented by receiving the service from the function server 30.

The function server 30 is allowed to determine whether the MFP 10 has the necessary functions (whether it is "relevant" in S2154 in FIG. 30) in S2142 through S2154 in FIG. 30, by judging based on the specification information obtained from the MFP 10 and the service I/O media information stored in the MFP 10.

Furthermore, as the specification information is obtained from the MFP 10 as described above, the function server 30 is not required to manage the parameter related to the I/O device in the MFP 10, and is released from the workload involved with the registration that is generated on the function server 30. As the workload increases when the amount of the MFP 10 included in the service providing system increases, the workload can be reduced drastically when the service providing system is configured as described above.

Furthermore, assuming a configuration with the parameter related to the I/O device in the MFP 10 being managed by the function server 30, the user must register the parameters, and if incorrect parameters are registered due to an erroneous entry by the user, for example, the entire system may cease to operate. In a configuration such as the current service providing system where a notification of the parameter of the MFP 10 is issued by the MFP 10 itself and the subsequent process is performed based on the notification, the risk of the entire system not operating normally due to erroneous parameters is reduced.

It should be noted that the function server 30 determines whether there are functions required by the MFP 10 (whether it is "relevant" in S2154 in FIG. 30) by judging based on the specification information obtained from the MFP 10 and the service I/O media information stored in the MFP 10, in S2142 to S2154 in FIG. 30. The function server 30 reads the conversion module corresponding to the function in subsequent process. Furthermore, if there are multiple conversion modules, which should be read at this time, selection of the conversion modules to be read can be narrowed down in S2164 in FIG. 30, based on the order of priority stipulated in the specification information.

It should be noted that the user can designate the order of the priority by executing the device priority setting process shown in FIG. 41, on the function server 30, and subsequently, the function server 30 can select a conversion module based on the designated order of the priority.

It should be noted that the conversion module used when performing the media conversion process in S2604 and S2614 in FIG. 40 can perform not only the media conversion process on the data transmitted to the function server 30 from the MFP 10, but also on the data transmitted to the MFP 10 from the function server 30, and the MFP 10 can receive not only the service, in which the data is transmitted in one direction between the two, but also that, in which the data is transferred in the both directions. Furthermore, as the data conversion is performed during after the I/O conversion module is loaded in S2602 and S2612 in FIG. 40, the data conversion can be implemented when conversion is needed for data in one direction.

It should be noted that the user can designate the parameters in time with the reception of the parameter request from the function server 30 in S314 and S316 in FIG. 12, and the MFP 10 can receive subsequent service by transmitting the parameters to the function server 30.

It should be noted that the service I/F information 36, transmitted from the function server 30 along with the parameter request, is that which has been converted into the content corresponding to the I/O device included in the MFP 10 by the function server 30, through the service I/F information conversion process in FIG. 33 and FIG. 34. The parameters for services which can be used by the I/O devices included in the MFP 10 can be specified in advance.

It should be noted that the parameter that can be selected by the MFP 10 can be limited in advance, as in S2216 to S2224 in FIG. 33 and S2232 to S2240 in FIG. 34, by providing alternative setting entries to the service I/F information 36, when a performance required by the service for the I/O, for example, scanner resolution, is limited. Furthermore, even if there is no alternative setting entry in the service I/F information 36, as long as there is an alternative setting entry in the I/O conversion module, the parameters that can be selected by the MFP 10 can be determined by the setting entries.

[Variation]

Although an illustrative embodiment of the present invention is described above, the present invention is not particularly limited to the foregoing embodiment, and can take on various aspects so long as they belong within the technical scope of the invention.

For example, although the MFP 10 is used as an image processing device in the foregoing embodiment, it can be a device other than the MFP, for example, a printer device, a scanner device, a facsimile device, and the like, so long as it is an image processing device that can receive a service provided by a function server, and can implement the function.

It should be noted that, in the foregoing illustrative embodiment, the function server 30 transmits a parameter request instruction, along with the service I/F information 36. However, such a process for transmitting a parameter request instruction and the service I/F information 36 can be implemented by a device independent from the function server 30 (i.e., a single device or multiple devices operating in association).

It should be noted that, although the MFP 10 first receives the top service definition information 25, among other service definition information 25 stored in the service definition information memory unit 24 of the directory server, and selects a category, then receives service definition information 25 corresponding to the selected category and selects the service, it is not limited thereto. In other words, it can receive multiple (for example, all) pieces of the service definition information 25 stored in the service definition information memory unit 24 of the directory server 20 at once.

It should be noted that the parameter, for which the setting is requested by the service I/F information 36 is not limited to that given as examples in the foregoing illustrative embodiment (resolution, and the like), and can be various things in accordance with the service content; for example, selection between black/white and color, toner concentration (printing density), and voice volume (sound volume).

It should be noted that, although the service providing system in the foregoing illustrative embodiment includes one of each of the MFP 10, the directory server 20 and the function server 30, this configuration is merely an example to simplify the explanation, and the service providing system of the present invention can have various other configurations. In other words, there can be multiple MFPs 10 in the service providing system. Specifically, multiple MFPs 10 can receive service definition information 25 from one common directory server 20, and can request one common function server 30 for a service.

It should be noted that there can be multiple directory servers 20 in the service providing system of the present invention. Specifically, for example, one directory server 20 for transmitting the top service definition information 25 and another directory server 20 for transmitting the service definition information 25 of each category can be provided by independent servers. Furthermore, a service can be received directly by the function server 30 without being transmitted through the directory server 20.

It should be noted that multiple function servers 30 can be provided in the image system of the present invention. Specifically, for example, one function server 30 for transmitting the service I/F information 36 and another function server 30 for performing the service can be provided by separate servers. Furthermore, in regards to the function server 30 for performing a service, for example, one function server 30 for performing a session process and another function server 30 for performing a job process can be provided by separate servers. It should be noted that, for example, multiple function servers 30 can perform respective services, such as one function server 30 for performing service A, one function server 30 for performing service B to service D, another function server 30 for performing services E and F. In this case, the function server 30 that performs the service can transmit the service I/F information 36 corresponding to this service, or a function server 30 can be separate from the function server 30 performing the service. Furthermore, a conversion process can be performed by a device independent from the function server 30, and can also be performed by the directory server 20.

It should be noted that, in the foregoing illustrative embodiment, when reading the conversion module in S2142 though S2154 in FIG. 30, if there are multiple conversion modules to be read, selection of the conversion modules is narrowed down by the priority levels stipulated in the specification information. However, other conditions can be implemented as conditions to narrow down the selection of the conversion modules. For example, the most suitable conversion module in relation to the type of service provided can be determined and selected based on data tables and equations.

It should be noted that, in the foregoing illustrative embodiment, a device priority setting process in FIG. 41 is performed on the MFP 10. However, this process can also be performed on the function server 30, and the priority levels can be set by the function server 30. In this case, in S2502 in FIG. 41, the priority selection screen can be shown based on the specification information transmitted from the MFP 10, and in S2530 in FIG. 41, the priority levels specified at this time can be saved in the function server 30. Then, the order of the priority can be passed to the function server to be stored (managed).

It should be noted that the directory server 20 or a part of the constituent elements of the directory server 20, and the function server 30 or a part of the constituent elements of the function server 30 can be a single device that operate in association with other devices including other constituent elements.

It should be noted that the directory server 20 (or a part of the constituent elements of the directory server 20) and the function server 30 (or a part of the constituent elements of the function server 30) can be included in the MFP 10 of the service providing system.

What is claimed is:

1. A service providing system, comprising:
a service providing device adapted to provide a service through a network; and
a device adapted to request and receive the service from the service providing device;
wherein completion of the service requires a first operation to be executed in the device;
wherein, when the device includes a first implement configured to execute the first operation and the device requests the service, the service providing device includes:
a first executing unit configured to execute a second operation of the requested service; and
a first transmission unit configured to transmit data resulting from the second operation executed by the first executing unit to the device;
wherein, when the device requests the service and does not include the first implement and the first operation is an input operation, the service providing device includes:
a first receiving unit configured to receive data obtained in a third operation from the device, wherein the third operation is executed by a second implement of the device, the second implement being different from the first implement;
a first format conversion unit configured to convert a format of the data received by the first receiving unit to a format of first-operation processed data, the first-operation processed data resulting from the first operation being executed by the first implement;
a second executing unit configured to execute the second operation using the data converted by the first format conversion unit; and
a second transmission unit configured to transmit the data resulting from the second operation executed by the second executing unit to the device;
wherein when the device does not include the first implement and requests the service and the first operation is an output operation the service providing device includes:
the first executing unit configured to execute the second operation corresponding to the requested service;
a second format conversion unit configured to convert the data resulting from execution of the second operation by the first executing unit to a format of data that is able to be processed by a third implement of the device; and
a third transmission unit configured to transmit the data converted by the second format conversion unit to the device; and wherein the device includes:
a service request unit configured to issue the request for the service to the service providing device; and
an operation executing unit configured to execute at least one of the first operation, the third operation and a fourth operation in which the data transmitted from the third transmission unit of the service providing device is processed.

2. The service providing system according to claim 1, wherein the device is equipped with at least one of a function that reads an image and generates image data that represents the image and a function to print an image that is represented by the image data, and
wherein the service providing device is further adapted to provide a service concerning at least one of the image data generated by the function for which the device is equipped and the image data representing an image to be printed.

3. The service providing system according to claim 2, wherein the device further includes a function judging unit configured to determine whether the device is equipped with a function to receive the service based on equipped function information that indicates functions with which the device is equipped; and
wherein the function judging unit is further configured to determine whether the device is equipped with a function to execute the first operation by the first implement when the function indicated in the equipped function information is included in required function information, which is adapted to indicate functions for the device to execute the first operation.

4. The service providing system according to claim 3, wherein the device is equipped with an information notification unit, which is adapted to notify the service providing device of the equipped function information, and
wherein the function judging unit is adapted to judge whether the device is equipped with a function based on the equipped function information notified by the information notification unit.

5. The service providing system according to claim 1, wherein the device includes a function judging unit configured to determine whether the device is equipped with a function to receive the service based on equipped function information that indicates functions for which the device is equipped; and
wherein the function judging unit is adapted to judge whether the device is equipped with a function to execute the first operation by the first implement when the function indicated in the equipped function information is included in required function information, which is adapted to indicate functions for the device to execute the first operation.

6. The service providing system according to claim 5, wherein:
the device is equipped with an information notification unit, which is adapted to notify the service providing device of the equipped function information, and
the function judging unit is adapted to judge whether the device is equipped with a function based on the equipped function information notified by the information notification unit.

7. The service providing system according to claim 5, wherein the service providing device is equipped with a function determination unit, which is adapted to determine a function among multiple functions equipped by the device based on a predetermined condition, when the device is judged by the function judging unit to not be equipped with the function, and wherein the first format conversion unit and the second format conversion unit execute one format conversion process, which enables the service to be completed by utilizing the media corresponding to the function determined by the function determination unit, among multiple format conversion processes.

8. The service providing system according to claim 7, wherein the device is equipped with a conditioning unit, when the function determination unit determines the function, which is adapted to allow a user to specify conditions for the function determination unit, and a condition notifying unit, which is adapted to notify the service providing device of the conditions specified by the user through the conditioning unit; and wherein the function determination unit is adapted to determine the function based on the conditions notified by the condition notifying unit.

9. The service providing system according to claim 1, wherein the service providing device is equipped with a specification request unit, which is adapted to request the device to specify a service to be provided among at least one service available from the service providing device, and a service specifying unit, which allows a user to specify the service to be provided among at least one service available from the service providing device when the device receives a request from the specification request unit for specification of the service, wherein the service request unit is adapted to request the service providing device to provide the service specified by the service specifying unit.

10. The service providing system according to claim 9, wherein the specification request unit is adapted to request the device to specify a service among at least one service including one of the first operation and the second operation when the function judging unit determines that the device is not equipped with the function to complete the service; and wherein the service providing device is configured to provide the service by one of the first format conversion unit and the second format conversion unit executing the format conversion process when the service is requested by the service request unit.

11. The service providing system according to claim 1, wherein the first format conversion unit and the second format conversion unit convert a first type of media to a second type of media different from the first type of media and wherein the first type of media is one of: image media, text media, and voice media and the second type of media is one of: image media, text media, and voice media.

12. The service providing system of claim 1, wherein the first media type is image media and the second media type is one of voice media and text media.

13. The service providing system of claim 11, wherein the first media type is voice media and the second media type is one of image media and text media.

14. The service providing system of claim 11, wherein the first media type is text media and the second media type is one of image media and voice media.

15. The service providing system according to claim 1, wherein the service providing device is configured to:
determine whether a parameter request has been received from the device in association the service;
in response to determining that the parameter request has been received, convert one or more parameters defining an input or output process to be performed by the device in association with the requested service, wherein the conversion is performed in accordance with capabilities of the device, and wherein the one or more parameters defining the input or output process are incompatible with the device; and
transmit the converted one or more parameters to the device from the service providing device in response to the parameter request.

16. The service providing system according to claim 15, wherein converting the one or more parameters defining the input or output process includes:
determining whether an alternative setting entry compatible with the capabilities of the device is stored in service information defining the requested service; and
in response to determining that an alternative setting entry is stored in the service information, converting the one or more parameters to the alternative setting entry.

17. A server adapted to provide a service to a device through a network, wherein completion of the service requires execution of a first operation in a device, the server comprising:
first and second executing units;
a receiving unit;
first and second transmission units; and
first and second format conversion units,
wherein when the service is requested by the device and the device includes a first implement to execute the first operation:
the first executing unit is configured to execute a second operation of the requested service; and
the first transmission unit is configured to transmit data resulting from execution of the second operation executed by the first executing unit to the device,
wherein when the service is requested by the device and the device does not include the first implement and the first operation is an input operation:
the receiving unit is configured to receive, from the device, data resulting from execution of a third operation, the third operation being executed by a second implement of the device, the second implement being different from the first implement;
the first format conversion unit is configured to convert a format of the data received by the first receiving unit to a format of first-operation processed data resulting from execution of the first operation by the first implement;
the second executing unit is configured to execute the second operation using the data converted by the first format conversion unit; and
the second transmission unit is configured to transmit the data obtained in the second operation executed by the second executing unit to the device, and
wherein, when the service is requested by the device and the device does not include the first implement and the first operation is an output operation:
the first executing unit is configured to execute the second operation corresponding to the requested service;
the second format conversion unit is configured to convert the data resulting from execution of the second operation by the first executing unit to a format of data which is able to be processed by a third implement of the device; and
the third transmission unit is configured to transmit the data converted by the second format conversion unit to the device.

18. One or more non-transitory computer readable media storing computer-readable instructions that, when executed, cause a computer to execute processes to function as a service providing device in a service providing system for providing a service to a device, wherein completion of the service requires a first operation to be executed in the device, the processes including:
- receiving a request from the device;
- when the device includes a first implement to execute the first operation:
- executing a second operation corresponding to the requested service; and
- transmitting processed data resulting from execution of the second operation to the device;
- when the device does not include the first implement and the first operation is an input operation;
- receiving, at the service providing device, third-operation processed data resulting from a third operation executed by a second implement of the device, the second implement being different from the first implement;
- converting a format of the third-operation processed data received from the device to a format of first-operation processed data, the first-operation processed data resulting from the first operation being executed by the first implement at the service providing device;
- executing the second operation using the converted data; and
- transmitting second-operation processed data resulting from execution of the second operation to the device;
- when the device does not include the first implement and the first operation is an output operation:
- executing the second operation of the requested service at the service providing device;
- converting, at the service providing device, the second-operation processed data resulting from execution of the second operation to a format that is able to be processed by a third implement of the device; and
- transmitting the converted data from the service providing device to the device.

* * * * *